(12) United States Patent
Borja et al.

(10) Patent No.: US 12,449,361 B2
(45) Date of Patent: Oct. 21, 2025

(54) MULTIPLEX OPTICAL STIMULUS AND READOUT

(71) Applicant: QUIVER HOLDINGS INC., Cambridge, MA (US)

(72) Inventors: Gabriel Benito Borja, Boston, MA (US); Yang Lu, Cambridge, MA (US); Benjamin Harwood, Cambridge, MA (US); Hongkang Zhang, Wellesley, MA (US); Christopher Werley, Cambridge, MA (US); Owen McManus, Belmont, MA (US); Graham T. Dempsey, Sudbury, MA (US)

(73) Assignee: QUIVER HOLDINGS INC., Cambridge, MA (US)

( * ) Notice: Subject to any disclaimer, the term of this patent is extended or adjusted under 35 U.S.C. 154(b) by 0 days.

(21) Appl. No.: 18/654,828

(22) Filed: May 3, 2024

(65) Prior Publication Data

US 2024/0295496 A1 Sep. 5, 2024

Related U.S. Application Data

(63) Continuation of application No. 17/854,425, filed on Jun. 30, 2022, now Pat. No. 12,105,023.

(60) Provisional application No. 63/217,145, filed on Jun. 30, 2021.

(51) Int. Cl.
*G01N 21/64* (2006.01)
*B01L 9/00* (2006.01)
*G01N 21/01* (2006.01)

(52) U.S. Cl.
CPC ........ *G01N 21/6428* (2013.01); *B01L 9/523* (2013.01); *G01N 21/01* (2013.01); *B01L 2200/025* (2013.01); *B01L 2300/0654* (2013.01); *G01N 2201/02* (2013.01); *G01N 2201/0636* (2013.01)

(58) Field of Classification Search
CPC .............. G01N 21/6428; G01N 21/01; G01N 2201/02; G01N 2201/0636; G01N 21/253; G01N 21/6452; B01L 9/523; B01L 2200/025; B01L 2300/0654; B01L 2300/168

See application file for complete search history.

(56) References Cited

U.S. PATENT DOCUMENTS

| | | | | |
|---|---|---|---|---|
| 12,105,023 B2 * | 10/2024 | Borja | | B01L 9/523 |
| 2014/0340482 A1 * | 11/2014 | Kanarowski | | G02B 21/16 348/46 |
| 2017/0292961 A1 * | 10/2017 | Cohen | | G01N 33/502 |

FOREIGN PATENT DOCUMENTS

WO    WO-0050872 A2 *   8/2000   ......... G01N 21/6428

* cited by examiner

*Primary Examiner* — Seung C Sohn
(74) *Attorney, Agent, or Firm* — Thomas C. Meyers; Sullivan & Worcester LLP

(57) ABSTRACT

The invention provides a multi-well plate reader for providing simultaneous transmission of stimulation light to, and detection of emission light from, individual wells of a multi-well plate at a plurality of distinct wavelengths.

19 Claims, 44 Drawing Sheets

| Compound Name | Nav1.2 (µM) | Nav1.5 (µM) | Nav1.77 (µM) | State Dependence* |
|---|---|---|---|---|
| Amitriptyline | 0.56 | 0.82 | 1.25 | 9.6 |
| Tetracaine | 0.26 | 0.43 | 0.28 | 15.5 |
| Vixotrigine | 1.79 | 0.93 | 1.36 | 29.8 |
| JNJ63955918 | 3.07 | 6.26 | 0.042 | 6.1 |
| PF-05089771 | 0.17 | 10.1 | 0.035 | 42.9 |
| Tetrodotoxin | 0.019 | 3.08 | 0.033 | 4.0 |
| Carbamazepine | 139.4 | 37.1 | 52.6 | 39.9 |
| Funapide | 0.51 | 0.24 | 0.46 | 2.7 |
| Mexiletine | 28.8 | 21.0 | 13.0 | 9.2 |
| Lacosamide | 392.9 | 58.5 | 104.6 | n.a. |
| Lamotrigine | 72.4 | 20.6 | 32.8 | 24.3 |
| MK-0759 | 1.50 | 1.61 | 2.05 | 18.8 |
| lidocaine | 47.2 | 20.1 | 15.0 | 15.4 |
| TC-N-1752 | 0.14 | 1.14 | 0.046 | 10.8 |
| VX-150 | inactive | inactive | inactive | n.a. |

FIG. 35

Exemplary conditions for preparations and assays using Voltron

| Preparation | Dye labeling | Imaging modality | Illumination intensity | Imaging rate |
|---|---|---|---|---|
| rat neurons in culture | JF503 JF525 JF549 JF585 JF635 | Widefield (LED) | 5 – 20 mW/mm$^2$ | 400 Hz – 3.2 kHz |
| mouse CA1 hippocampus | JF525 | Widefield (LED) | 25 mW/mm$^2$ | 3.86 kHz |
| mouse cortex NDNF-Cre | JF525 | Widefield (LED) | < 20 mW/mm$^2$ | 400 Hz – 1 kHz |
| mouse cortex L2/3 V1 | JF525 | DMD patterned illumination (LED) | < 50 mW/mm$^2$ | 500 – 700 Hz |
| zebrafish larvae forebrain | JF525 JF549 JF585 JF635 | Widefield (LED) | 26 – 28 mW/mm$^2$ | 400 Hz |
| zebrafish larvae midbrain | JF525 | Light sheet (Laser) | 40 – 80 µW | 300 Hz |
| adult *Drosophila* | JF525 JF549 | Widefield (LED) | 5 – 25 mW/mm$^2$ | 800 Hz |

FIG. 46

MULTIPLEX OPTICAL STIMULUS AND READOUT

TECHNICAL FIELD

The invention generally relates to a plate reader for use in biological assays.

BACKGROUND

Neurological disorders affect nearly 1 billion people globally. Drug discovery for diseases of the nervous system, including neurological disorders, has been particularly challenging due to the longer development timelines as well as lower approval rates, when compared to drugs targeting other therapeutic areas.

A major impediment to progress in neuroscience drug discovery is the lack of translatable assays, models, and technologies that can better predict human efficacy and provide both the information content and throughput to enable rapid identification and optimization of therapeutic candidates. Current instrument platforms used for neuroscience drug discovery have shown some success in application to different facets of drug discovery. For example, whole plate imaging has been used to assess the electrophysiology of cells in multiplex formats. However, existing plate imagers and their associated techniques suffer from inherent problems.

More specifically, automated electrophysiology has been used to assess the electrical activity of cells in a sample. There are numerous diseases that involve electrically-active cells, such as neurons and cardiomyocytes. As a result, there is a significant push to study characteristics and interactions of those cells.

For example, automated electrophysiology uses direct measurement of cells' ion channels and electrical activity using physical electrodes for stimulating and recording cells. However, using physical electrodes for stimulation and recording can open holes in cell membranes, which damages the cells. This prevents automated electrophysiology from being used in certain complex experiments, which require re-use of cells. In addition, automated electrophysiology instruments typically require use of dissociated cells, which can damage neurons and other cell types and lead to loss of cellular compartments, and limit measurements of processes involved in cell-to-cell communication. Moreover, automated electrophysiology assays can be expensive, largely due to the specialized assay plates required.

Fluorescent imaging kinetic plate reader (FLIPR) instruments can provide measurements of cellular voltage-gated, ligand-gated, and constitutive channel activity in cells using a multi-well plate format. In FLIPR assays, cellular activity is generally activated using chemical stimulation of voltage-gated channels. However, the chemical stimuli used may not reflect physiological processes or be indicative of in vivo cellular activity, which can alter the pharmacological responses measured in the assays. That is especially problematic in assays used to screen for drug candidates.

Electrical field stimulation (EFS) with fluorescent readout is a variation of FLIPR. In these methods and instruments, electrodes are incorporated into assay wells to stimulate electrically excitable cells. However, voltage control for this electrical stimulation is limited and nonuniformities in the field can lead to overstimulation or electroporation, which can negatively affect assay performance.

SUMMARY

The invention provides multi-well plate readers for use in performing optogenetic assays of biological activity. The plate readers include a plurality of independent optical channels, wherein each channel transmits light to, and detect subsequent emission from, samples in a set of wells of a multi-well plate at a plurality of spectrally-distinct wavelengths. More specifically, each of the plurality of optical channels simultaneously transmits a plurality of spectrally-distinct wavelengths of stimulating light to individual wells while detecting a plurality of spectrally distinct wavelengths of emission light from samples in the individual wells. Because the multi-well plate readers of the invention can simultaneously transmit stimulation light and detect emission light at a plurality of different wavelengths, the plate readers are useful in assays using many combinations of optical actuators and reporters of cellular activity. This provides the plate readers of the present invention with the flexibility to perform numerous assays, including complex optogenetic assays.

The multi-well plate readers disclosed herein provide extremely high-throughput screening, which is orders of magnitude higher than presently available methods. For example, the methods and systems of the present invention include optogenetic assays using cells expressing optical reporters and actuators of cellular activity. Cells expressing the reporters and actuators are placed in wells of a multi-well plate. Independent optical channels of the plate reader provide stimulus and excitation light to the cells in individual wells. The disclosed plate readers possess an unmatched ability to transmit stimulation light to individual wells at controlled intensities and wavelengths, and thus they can transmit stimulating light to the cells in discrete pulses, at graduated, pulsed, or ramped intensities, and/or as a constant stimulus.

More specifically, each optical channel includes unique beam shaping optics for shaping one or more beams of light to be transmitted to multiple wells. In particular, the beam shaping optics shape one or more beams of light (emitted from separate light sources) into multiple, uniform beamlets of light that are directed, via a reflector array, toward the center of separate respective wells of a set of wells. The beam shaping optics include a beam homogenizer for receiving and shaping a beam of light into a uniform and rectangular region of illumination. The optics further include a microlens array for dividing the homogenized light beam into a set of uniform beamlets of light directed towards the reflector array, which is comprised of an array of metallic reflectors for directing each of the uniform beamlets of light into a center of a separate respective well of the set of wells.

Accordingly, the beam homogenizer shapes the light from the light source so that, instead of hitting the microlens array with an irregular shape, the light enters the microlens array in a substantially rectangular pattern with homogeneous optical power level over the pattern. Such an arrangement ensures that the entire sample in each well receives strong and uniform illumination while avoiding inadvertently illuminating walls of each well, which could otherwise cause autofluorescence. Thus, a sample at the bottom of well is illuminated uniformly with good optical power for imaging via an image censor (i.e., sCMOS image sensor). Accordingly, the plate reader can successfully image living cells in multiple wells of a multi-well plate and record movies of electrical activity useful to show, for example, action potentials propagating within living neurons.

Furthermore, the number of uniform beamlets of light distributed via the beam shaping optics covers a specific area over a set of wells, as opposed to just being directed to a single well. In other words, each optical channel is configured to transmit a plurality of beamlets of light of a specific wavelength into a plurality of separate respective wells over a given area, and, in return, detect emission from each of the separate respective wells. The number of uniform beamlets, and thus the number of associated wells able to receive such beamlets, is directly proportional to the overall number of wells of a given multi-well plate being used, generally by a factor of 24. For example, the plate reader may be operable with at least three types of multi-well plates, such as 96-, 384-, or 1536-well plates. As a result, the reflector array is operable to direct approximately 4 uniform beamlets of light into a set of 4 wells of a 96-well plate, approximately 16 uniform beamlets of light into a set of 16 wells of a 384-well plate, and 64 uniform beamlets of light into a set of 64 wells of a 1536-well plate. As such, regardless of plate format, approximately 24 camera fields of view (FOVs) are needed to record a full plate, which still results in improved overall throughput compared to conventional techniques.

Accordingly, the unique beam shaping optics and inclusion of a sCMOS image sensor enables increased throughput, increased instrument robustness and stability, boosting of well-to-well signal strength and uniformity, reducing of optical crosstalk, and vastly improving spatial resolution. As a result, the plate reader of the present invention allows for sensitive optical detection and stimulation, while performing a broad suite of optimized assays on a wide range of excitable cell types, which is particularly useful for neurological disorder-based drug discovery, including Nav channel-based human embryonic kidney (HEK) cells, such as HEK 293 cells, for target-based screening and primary neuronal cultures.

In one aspect, a multi-well plate reader is provided. The multi-well plate reader includes a reading platform to receive a multi-well plate. The multi-well plate may include any one of a 96-, 384-, and a 1536-well plate. The plate reader further includes a plurality of optical channels, each optical channel capable of transmitting light at a plurality of different wavelengths to and detecting light at a plurality of different wavelengths from a set of wells of the multi-well plate.

In particular, each optical channel may include at least three light sources for emitting three beams of light at three distinct wavelengths and to be transmitted to the set of wells. As previously noted, the plate reader may be useful in performing optogenetic assays of biological activity. Accordingly, the light sources are selected based on the types of electrically active cells, such as neurons, and the specific optical actuator of electrical activity expressed by such active cells. For example, certain channelrhodopsins may be used as light-gated ion channels that then function as optical actuators of electrical activity. When those proteins are expressed by a cell and then illuminated by light of a certain wavelength, the light causes those proteins to pump ions across the cell membrane, effecting membrane polarization leading to electrical activity such as causing that cells to transmit an action potential down its length. When multiple cells in a sample are expressing optical actuators, spatially-patterned illumination is useful to trigger electrical activity (such as an action potential) in only select ones of those cells.

As such, a first light source may be used to emit a beam of light at a first wavelength specific to optogenetic actuators such as a channelrhodopsin that functions as a light-gated ion channel. A second light source may be used to emit a beam of light at a second wavelength, such as the excitation wavelength of a second optogenetic protein, such as a fluorescent reporter of an ion concentration. Yet still, any one of the light sources may emit a beam of light at an excitation wavelength of a fluorophore. The fluorescent indicators that are sensitive to specific physical properties of their environment such as calcium ion concentration or membrane potential.

One example of an environmentally sensitive fluorescent indicator for use with the present invention is the archaerhodopsin-based protein QuasAr2, an optogenetic reporter which is excited by red light and produces a signal that varies in intensity as a function of cellular membrane potential.

In addition to fluorescent indicators, the plate readers of the present invention can be used to optically activate light-sensitive compounds for chemically or electrically perturbing cells. The invention can be used with voltage-indicating proteins such as those disclosed in U.S. Pat. No. 10,613,079 and U.S. Pub. 2014/0295413, the entire contents of each of which are incorporated by reference. Using light-controlled activators, stimulus can be applied to entire samples, selected regions, or individual cells by varying the illumination pattern. One example of a light-controlled activator is the channelrhodopsin protein CheRiff, which produces a current of increasing magnitude roughly in proportion to the intensity of blue light falling on it. In one study, CheRiff generated a current of about 1 nA in whole cells expressing the protein when illuminated by about 22 mW/cm$^2$ of blue light.

Optically modulated activators can be combined with fluorescent indicators to enable all-optical characterization of specific cell traits such as excitability. For example, a channelrhodopsin such as CheRiff is combined with a fluorescent indicator such as QuasAr2. The plate reader provides different wavelengths of light to illuminate and activate the reporter and activator proteins, respectively, allowing membrane potential to be measured at the same time that action potentials are initiated by light.

The plate reader may be used on additional reporters and associated systems for activating them. Proteins that report changes in intracellular calcium levels may be used, such as a genetically-encoded calcium indicator (GECI). The plate reader may provide activation light for a GECI, such as yellow light for RCaMP. Exemplary GECIs include GCaMP or RCaMP variants such for example, jRCaMP1a, jRGECO1a, or RCaMP2. A key challenge in combining multiple optical modalities (e.g., optical excitation, activation, voltage imaging, calcium imaging) is to avoid optical crosstalk between the modalities. The pulses of light used to deliver optical activation should not induce fluorescence of the reporters; the light used to image the reporters should not activate the light-gated ion channel; and the fluorescence of one reporter should be readily distinguished from the fluorescence of other reporters. In some aspects of the invention, this separation of modalities is achieved by selecting an activator and reporters with little or no spectral overlap. In one embodiment, the activator is activated by blue light, a Ca2+ reporter is excited by yellow light and emits orange light, and a voltage reporter is excited by red light and emits near infrared light. Accordingly, the three light sources of a given optical channel may include a blue light, a red light, and a yellow light.

Each of the plurality of the optical channels may further include one or more dichroic mirrors to join at least two of the beams of light in space and pass the two joined beams of light through at least one homogenizer for spatially homogenizing the two joined beams of light. For example, in one embodiment, a dichroic mirror may be used to join the red and yellow light beams. The homogenizer is used to form the two joined beams of light into a substantially uniform and rectangular region of illumination.

Each optical channel further includes a microlens array that divides the joined beams of light, having passed through the homogenizer, into uniform beamlets of light directed towards a reflector array. The reflector array comprises an array of metallic reflectors for directing each of the uniform beamlets of light into a center of a separate respective well of the set of wells and avoids illumination of walls of well walls. More specifically, the number of uniform beamlets of light directed towards the set of wells is directly proportional to the overall number of wells of the multi-well plate, generally by a factor of 24. For example, for a 96-well plate, he reflector array is operable to direct approximately 4 uniform beamlets of light into a set of 4 wells. For a 384-well plate, the reflector array is operable to direct approximately 16 uniform beamlets of light into a set of 16 wells. For a 1536-well plate, the reflector array is operable to direct approximately 64 uniform beamlets of light into a set of 64 wells.

The multi-well plate reader further includes an imaging lens to direct light from a sample in a well onto an image sensor. The image sensor comprises an sCMOS image sensor, for example. The image sensor may be used to record a movie of the light emissions, and the movie can be analyzed to detect successful neurotransmission and even to detect specific features (in the recorded light emissions in the movie) tending to show specific biological neural phenotypes such as disease-associated problems with neural activity.

In some embodiments, at least one light transmitted is a stimulation beam of light, and each optical channel comprises a digital micromirror device (DMD) and the stimulation beam of light reflects off the DMD to illuminate a bottom of a well of the set of wells with a pattern defined by the DMD.

As previously described, at least one of the light beams emitted from a respective light source is stimulation light at a wavelength that excites a fluorophore in a cell. In some embodiments, at least one of the light beams emitted light is activation light at a wavelength that activates a light-gated ion channel in a cell. For example, the light-gated ion channel is in a pre-synaptic neuron connected to a non-selected cell via a synapse. The non-selected cell may include an optical reporter of synaptic activity.

The reading platform of the multi-well plate reader may include a mechanism to displace the plate with respect to the plurality of optical channels. The mechanism may include a motor, for example. More specifically, the mechanism may include an automated precision linear motor stage, including a plate pusher that displaces the multi-well plate with respect to the plurality of optical channels to thereby align sets of the plurality of wells of the multi-well plate with a different optical channel.

Each of the plurality of optical channels are coupled to a processing system operable to model activity of a cell in a well using emission light from the well. The activity is a biological signal, for example. More specifically, the biological signal may include, but is not limited to, an action potential, a synaptic signal, a change in membrane potential, a change in intracellular ion concentration and a change in concentration of intracellular mediators.

BRIEF DESCRIPTION OF THE DRAWINGS

FIG. 35 lists tool compounds.

FIG. 46 provides information regarding imaging using Voltron in various assays and under various conditions.

DETAILED DESCRIPTION

Figure 1:
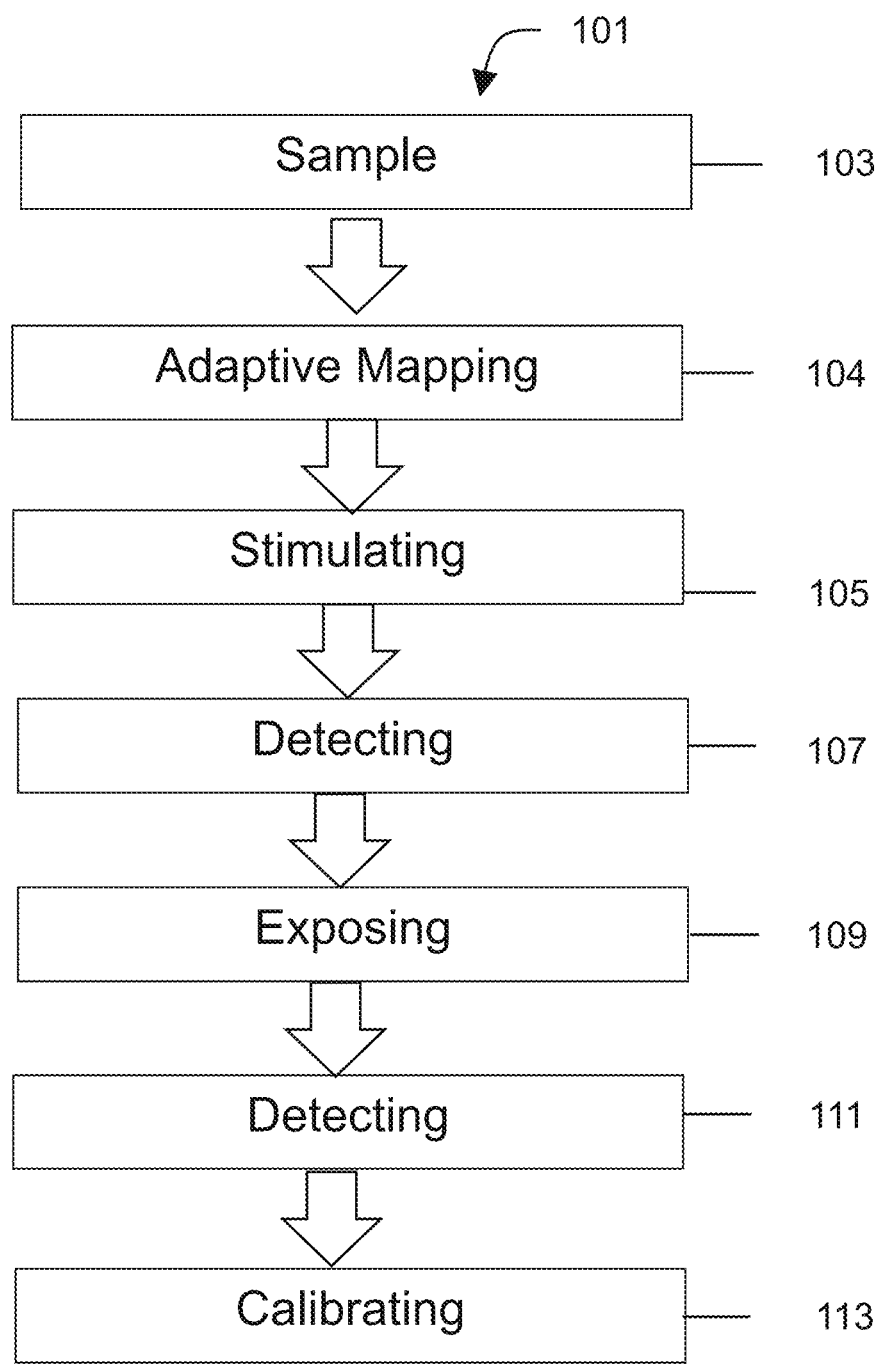
FIG. 1 shows an exemplary method of the invention.

The invention provides multi-well plate readers for use in performing optogenetic assays of biological activity. The plate readers includes a plurality of independent optical channels, wherein each channel can transmit light to, and detect subsequent emission from, samples in a set of wells of a multi-well plate at a plurality of spectrally-distinct wavelengths. More specifically, each of the plurality of optical channels can simultaneously transmit a plurality of spectrally distinct wavelengths of stimulating light to individual wells while detecting a plurality of spectrally distinct wavelengths of emission light from samples in the individual wells. Because the multi-well plate readers of the invention can simultaneously transmit stimulation light and detect emission light at a plurality of different wavelengths, the plate readers are useful in assays using many combinations of optical actuators and reporters of cellular activity. This provides the plate readers of the present invention with the flexibility to perform numerous assays, including complex optogenetic assays.

In optogenetics, light is used to control and observe certain events within living cells. For example, light-responsive genes, such as fluorescent voltage reporters can be expressed in cells of a sample. An exemplary reporter is a transmembrane protein that generates an optical signal in response to changes in cell membrane potential, thereby functioning as an optical reporter. When excited with an excitation light at a certain wavelength, the reporter is energized to produce an emission light of a different wavelength, indicating a change in membrane potential. Cells in the sample may also include optogenetic actuators, such as light-gated ion channels. Such channels respond to a stimulation light of a particular wavelength, which causes the channels to initiate an action potential in the cells. The multi-well plate readers of the present invention can also be used with additional reporters of cellular activity, and the associated systems for actuating them. For example, proteins that report changes in intracellular calcium, intracellular metabolite or second messenger levels occurring in cell cytoplasm of within specific intracellular compartments, or changes in the membrane potential occurring in membrane defined intracellular compartments including mitochondria, lysosomes, endoplasmic reticulum and other compartments may be used.

A challenge in combining multiple optical modalities (e.g. optical excitation, activation, voltage imaging, calcium imaging) is to avoid optical crosstalk between the modalities. For example, the pulses of light used to deliver optical activation should not induce fluorescence of the reporters; the light used to energize the reporters should not activate the light-gated ion channel; and the fluorescence of one reporter should be readily distinguished from the fluorescence of other reporters. Furthermore, when simultaneously detecting optical signals across a plurality of wells and/or multi-well plates, it is critical that readings between plates and/or wells are calibrated and normalized. The ability of the presently disclosed plate readers to accurately detect and transmit light of different wavelengths permits the use of these modalities within a single assay.

The plate readers of the invention can be used to observe fluorescent reporters that are sensitive to specific physical properties of their environment, such as biological signals. Biological signals may include, for example, action potentials, synaptic signals, ion concentration (e.g., calcium and sodium) or membrane potentials. The time-varying signals produced by these indicators is repeatedly measured to chart the course of chemical or electronic states of a living cell.

As the plate readers of the present invention allow simultaneous transmission of stimulating light and detection of emission light of different wavelengths, the plate readers can perform complex assays involving numerous optically actuated and/or detectable proteins.

Thus, samples used in the plate readers of the present invention include, but are not limited to, cells expressing an optical actuator of electrical activity and an optical reporter of electrical activity. In one configuration, the sample may comprise a first cell that expresses the actuator and a second cell that expresses the reporter. The plate reader can activate the light-sensitive actuator protein with a stimulating light beam to cause a change in the protein, thereby initiating a change in membrane potential in the cell. The result is that the cell "fires," i.e., an action potential or regenerative signal propagates in the electrically-active cell. The plate reader can simultaneously transmit a stimulating light beam to a fluorescent optical reporter protein with a beam that is spectrally distinct from that used to stimulate the optical reporter. The plate reader can measure the fluorescence emitted by the reporter to measure corresponding changes in membrane potential.

One example of environmentally-sensitive fluorescent reporters for use with the present invention are rhodopsin-type transmembrane proteins that generate an optical signal in response to changes in membrane potential, thereby functioning as optical reporters of membrane potential. Archaerhodopsin-based protein QuasAr2 and QuasAr3, are excited by red light and produce a signal that varies in intensity as a function of cellular membrane potential. These proteins can be introduced into cells using genetic engineering techniques such as transfection or electroporation, facilitating optical measurements of membrane potential. The plate readers of the invention can measure QuasAr2 or QuasAr3 in a sample using light having a wavelength between 580 and 650 nm. The excitation light may have an intensity between about 0.01 W/cm$^2$ and about 400 W/cm$^2$, and preferably about 100 W/cm$^2$, for QuasAr.

In addition to fluorescent indicators, the plate readers of the present invention can be used to optically activate light-sensitive compounds for chemically or electrically perturbing cells. The invention can be used with voltage-indicating proteins such as those disclosed in U.S. Patent Publication 2014/0295413, filed Jun. 12, 2014, the entire contents of which are incorporated herein by reference. For example, an optical actuator of cellular activity may be a genetically-encoded rhodopsin or modified rhodopsin such as a microbial channelrhodopsin. For example, sdChR, a channelrhodopsin from *Scherffelia dubia*, may be used or an improved version of sdChR—dubbed CheRiff—may be used as an optical actuator. "CheRiff" refers to a version of sdChR that uses mouse codon optimization, a trafficking sequence, and the mutation E154A as described herein.

The plate readers may be used with additional reporters and associated systems for actuating them. For example, proteins that report changes in intracellular calcium levels may be used, such as a genetically-encoded calcium indicator (GECI). The plate reader may provide stimulation light for a GECI, such as yellow light for RCaMP. Exemplary GECIs include GCaMP or RCaMP variants such for example, jRCaMP1a, jRGECO1a, or RCaMP2. In one embodiment, the actuator is activated by blue light, a Ca2+ reporter is excited by yellow light and emits orange light, and a voltage reporter is excited by red light and emits near infrared light.

In certain aspects, the plate readers of the invention can perform assays using optically modulated actuators that are combined with fluorescent reporters to enable all-optical characterization of specific cell traits, such as excitability. For example, the Optopatch method combines an electrical actuator protein such as CheRiff with a fluorescent reporter such as QuasAr2. The actuator and reporter proteins respond to different wavelengths of light, allowing membrane potential to be measured at the same time cells are excited over a range of photocurrent magnitudes.

Measuring the electrical properties or activities of cells is useful for the study, diagnosis, and cure of diseases that involve electrically active cells, such as heart and brain cells (e.g., neurons and cardiomyocytes). Conditions that affect these cells include heart disease, atrial fibrillation, amyotrophic lateral sclerosis, primary lateral sclerosis, pain, neural disorders, and many others. All-optical measurements provide an attractive alternative to conventional methods like patch clamping because they do not require precise micromechanical manipulations or direct contact with cells in the sample. Optical methods, especially when used with the plate readers of the present invention, are more amenable to high-throughput applications. The dramatic increases in throughput afforded by all-optical measurements have the potential to revolutionize study, diagnosis, and treatment of these conditions.

Thus, the present invention provides methods using the disclosed plate readers that include exciting cells in specific wells of a multi-well plate that are to be observed or stimulating a cell to initiate an action potential or regenerative signal. Stimulation may be direct or indirect (e.g., optical stimulation of an optical actuator or stimulating an upstream cell in gap junction—or synaptic communication with the cell(s) to be observed). Stimulation may be optical, electrical, chemical, or by any other suitable method. Stimulation may involve any pattern of activation including, for example, regular, periodic pulses, single pulses, irregular patterns, or any suitable pattern. Methods may include varying optical stimulation patterns in space or time to highlight particular aspects of cellular function. For example, a pulse pattern may have an increasing frequency. In certain embodiments, the methods may include stimulating an electrically active cell that expresses an optical activator using pulses of light.

For example, the plate readers of the present invention can be used to characterize the physical properties of cells using fluorescent reporters and light-sensitive actuators of cellular activity. Such assays can be designed, for example, to study the effect of a potential drug compound on cells. For example, the plate readers can be used to optically obtain an action potential (AP) and calcium transient (CT) waveform from a stem-cell derived cardiomyocyte to characterize an arrhythmia in the cardiomyocyte. Cardiomyocytes in the sample located in a well of a multi-well plate can be caused to express a rhodopsin-type transmembrane optical reporter. The plate reader can activate a microbial channelrhodopsin with stimulating light, causing an AP to propagate through the cardiomyocytes. Cells containing a reporter protein are illuminated via stimulation light from the plate reader, and the AP causes a change in the fluorescence of the reporter. Light from the reporter is detected by the plate reader and analyzed to construct the AP waveform. An arrhythmia in the constructed AP waveform can be detected or characterized, e.g., by comparison to a known standard or other analytical techniques.

The plate readers of the invention can thus be used to study a compound's effect on cells. Since the plate reader can analyze a sample found in wells of a multi-well plate, cells of the sample can be observed while in a supporting cell medium. This allows the activity of cells to be analyzed both before and after introduction of a compound of interest, such as a potential drug, to the sample. The plate reader can thus detect a resulting perturbation to the detected AP waveform and other characteristics associated with exposure to a compound. Since the optical reporter can include a voltage reporter, an ion reporter (e.g., for [Ca2+]), others, or combinations thereof, the plate reader can detect the effect of the compound across multiple ion channels of cells as revealed through all features of the AP waveform.

Moreover, because the plate readers of the invention can analyze living cells in wells of a multi-well plate, the cells can be exposed to media that includes compounds, such as mediators, that are used to mimic a particular in vivo condition. For example, mediators may be selected to mimic the local environment of a tissue associated with a specific type of pain signal, a tumor, or other disease or condition. The cells in these model conditions may be used to discover or develop therapeutic agents associated with a modeled disease or condition.

For example, samples analyzed by the plate readers of the invention may include cells from in vitro pain models. In these models, compositions of selected pain mediators are introduced to cultured neurons, which then exhibit greatly increased rapidity of firing and hypersensitization. Sensory neurons such as dorsal root ganglion neurons are known to send pain signals to the brain. Sensory neurons, such as dorsal root ganglion neurons, may be exposed to pain mediator compositions in a well of a multi-well plate to create model neuronal signals that would be experienced by the brain as pain. Test compounds can be introduced into the model to screen for compounds that return neuronal signals to a baseline state in the presence of the pain mediator composition.

FIG. 1 provides an exemplary method 101 of the invention for assaying biological activity. The method includes providing a sample 103 comprising cells having optical reporters of cellular activity. Cells with the optical reporters may include, for example, neurons, muscle cells, HEK cells, cardiomyocytes, endocrine cells and/or engineered cells. Preferably, the sample includes the cells in wells of a multi-well plate.

The optical reporters of cellular activity may include reporters used in optogenetic assays. The reporters may include, for example, fluorescent reporters of membrane electrical potential, an action potential, a synaptic signal, a change in intracellular ion concentration, and/or a change in concentration of intracellular mediators occurring in cell cytoplasm of withing specific intracellular compartments, or changes in the membrane potential occurring in membrane defined intracellular compartments including mitochondria, lysosomes, endoplasmic reticulum and other compartments. An exemplary reporter of cellular activity may include transmembrane proteins that generate an optical signal in response to changes in membrane potential. When excited with a stimulation light at a certain wavelength, such a reporter is energized to produce an emission light of a different wavelength, which indicates a change in membrane potential. Archaerhodopsin-based proteins QuasAr2 and QuasAr3, are such reporters, which are excited by red light and produce a signal that varies in intensity as a function of cellular membrane potential. Similarly, the reporters may include reporters of intracellular ion concentration, such as a genetically-encoded calcium indicator (GECI). Exemplary GECIs include GCaMP or RCaMP variants such for example, jRCaMP1a, jRGECO1a, or RCaMP2.

The method 101, further includes stimulating 105 the sample with a reference stimulus that causes the cellular activity. In an optogenetic assay, the stimulus may be light of a particular wavelength, which stimulates an optically modulated actuator of cellular activity. Exemplary optically modulated actuators include light-gated ion channels, such as algal channelrhodopsins, including CheRiff. When a stimulating light beam hits actuators such as CheRiff, it causes a conformational change in the protein, thereby initiating a change in membrane potential in a cell expressing the protein. In certain aspects, this reference stimulus is a saturating stimulus that indicates definitive activation of an optically modulated actuator of cellular activity.

The method 101 also includes detecting 107 an optical reference signal from the optical reporters, which was caused by the reference stimulus. In an optogenetic assay of the invention, this may include detecting emission light from a reporter, such as QuasAr2, which indicates a level or change in membrane potential caused by activation of CheRiff by the reference stimulus. In certain aspects, when the sample is in wells of a multi-well plate, detecting 107 may include detecting an average level of emission light, including over time, from one or more optical reporters in a well.

The method 101 may also include exposing 109 the sample to test conditions modeling a biological and/or chemical stimulus of cellular activity. In certain aspects, exposing may include stimulating a sample with one or more wavelengths of light to stimulate one or more optical actuators of cellular activity in the cells of the sample. This may include stimulating the actuators with stimulating light at specified intervals or intensity. Once stimulated, the actuators may cause a cellular activity that models a specific in vivo condition. For example, stimulating CheRiff with stimulating light in a certain manner (e.g., frequency, intensity, and duration) may lead to a particular membrane potential, indicative of a certain neural condition, like pain. Alternatively or additionally, a compound or mediator may be added to the sample, which has the potential or is known to change the activity of the cells in the sample. For example, a compound that modulates an activity reported by an optical reporter can be used.

After exposing 109, signals from the optical reporters are detected 111. These detected signals 111 are calibrated 113 with the detected 107 reference signals to predict a level of activity of the cells in response to the modeled biological and/or chemical stimulus.

In certain aspects, after the signals are calibrated, a test compound can be introduced to the sample to ascertain its effect on the cells.

Figure 2:
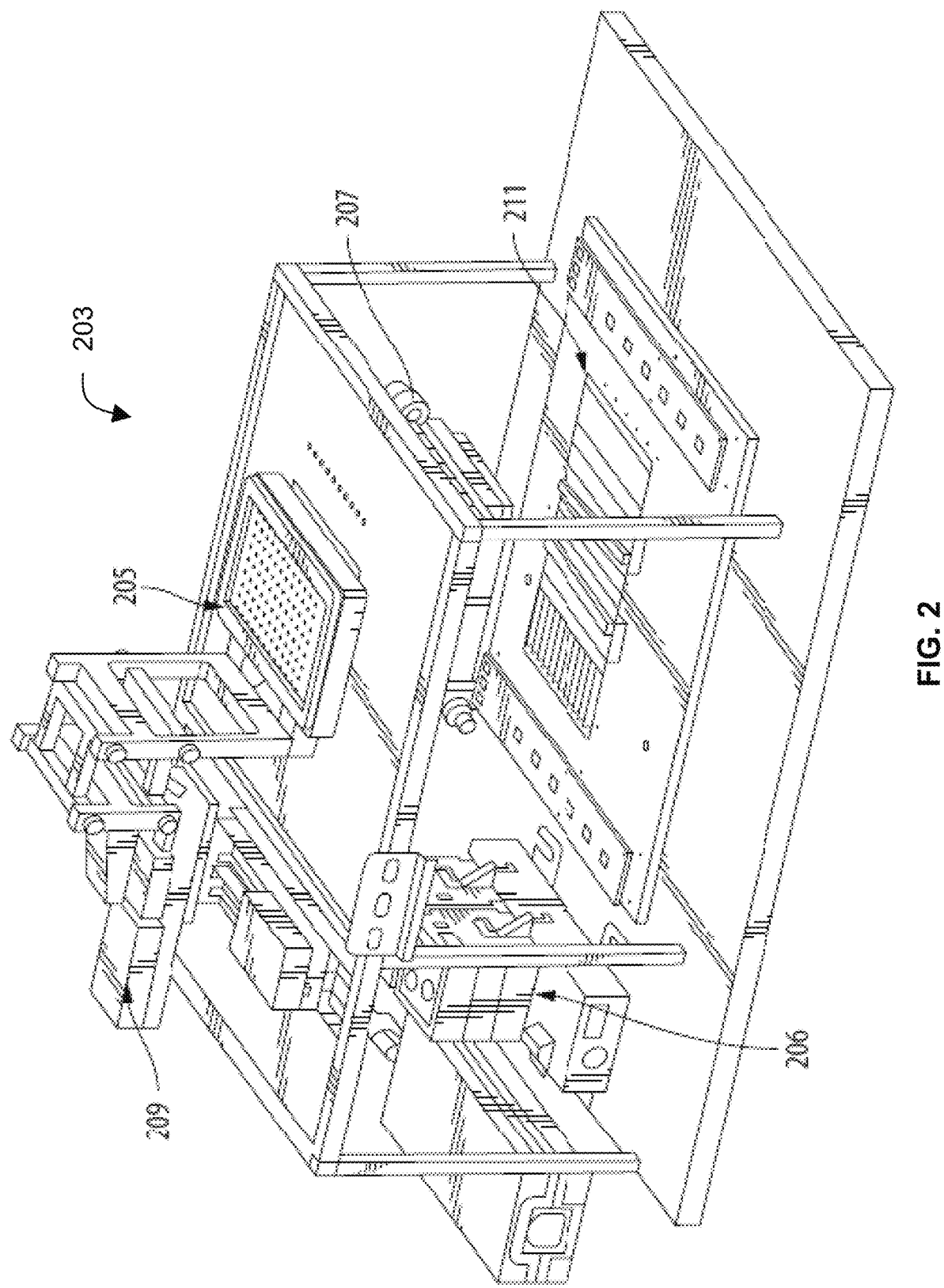
FIG. 2 provides a schematic of an exemplary plate reader of the invention.

FIG. 2 shows a schematic of a plate reader 203 that can be used with the methods and systems of the invention. A multi-well 205 plate with a sample is positioned on the plate reader 203. The multi-well plate 205 may be, for example, a 48-, 96-, 384-, or 1,536-well plate. One or more wells of the multi-well plate may include the cells of the sample. One or more motor control unit 206 drives operations of the plate reader 203.

The multi-well plate reader 203 includes a plurality of objectives 207 that are arranged to read optical signals from a plurality of individual wells of the multi-well plate 205. The plate reader 203 may read optical signals from a plurality of wells of the multi-well plate simultaneously. The multi-well plate may include an optical reference standard in a plurality of the wells of the multi-well plate 205.

In certain aspects, the plate reader, 203 includes a plate pusher or translation stage 209 to align the wells of the multi-well plate 205 with the objectives 207. The plate reader may also include signal/driver boards to send optical signals to a processing system.

Returning to the method 101 and the plate reader 203, when using the plate reader 203 to perform the method 101, the method 101 may include a step of adaptive mapping 104. Adaptive mapping allows a plate reader to measure specific wells of a multi-well plate simultaneously using a plurality of objectives on two read heads.

Figure 3:
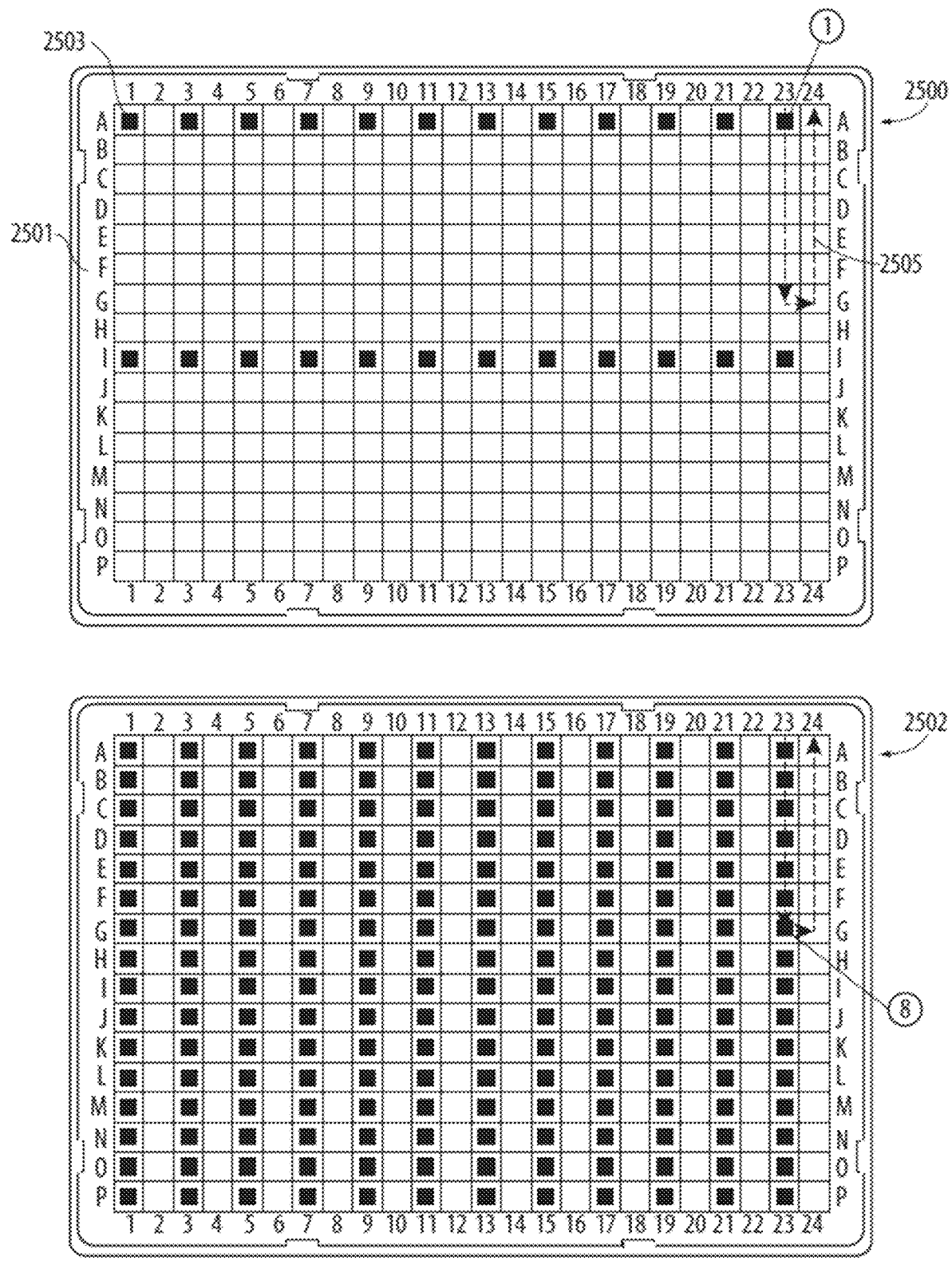
FIG. 3 shows an exemplary imaging path over wells in a plate reader of the invention.

FIG. 3 shows an imaging path over wells using a plate reader of the invention using a plurality of objectives to image across a multi-well plate. Specifically, the figure shows a multi-well plate 2500. The plate 2500 is positioned such that a particular objective is located at a specific well of the plate, in this case at well A,1 defined by the coordinate system 2501 of the plate 2500. The plate reader may be provided with a configuration file, which provides the distance between the objectives. Thus, when a particular objective is aligned with well A,1, the system may interpolate the positions of the other objectives in relation to the wells of the plate.

In FIG. 3, the squares 2503 indicate the locations of the objectives at the first image or field of view (FOV). In this exemplary embodiment, the plate reader has 24 objectives across two read heads as described herein. A plate pusher or translation stage moves the plate such that the objectives iteratively scan wells in accordance with the path 2505. After eight images/FOVs coupled with a movement between each, the plate reader has measured half the wells of the plate 2503. By completing the path 2505, every well of the plate will be individually measured using an objective of the plate reader.

Figure 4:
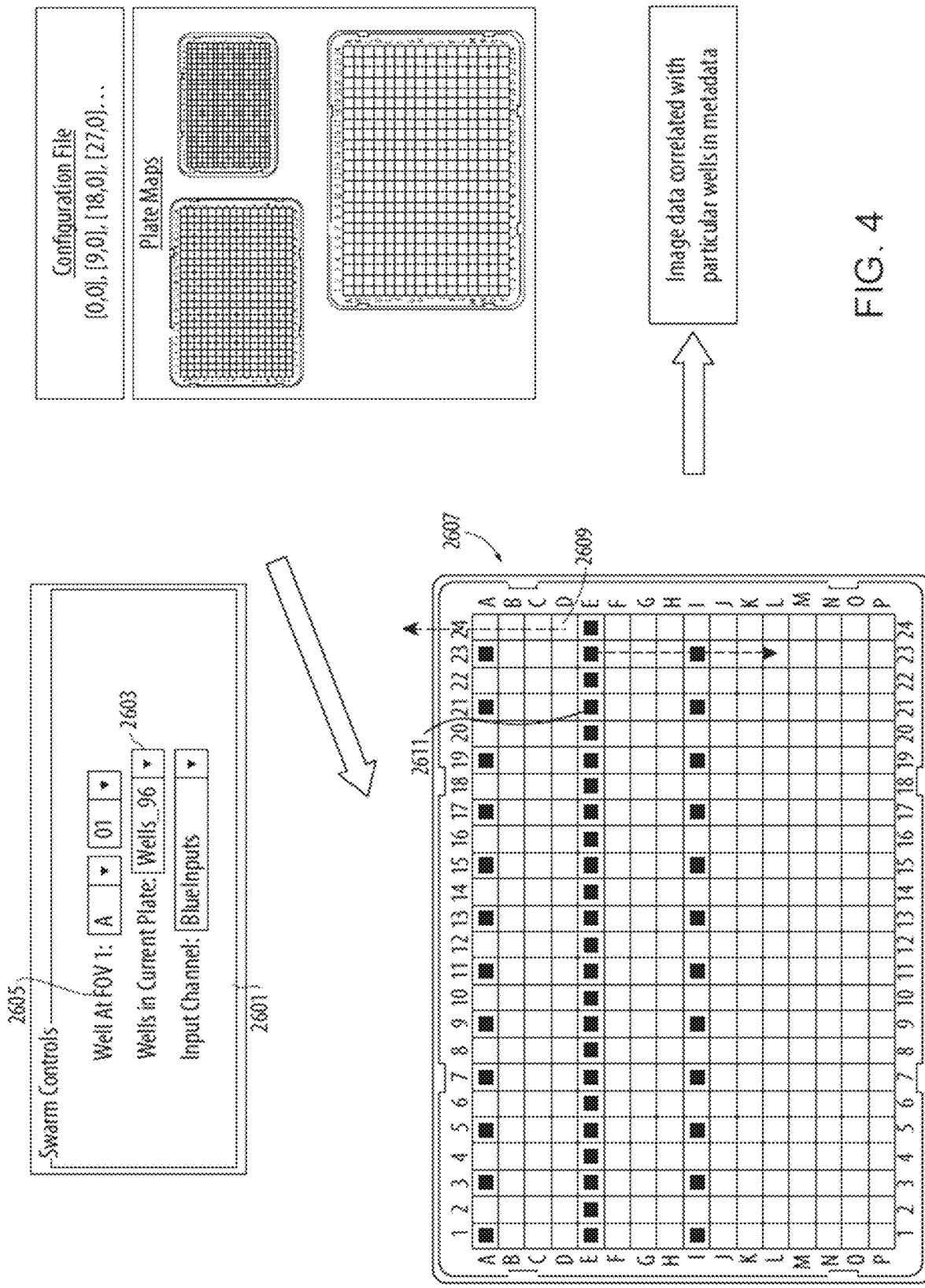
FIG. 4 shows aspects of an adaptive mapping workflow.

FIG. 4 provides aspects of a workflow using an adaptive mapping step. The adaptive mapping step may use software running on, for example, a computer system in communication with a plate reader as described herein and exemplified in FIG. 17.

Using such a system, a user provides an input 2601 that indicates the type of multi-well plate to be imaged 2603, and the alignment of a specified objective with a designated well 2603—in this case well A,1 as described by the naming convention of the multi-well plate.

The system/user may provide a configuration file that defines the distance between objectives on the specific read heads being used. In the exemplified configuration file, the distance between objectives is shown as distances in millimeters using a coordinate system relative to the objective aligned with well A,1. New configuration files may be provided to a plate reader or plate reader system to accommodate new read heads. Similarly, configuration files may be modified to, for example, account for read heads or objectives that require repair and should therefore not be used during a screen.

The system/user may provide plate maps for specific types of multi-well plates, which includes the distances between, and thus locations of, the plate's wells. Software coupled to the plate reader uses the appropriate configuration file, the well alignment at the first FOV, and the appropriate plate map to determine the identity of the wells being imaged by each objective in the first FOV. The system uses this information and provides instructions to the plate reader that cause the objectives to obtain a series of images as the plate is moved 2607 along an instructed path 2609 relative to the objectives. As a result, an image is obtained for every desired well. The system may provide metadata with the obtained images that includes the identity of the well in a particular image.

By tracking the position of the individual objectives in relation to specific wells, users may instruct a plate reader to image only a subset of well on a plate. Thus, if an objective aligns with a well not be scanned 2601, the plate reader may deactivate the objective. Similarly, if a plate reader determine that an objective is not aligned with a well, e.g., because it is positioned beyond the boundaries of a multi-well plate, the system may deactivate the objective for that FOV.

In certain aspects, systems of the invention may incorporate software that automatically correlates the image data and the positional metadata from the plate reader with experimental metadata for each plate/well that is entered by a user.

Figure 5:
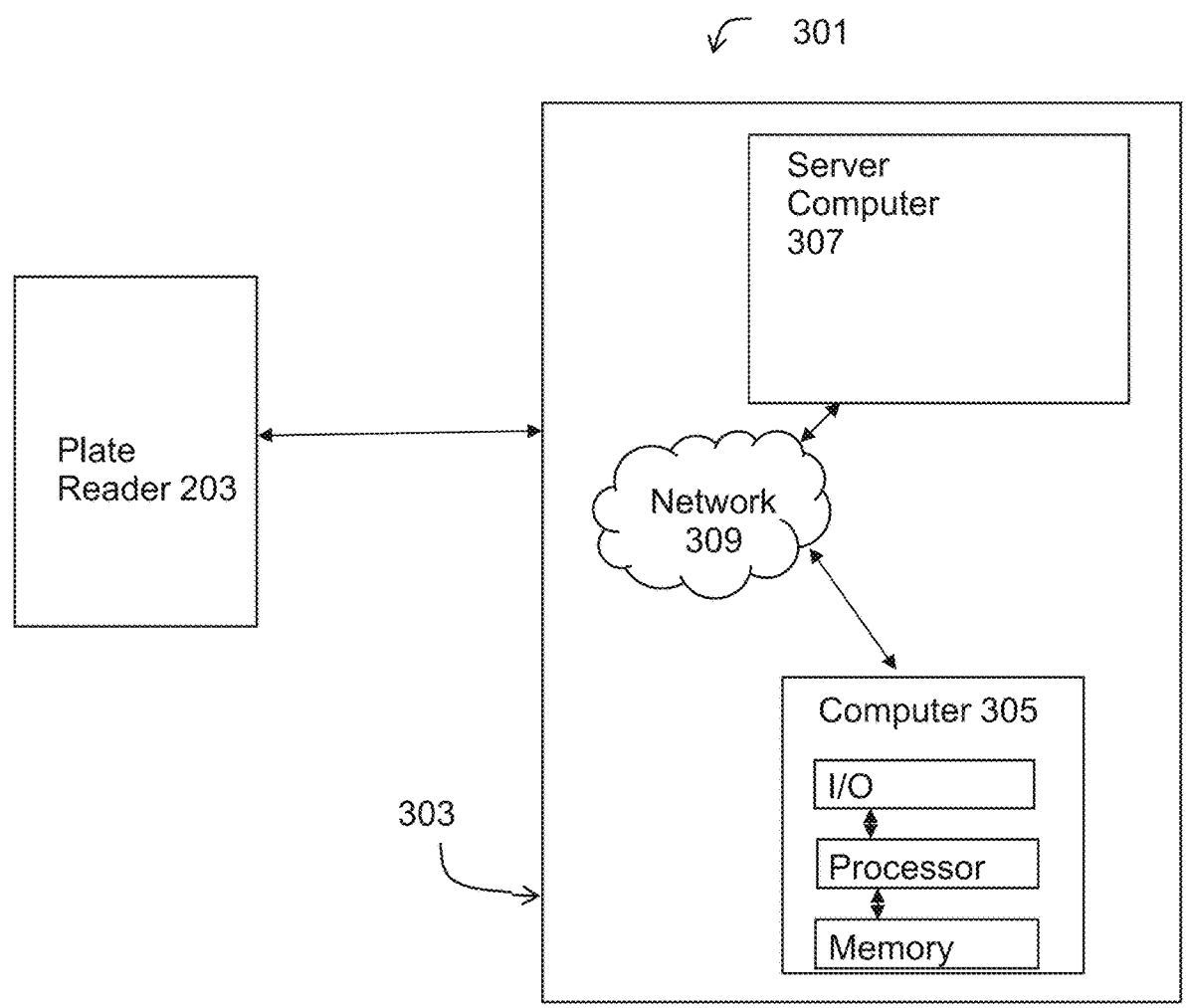
FIG. 5 shows an exemplary system of the invention.

FIG. 5 provides another exemplary system 301 of the invention, which uses the multi-well plate reader 203. The system 301 includes the plate reader 203 and a processing system 303. The processing system 303 may be, or include, a computer 305. Optionally, the processing system 301 may include or access a server computer 307. The one or more of the components of the processing system may communicate with each other or the plate reader 203 via a network 309 connection.

The processing system may include instructions executable to cause the system to read the optical reference standards from the wells via the objectives 207 and calibrate both inter-plate well readings and intraplate well readings for a bioassay. Calibrating may include, for example, reading optical signals test and reference signals from multiple test wells of the multi-well plate 205. Calibrating may correct for inherent variability across in vitro assays, including in vitro neural assays.

In certain aspects, the multi-well plate 205 is a reference plate. The reference plate may be provided to different users to standardize readings across geographic locations, time, and/or bioassay conditions.

Certain methods and systems of the invention include calibrating the optical signals detected of individual wells of a multi-well plate. For example, the optical actuators in the cells in the wells of the plate are stimulated by blue light to stimulate an optical actuator. Over time, the stimulating light can be transmitted to the cells in pulses, ramped up in intensity, and/or provided as a constant stimulus. The disclosed plate readers provide an unmatched ability to transmit stimulation light to individual wells at controlled intensities and wavelengths. As a result, the corresponding optical reporters produce emission light indicative of cellular activity caused by the optical actuators. The emission light is detected over time to provide a measure of cellular activity in response to the stimulating light.

The stimulating light can be transmitted or ramped up to be transmitted at saturating or defined levels. Saturating levels of stimulating light can assure that the optical actuators in the cells will produce a cellular signal. This may include a maximal level of the cellular activity. The optical signal from the reporters at saturating levels can provide the maximum signal a particular well in an assay can achieve. The defined stimulus may provide a measure of cellular activity at a defined level of cell activity, such as at zero mV membrane potential or at the equilibrium potential of a specific membrane conductance mechanism. This may vary across wells of a plate, for example, because wells contain varying numbers of cells expressing the actuators and/or reporters, variability in hardware, and the inherent variability of in vitro assays. A saturating stimulus may be a "reference" stimulus and the resulting the optical signal from a well during the saturated or defined stimulus can provide a "reference" signal. When the cells are exposed to test conditions modeling a biological and/or chemical stimulus of the cellular activity, the optical reporters provide an optical signal indicative the activity. The resulting "test" signal from a well can be calibrated using the "reference" signal to ascertain the cellular activity caused by exposure to the test conditions.

Reference stimuli may be a biological and/or chemical stimuli. When using a chemical reference stimulus, a saturating stimulus includes a concentration of a particular compound that causes activation or inhibition of a cellular activity, which can be used as a reference signal.

In certain aspects, the reference signal is obtained by providing a reference signal until a certain threshold or activity is met. For example, providing optical actuators in the cells with stimulating light for a duration and/or intensity until the cells in the cell produce a signal indicative of an action potential or regenerative signal. The reference signal can also be a signal indicative of a certain biological state, such as a tissue associated with a specific type of pain signal, a tumor, or other disease or condition. In certain aspects, the reference stimulus In certain aspects, the reference signal from multiple or all wells of a multi-well plate are averaged to provide a reference signal to which test signals from individual wells are calibrated.

Figure 6:
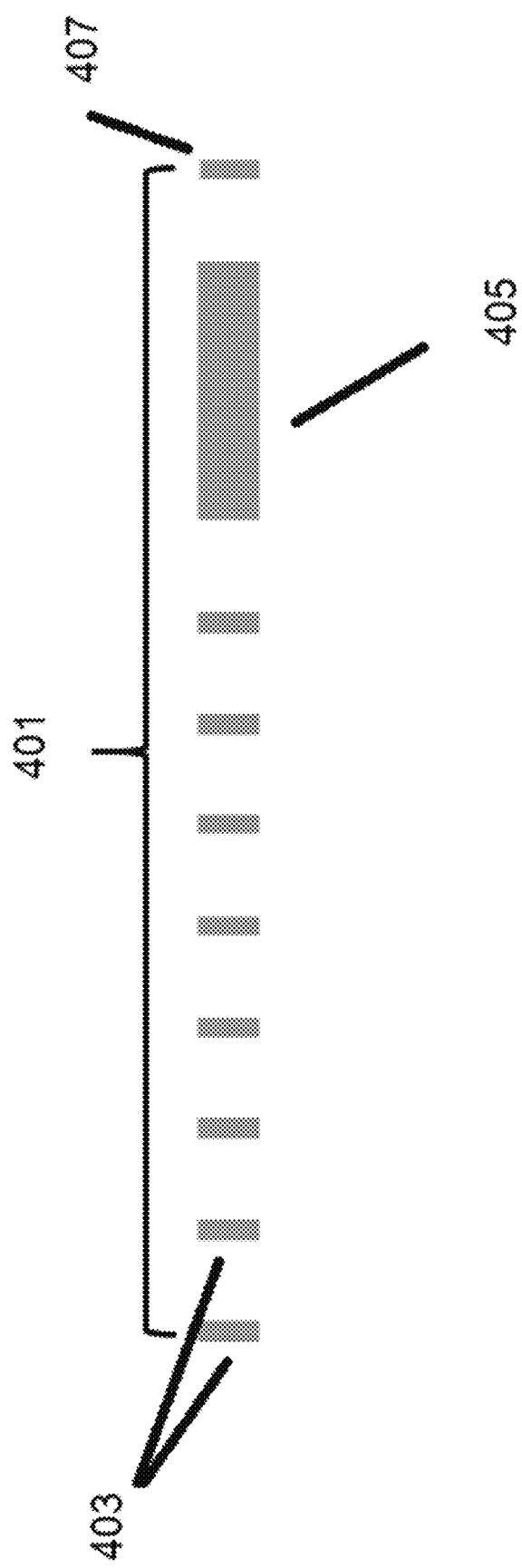
FIG. 6 shows a schematic of light used as reference and test signals.

FIG. 6 provides an exemplary schematic 401 of an assay in which blue light is used as a stimulus to provide a reference stimulus and modeled biological conditions. The cells in the assay are in multi-well plates and caused expressed, for example, a fluorescent voltage reporter, an optical actuator to modulate membrane potential. Short pulses of stimulating light (403, 407) may be transmitted to the sample to simulate the actuator, and model a biological condition, such as an action potential. Optical signals detected as a result of these test pulses are test signals. A steady-state pulse of blue light 405 is used as the reference stimulus. The optical signals detected during the test pulses (403, 407) can be calibrated to the reference pulse 405. In certain aspects, the steady-state reference pulse 405 provides a reference signal that, due to its intensity and/or duration, saturates the sample, and is thus not sensitive to interference from components in the assay, including test compounds.

Figure 7:
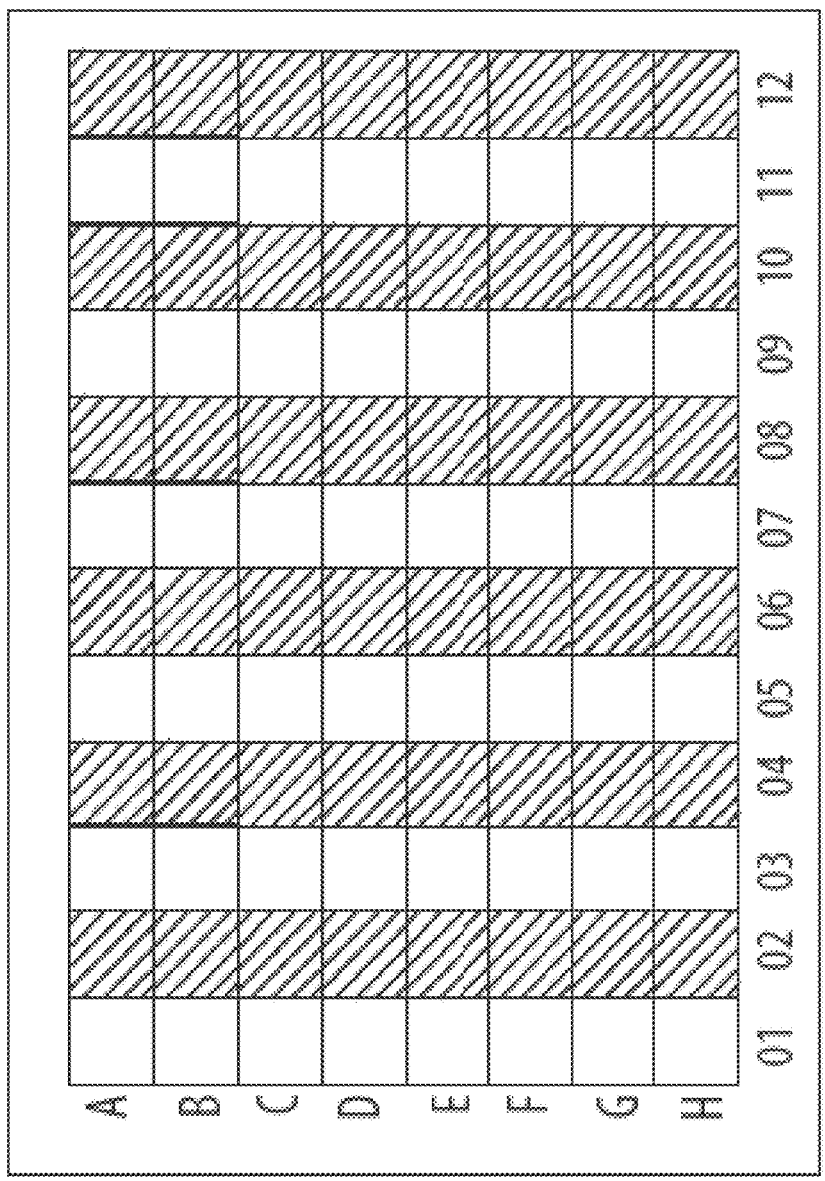
FIG. 7 shows an exemplary sentinel plate.

FIG. 7 provides a "sentinel plate" 501, which can be used in the methods and systems of the invention. This exemplary "sentinel plate" is a 96-well plate. However, plates of any size can be used with the methods and systems of the invention, including 48-, 384-, and 1536-well plates.

In the example, the plate includes wells that are labeled "healthy" and "disease". The "healthy" wells can include cells with optical reporters, that when stimulated 105 with the reference signal, provide an optical signal that is detected 107 as the optical reference signal. The "disease" wells can include cells with optical reporters, which are exposed 109 to the test conditions modeling a biological and/or chemical stimulus of cellular activity. The "disease" wells may include, for example, cells with a known genetic mutation that corresponds to a particular disease or condition, cells expressing optical actuators that cause a phenotypic response when activated that is characteristic of a disease or condition, and/or one or more compounds or mediators that cause the cells to respond in a manner characteristic of a disease or condition.

In the systems and methods of the invention, the optical reference signal read from the "healthy" or reference wells can be used to normalize the optical test signal from the "disease" or test well that model a particular biological and/or chemical stimulus of cellular activity.

Figure 8:
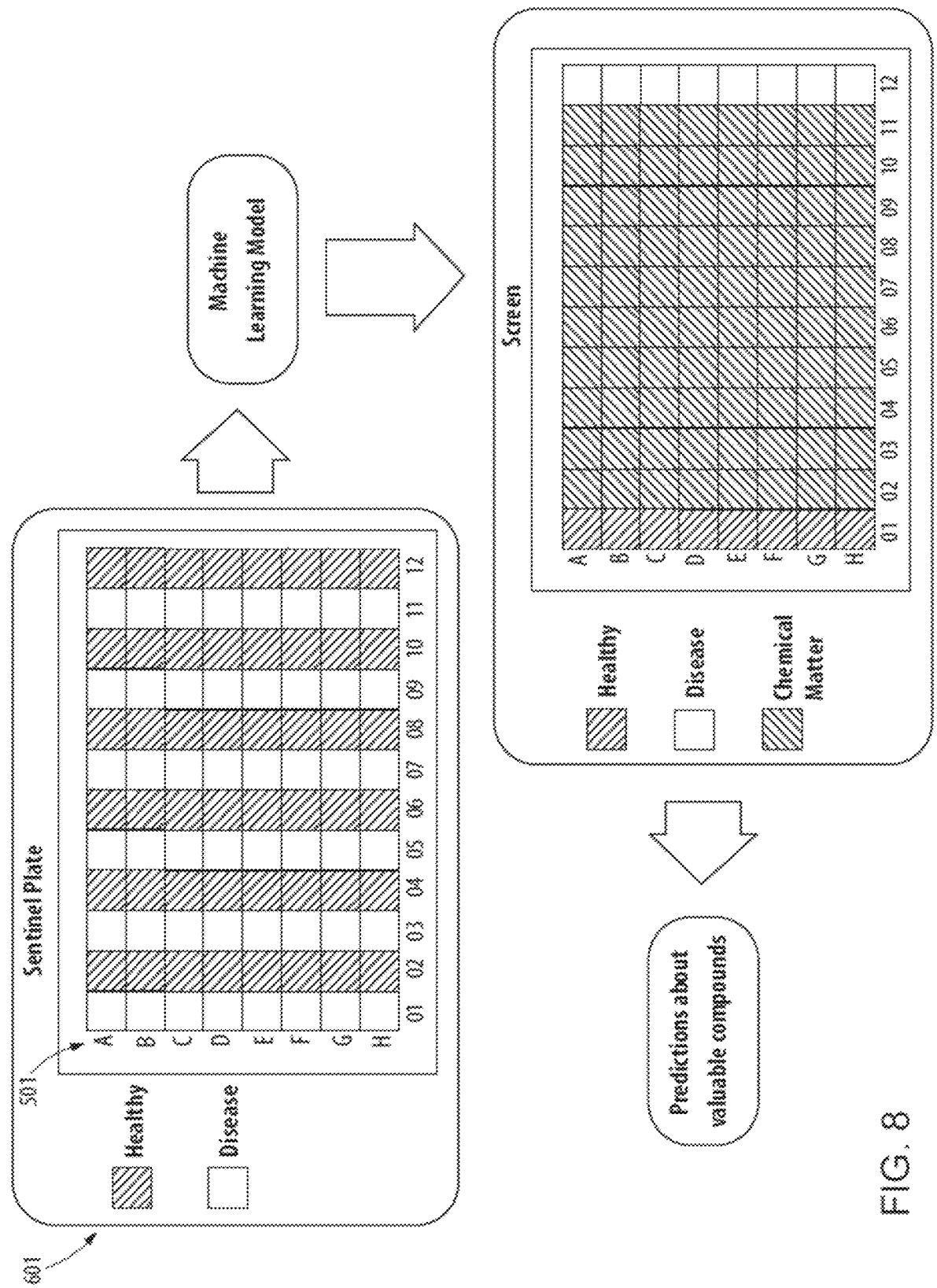
FIG. 8 shows exemplary method using a sentinel plate according to the invention.

FIG. 8 provides an exemplary method 601 using the sentinel plate in accordance with the methods and systems of the invention. In certain aspects, the sentinel plate 501 is used to reveal phenotypic characteristics of reference/ "healthy" and test/"disease" cells in a sample using the optical reference and test signals. A machine learning model in communication with, or a part of, the processing system 303 can be used to ascertain these characteristics. A plate, which may or may not be the sentinel plate 501, is prepared in which reference/"healthy" and test/"disease" cell wells have a stimulus introduced, for example, a chemical compound under investigation. Some of the reference/"healthy" and test/"disease" cell wells of this plate can be left free of this stimulus to allow an inter-plate normalization.

Figure 9:
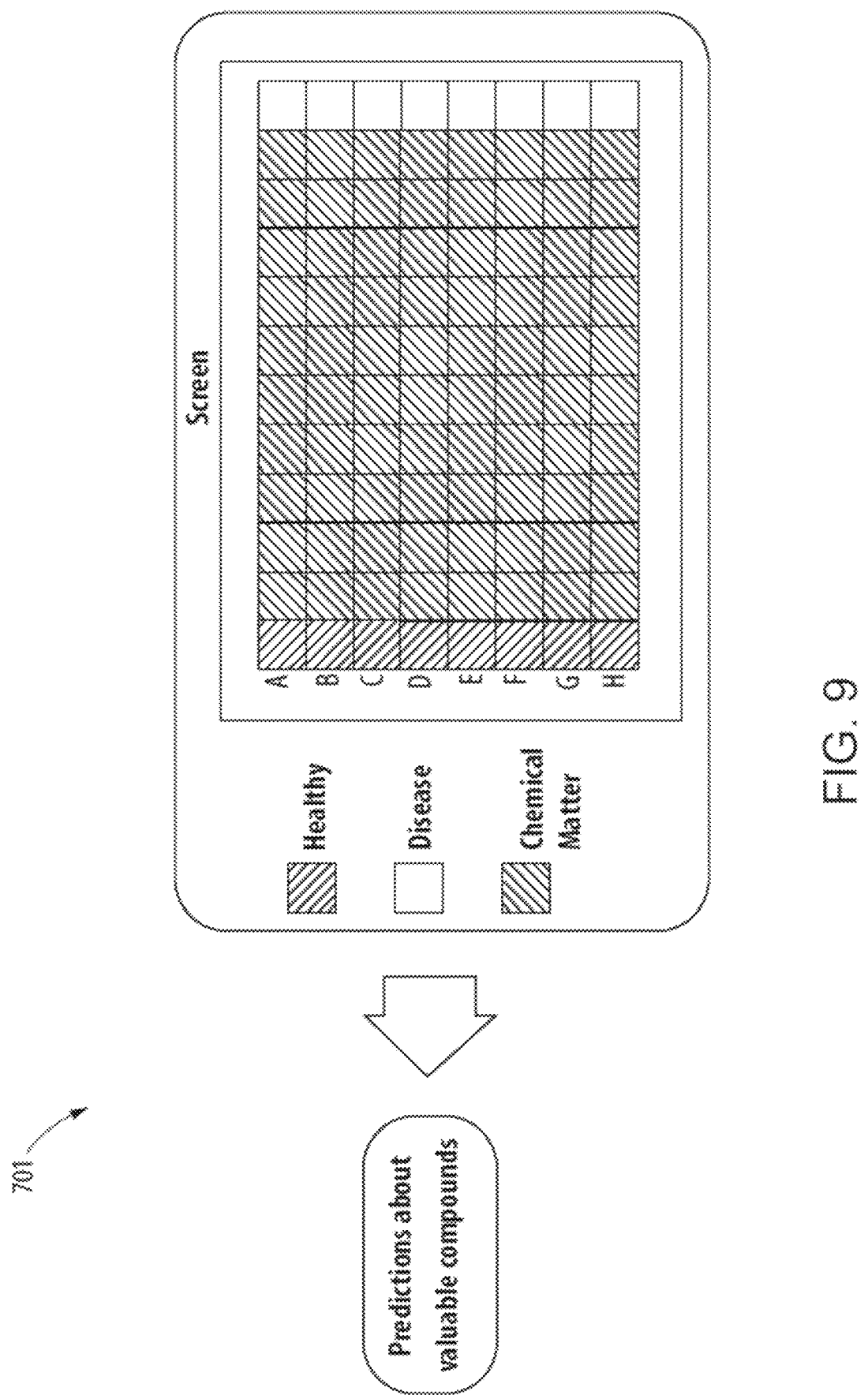
FIG. 9 shows a schematic of a method of the invention.

FIG. 9 provides an alternative or derivative method 701 to that of method 701. Once the phenotypic characteristics are known, it may not be necessary to use a sentinel plate 501. Rather, a simple internal normalization is all that is required to produce accurate screening results.

Figure 10:
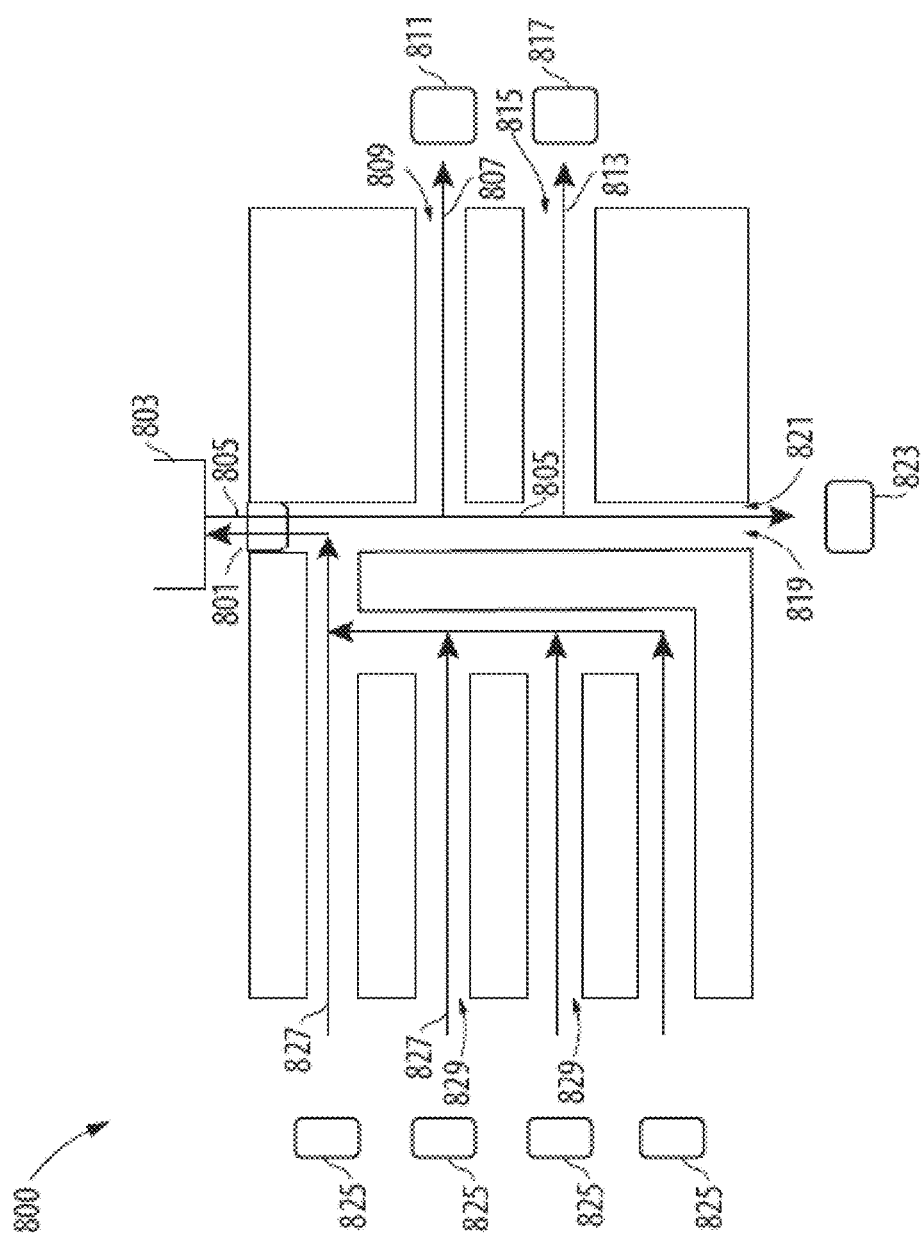
FIG. 10 shows an exemplary optical channel module.

FIG. 10 provides a general schematic of an exemplary independent optical-channel 800 of an optical-channel module used in a multi-well plate reader used in the methods and systems of the invention. The optical-channel 800 includes an objective lens 801, that aligns with a well 803 of a multi-well plate. Emission light 805 of different wavelengths, such as that from fluorescent reporters, passes along different optical paths to corresponding light detectors. In the exemplary optical-channel module 800, emission light of a first wavelength 807 is passed along a first optical path 809 to a first light detector 811. Emission light of a second wavelength 813 is passed along a second optical path 815 to a second light detector 817. Emission light of a third wavelength 819 is passed along a third optical path 821 to a third light detector 823.

The optical-channel module 800 also includes light sources 825 that transmit stimulation/excitation light at different wavelengths 827, each wavelength along a different optical path 829 through the objective lens 801 to the well 803, which contains a sample. The light sources 825 can independently include an LED, a diode laser bar, a laser, a diode laser, or any other suitable light source. Each light source (825) may be configured to transmit stimulation/ excitation light that is both spectrally distinct from the stimulation/excitation light of each other light source (825) and from emission light from the sample. One or more of the optical paths (829) along which the stimulation/excitation light (827) travels may include one or more dichroic mirrors to reflect the stimulation light through the optical paths and upwards onto the sample. The dichroic mirrors may be configured to allow the emission light (807, 813, 819) from the sample to pass downward through the mirrors and along the emission light optical paths (809, 815, 821) to the detectors (811, 817, 823).

In certain aspects, one or more of the light sources (825) transmits light at a wavelength capable of stimulating a light-sensitive actuator protein. The light-sensitive actuator protein may be, for example, a light-gated ion channel, such as CheRiff, and the wavelength of the stimulation light can be, for example, between 450 and 495 nm. The stimulation light may have an intensity of about 22 mW/cm$^2$. In certain aspects, one or more of the light sources (825) transmits light at a wavelength capable of exciting a microbial rhodopsin, such as QuasAr2 or QuasAr3. The wavelength of the excitation light may be, for example, between 580 and 650 nm. The excitation light may have an intensity between 0.01 W/cm$^2$ and 400 W/cm$^2$ and preferably about 100 W/cm$^2$ for QuasAr. Concurrently or alternatively, one or more of the light sources may, for example, provide stimulation light with a wavelength capable of exciting a light-sensitive reporter protein such as a light-sensitive calcium-indicating protein.

In some embodiments, the stimulation/activation light sources independently include one or more of a diode laser bar, a diode laser, another type of laser, or an LED. The illumination light delivery may include fiber optics. The stimulation/excitation light sources may be part of a stimulation/excitation light subsystem, which may include baffles positioned to prevent unwanted reflected or refracted stimulation/excitation light from entering the objecting lens. The stimulation/excitation light subsystem may also have other beam shaping optics disposed within one of the optical paths along which the stimulation light travels.

As the plate readers allow simultaneous transmission of stimulating/excitation light and detection of emission light of different wavelengths, the plate readers, when used in the methods and systems of the invention, can perform complex assays involving numerous optically actuated and/or detectable proteins.

Thus, samples used methods and systems of the present invention can include cells expressing an optical actuator of electrical activity and an optical reporter of electrical activity. The sample may be configured such that a first cell expresses the actuator and a second cell expresses the reporter. The plate reader can stimulate the light-sensitive actuator protein with a stimulating light beam to cause a conformational change in the protein, thereby initiating a change in membrane potential in the cell. The result is that the cell "fires," i.e., an action potential or regenerative signal that propagates in the electrically-active cell. The plate reader can simultaneously transmit an excitation light beam to a fluorescent optical reporter protein with a beam that is spectrally distinct from that used to stimulate the optical reporter. The plate reader can measure the fluorescence emitted by the reporter to measure corresponding changes in membrane potential.

One example of environmentally sensitive fluorescent reporters for use with the present invention are rhodopsin-type transmembrane proteins that generate an optical signal in response to changes in membrane potential, thereby functioning as optical reporters of membrane potential. Archaerhodopsin-based protein QuasAr2 and QuasAr3, are excited by red light and produce a signal that varies in intensity as a function of cellular membrane potential. These proteins can be introduced into cells using genetic engineering techniques such as transfection or electroporation, facilitating optical measurements of membrane potential. The plate readers of the invention can excite QuasAr2 or QuasAr3 in a sample using light having a wavelength of between 580 and 650 nm. The light may have an intensity between 0.01 W/cm$^2$ and 400 W/cm$^2$ and preferably about 100 W/cm$^2$ for QuasAr.

In addition to fluorescent indicators, the plate readers can be used to optically activate light-sensitive compounds for chemically or electrically perturbing cells. The invention can be used with voltage-indicating proteins such as those disclosed in U.S. Patent Publication 2014/0295413, filed Jun. 12, 2014, the entire contents of which are incorporated herein by reference. For example, an optical actuator of cellular activity may be a genetically-encoded rhodopsin or modified rhodopsin such as a microbial channelrhodopsin. For example, sdChR, a channelrhodopsin from *Scherffelia dubia*, may be used or an improved version of sdChR—dubbed CheRiff—may be used as an optical actuator. "CheRiff" refers to a version of sdChR that uses mouse codon optimization, a trafficking sequence, and the mutation E154A as described herein. The plate readers may be used with additional reporters and associated systems for actuating them. For example, proteins that report changes in intracellular calcium levels may be used, such as a genetically-encoded calcium indicator (GECI). The plate reader may provide stimulation light for a GECI, such as yellow light for RCaMP. Exemplary GECIs include GCaMP or RCaMP variants such for example, jRCaMP1a, jRGECO1a, or RCaMP2. In one embodiment, the actuator is activated by blue light, a Ca2+ reporter is excited by yellow light and emits orange light, and a voltage reporter is excited by red light and emits near infrared light.

In certain aspects, the systems and methods of the invention can include using optically modulated actuators that are combined with fluorescent reporters to enable all-optical characterization of specific cell traits, such as excitability. For example, the OptoPatch system combines an electrical actuator protein such as CheRiff with a fluorescent reporter such as QuasAr2. The actuator and reporter proteins respond to different wavelengths of light, allowing membrane potential to be measured at the same time cells are excited over a range of photocurrent magnitudes.

Measuring the electrical properties or activities of cells is useful for the study, diagnosis, and cure of diseases that involve electrically active cells, such as heart and brain cells (e.g., neurons and cardiomyocytes). Conditions that affect these cells include heart disease, atrial fibrillation, amyotrophic lateral sclerosis, primary lateral sclerosis, pain, neural disorders, and many others. All-optical measurements provide an attractive alternative to conventional methods like patch clamping because they do not require precise micromechanical manipulations or direct contact with cells in the sample. Optical methods, especially when used with methods and systems of the invention, are more amenable to high-throughput applications. The dramatic increases in throughput afforded by all-optical measurements have the potential to revolutionize study, diagnosis, and treatment of these conditions.

Thus, the present invention provides methods using the disclosed plate readers that include exciting cells in specific wells of a multi-well plate that are to be observed or stimulating a cell to initiate an action potential or regenerative signal. Stimulation may be direct or indirect (e.g., optical stimulation of an optical actuator or stimulating an upstream cell in gap junction—or synaptic communication with the cell(s) to be observed). Stimulation may be optical, electrical, chemical, or by any other suitable method. Stimulation may involve any pattern of activation including, for example, regular, periodic pulses, single pulses, irregular patterns, or any suitable pattern. Methods may include varying optical stimulation patterns in space or time to highlight particular aspects of cellular function. For example, a pulse pattern may have an increasing frequency. In certain embodiments, the methods may include stimulating an electrically active cell that expresses an optical activator using pulses of light.

For example, the plate readers can be used to characterize the physical properties of cells using fluorescent reporters and light-sensitive actuators of cellular activity. Such assays can be designed, for example, to study the effect of a potential drug compound on cells. For example, the plate readers can be used to optically obtain an action potential (AP) and calcium transient (CT) waveform from stem-cell derived cardiomyocytes to characterize an arrhythmia in the cardiomyocytes. Cardiomyocytes in the sample located in a well of a multi-well plate can be caused to express a rhodopsin-type transmembrane optical reporter. The plate reader can activate a microbial channelrhodopsin with stimulating light, causing an AP to propagate through the cardiomyocytes. Cells containing a reporter protein are illuminated via stimulation light from the plate reader, and the AP causes a change in the fluorescence of the reporter. Light from the reporter is detected by the plate reader and analyzed to construct the AP waveform. An arrhythmia in the constructed AP waveform can be detected or characterized, e.g., by comparison to a known standard or other analytical techniques.

The system and methods of the invention using these plate readers can thus be used to study a compound's effect on cells. Since the plate reader can analyze sample found in wells of a multi-well plate, cells of the sample can be observed while in a supporting cell medium. This allows the activity of cells to be analyzed both before and after introduction of a compound of interest, such as a potential drug, to the sample. The plate reader can thus detect a resulting perturbation to the detected AP waveform and other characteristics associated with exposure to a compound. Since the optical reporter can include a voltage reporter, an ion reporter (e.g., for [Ca2+]), others, or combinations thereof, the plate reader can detect the effect of the compound across multiple ion channels of cells as revealed through all features of the AP waveform.

Moreover, because the plate readers can analyze living cells in wells of a multi-well plate, the cells can be exposed to media that includes compounds, such as mediators, that are used to model a particular in vivo condition. For example, mediators may be selected to model the local environment of a tissue associated with a specific type of pain signal, a tumor, or other disease or condition. The cells in these model conditions may be used to discover or develop therapeutic agents associated with a modeled disease or condition.

For example, samples used in the methods and systems of the invention may include cells that provide in vitro pain models. In these models, compositions of selected pain mediators are introduced to cultured neurons, which then exhibit greatly increased rapidity of firing and hypersensitization. Sensory neurons such as dorsal root ganglion neurons are known to send pain signals to the brain. Sensory neurons, such as dorsal root ganglion neurons, may be exposed to pain mediator compositions in a well of a multi-well plate to create model neuronal signals that would be experienced by the brain as pain. Test compounds can be introduced into the model to screen for compounds that return neuronal signals to a baseline state in the presence of the pain mediator composition.

In certain aspects, the plate readers can be used in methods for assaying biological activity using a sample comprising cells having optical reporters of cellular activity, which includes a normalization step.

In an exemplary method, cells in one or more wells of a multi-well plate are stimulated with a reference stimulus that causes a particular cellular activity. The reference stimulus may be a stimulating light transmitted to the sample from the plate reader, e.g., blue light. This reference stimulus may be a saturating or reference stimulus and may be transmitted to all wells of a multi-well plate. One or more wells containing a sample are then exposed to test conditions that model a biological or chemical stimulus of cellular activity. This may include, for example, providing a stimulating wavelength of light to an optical actuator of cellular activity. The plate reader then detects an optical test signal from optical reporters in the cells of the sample caused by the test conditions. The test signal is then normalized to the reference signal to predict the level of activity of the cells in response to the modeled biological/chemical stimulus.

Figure 11:
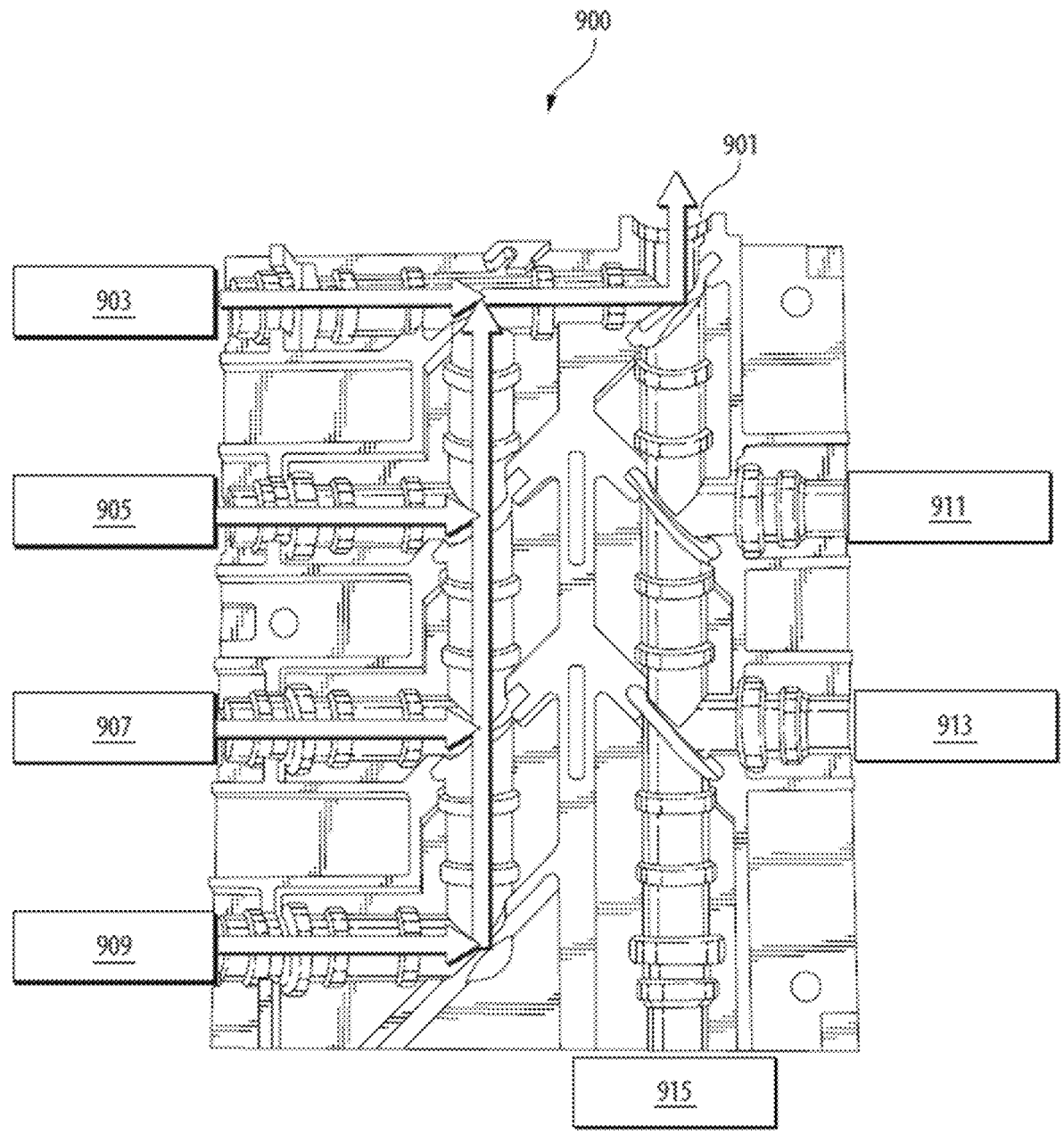
FIG. 11 shows an exemplary optical channel for use in a plate reader of the invention.

FIG. 11 provides a schematic of an exemplary optical-channel 900 of a plate reader. The optical-channel includes an objective lens 901 through which the emission and stimulation light travels. Stimulation light of different wavelengths is transmitted along the different optical paths (903, 905, 907, 909) through the objective lens 901. The emission light optical paths (911, 913, 915) for different emission light wavelengths are also shown.

Figure 12:
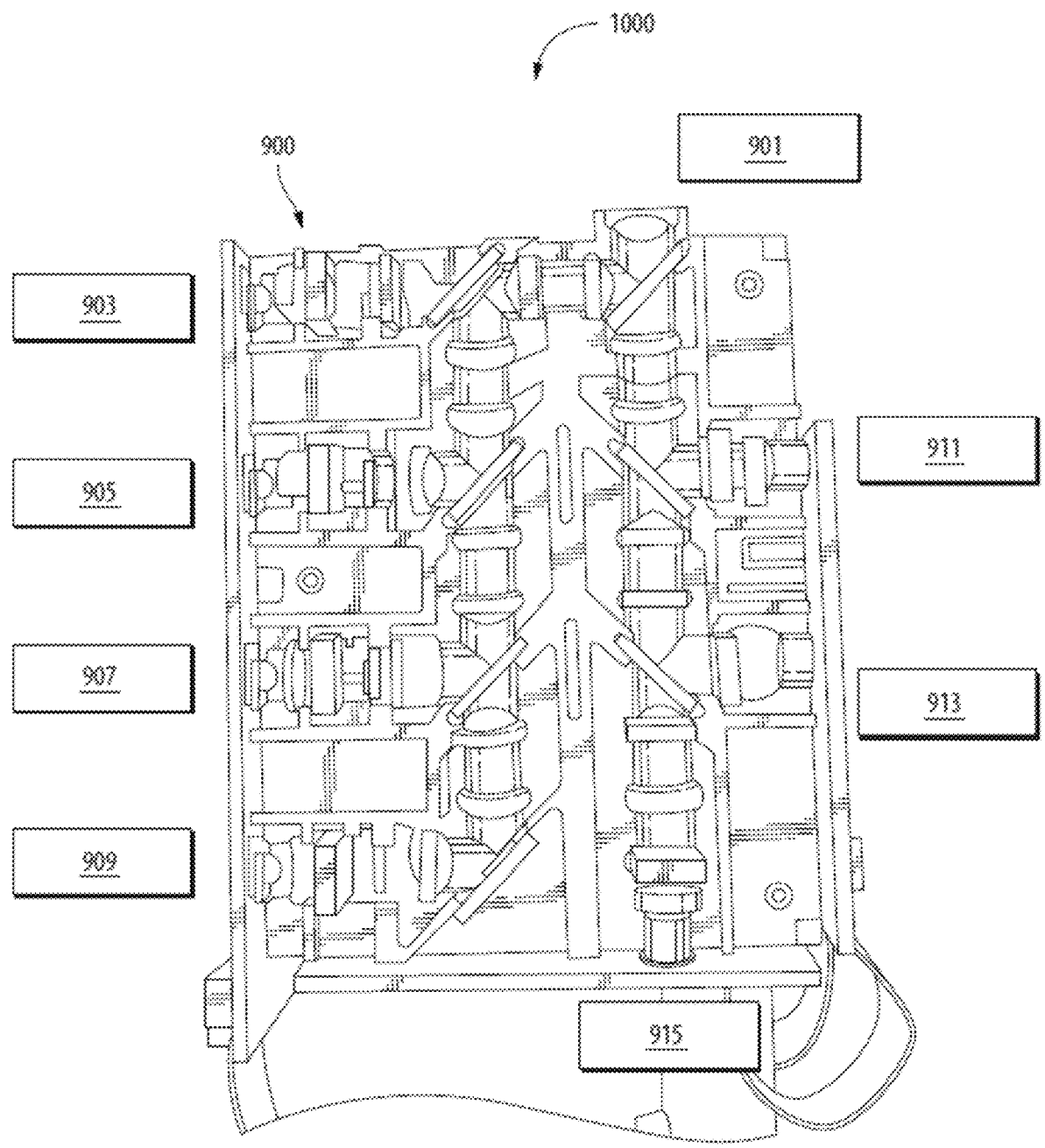
FIG. 12 shows a cross-section of the exemplary optical channel module.

FIG. 12 provides a photograph of a cross-section 1000 of the exemplary optical-channel module 900. As shown, the module 900 and its optical paths (903, 905, 907, 909, 911, 913, 915) include a series of dichroic mirrors, thin film filters, and molded aspheric lenses.

Figure 13:
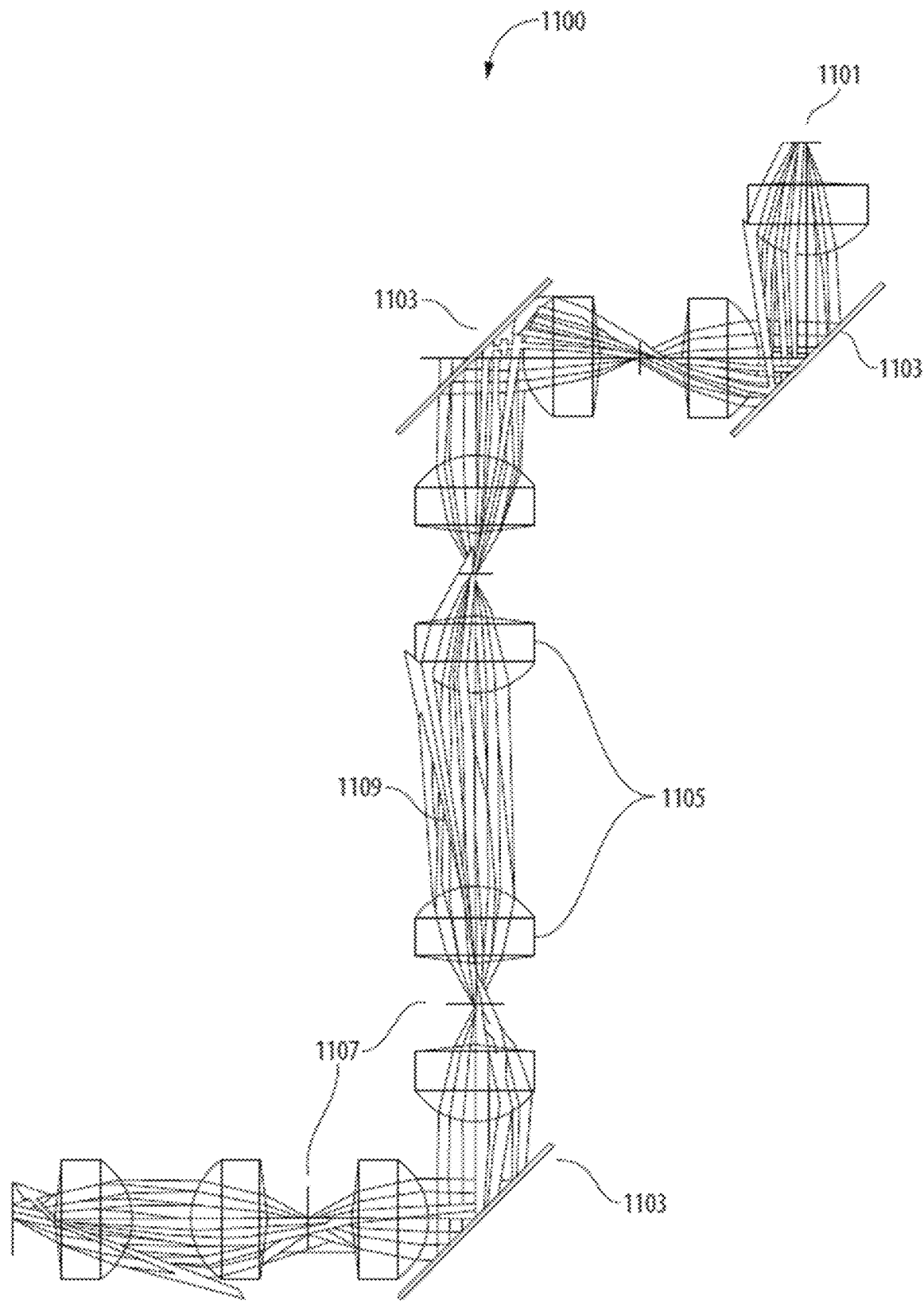
FIG. 13 shows an optical path through an optical channel of the invention.

FIG. 13 provides a schematic 1100 of an exemplary optical path of an optical-channel. stimulation/excitation light 1109 light is passed through a series of dichroic mirrors 1103, thin film filters, patterned mask 1107, and aspheric lenses 1105, and through the objective lens 1101. The present Inventors have discovered that, when used to detect emission light, this arrangement is surprisingly efficient.

In certain aspects, the multi-well plate reader includes a plurality of independent optical-channels and/or optical-channel modules.

Figure 14:
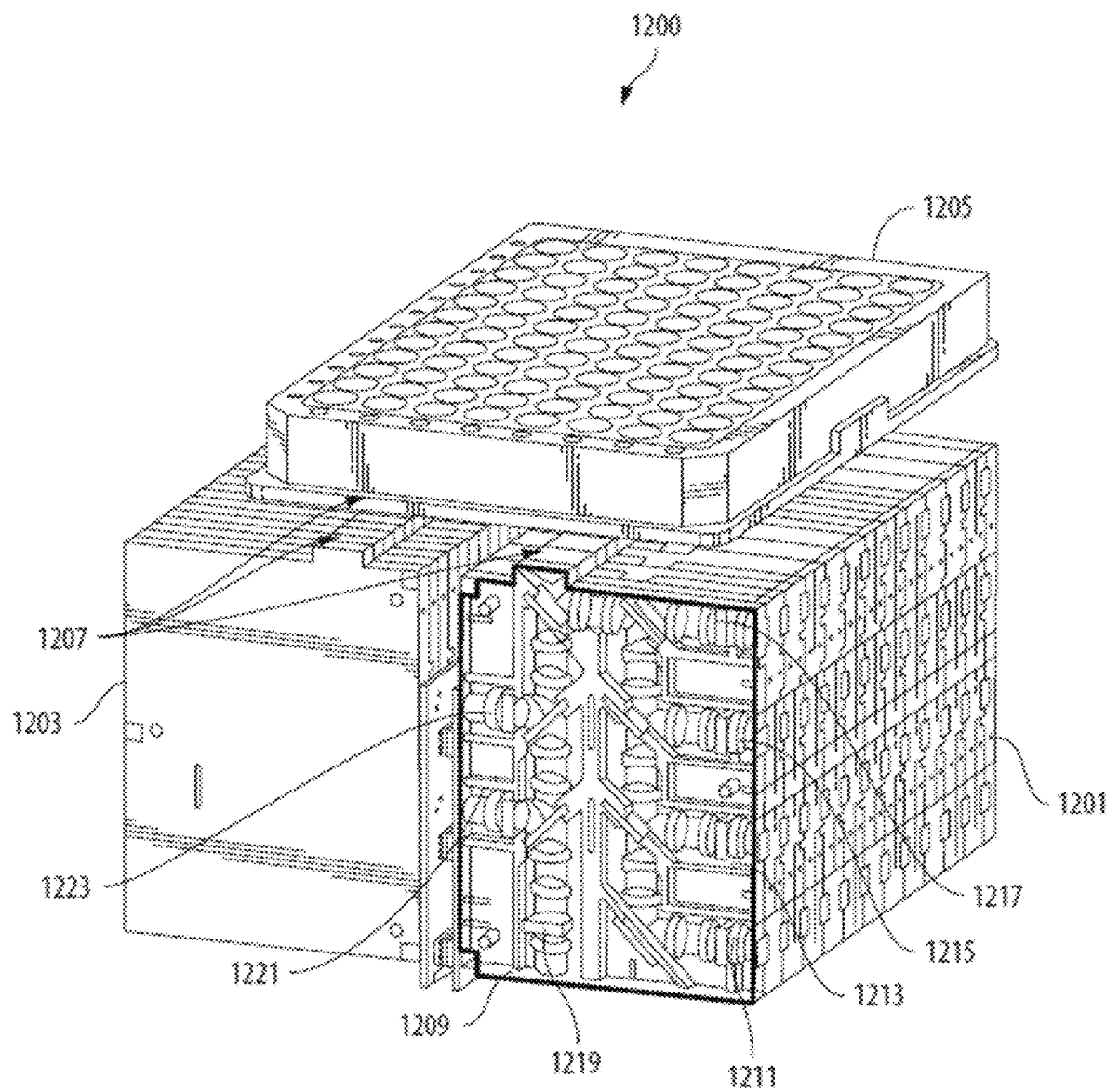
FIG. 14. shows portions of an exemplary plate reader of the invention with two read heads, each with twelve objectives.

FIG. 14. shows a portion 1200 of an exemplary multi-well plate reader. The plate reader includes 2 read heads (1201, 1203), each including 6 independent optical channel modules, and disposed underneath a multi-well plate 1205. Each independent optical channel module includes two independent optical channels. The objective lens 1207 of each independent optical channel is aligned with a different well of the multi-well plate 1205. One of the optical channels 1209 is illustrated as a cross-section to show the stimulation light optical paths (1211, 1213, 1215, 1217) and the emission light optical paths (1219, 1221, 1223).

Figure 15:
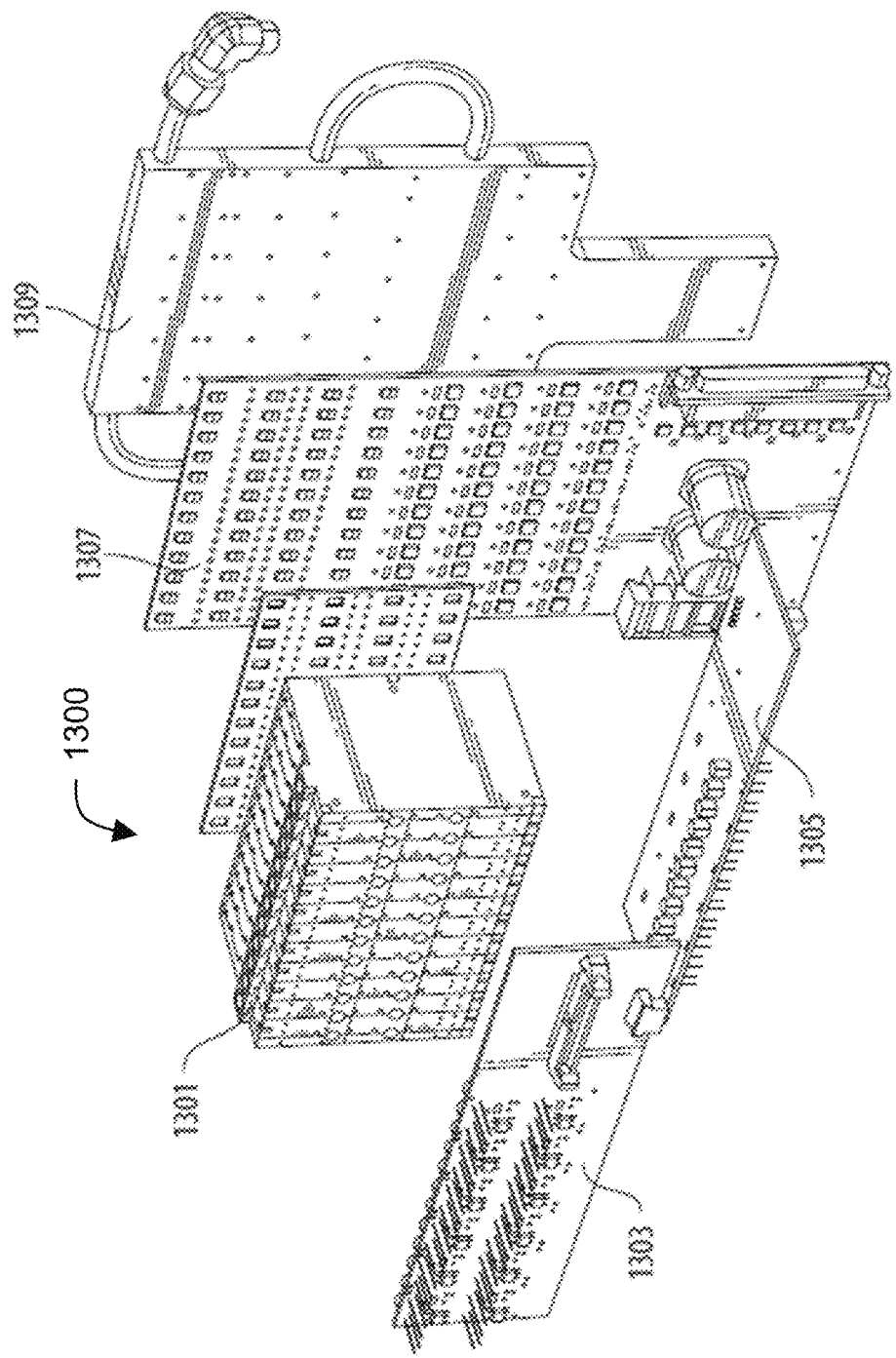
FIG. 15 shows an exploded view of an exemplary read head for use in the invention.

FIG. 15 shows an exploded view of an exemplary read head 1300 of a multi-well plate reader of the invention. The read head includes six independent optical channel modules 1301. Each optical channel module includes two independent optical channels and their respective objective lenses. Each optical channel module is attached to two printed circuit boards (PCB) (1303, 1305), which include photodiodes and independent picoammeter circuits. In the exemplary read head 1300, the PCBs 1303 and 1305 include a total of twelve photodiodes and twelve picoammeter circuits, with three of each devoted to a specific optical channel of an optical channel module. One photodiode and one picoammeter circuit are devoted to detecting an optical signal from emission light of an individual wavelength. The exemplary read head 1300 also includes a PCB 1307 for each optical-channel module that includes 8 high-powered LEDs, four dedicated to providing stimulation light of a different wavelengths for each individual optical channel. The read head also includes a heat exchanger 1309 to cool the LED PCBs.

Figure 16:
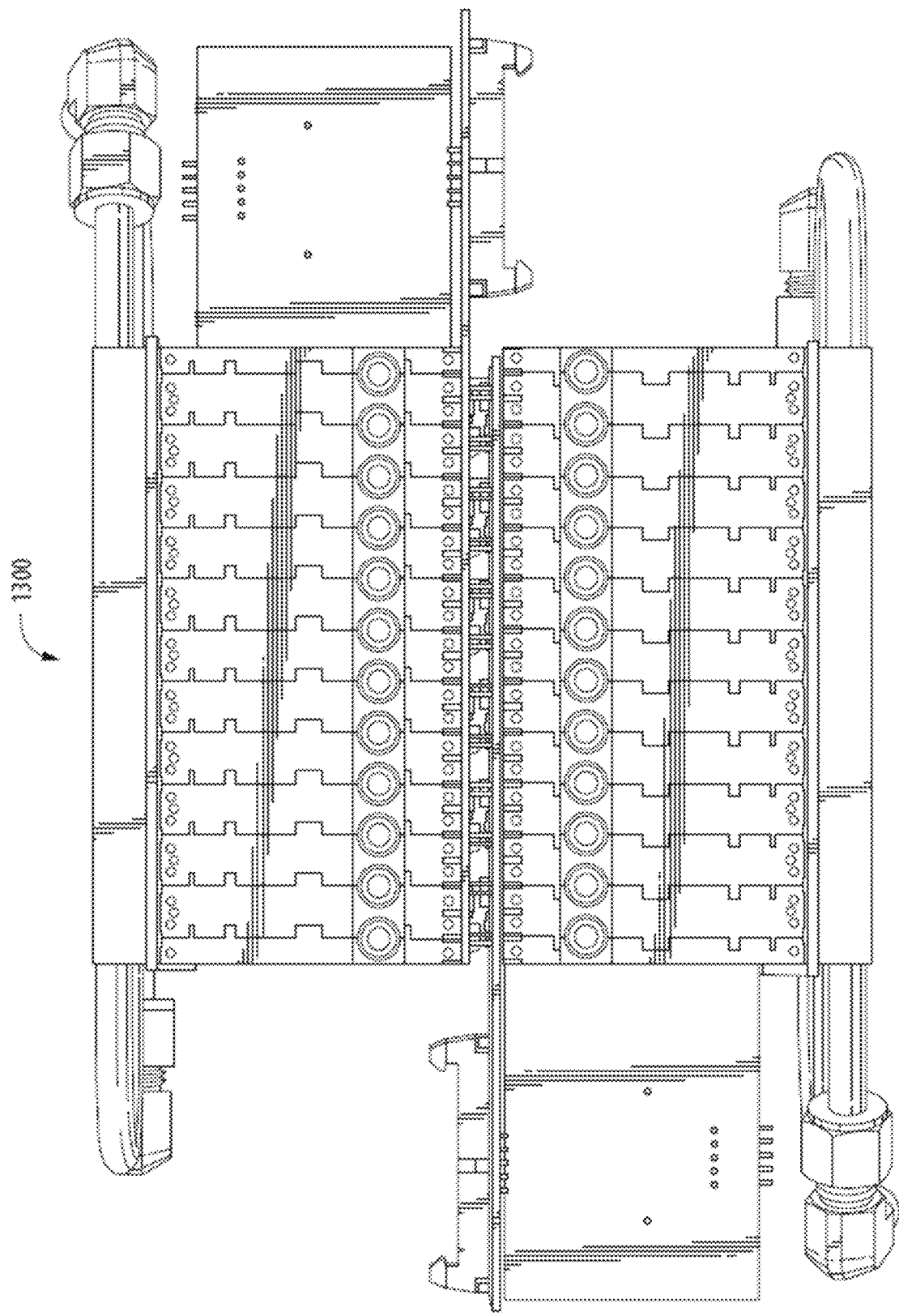
FIG. 16 shows a schematic of an exemplary read head.

FIG. 16 provides a schematic of the exemplary read head 1300 from an alternative view. In this view, the objective lens of each optical channel is readily apparent.

Figure 17:
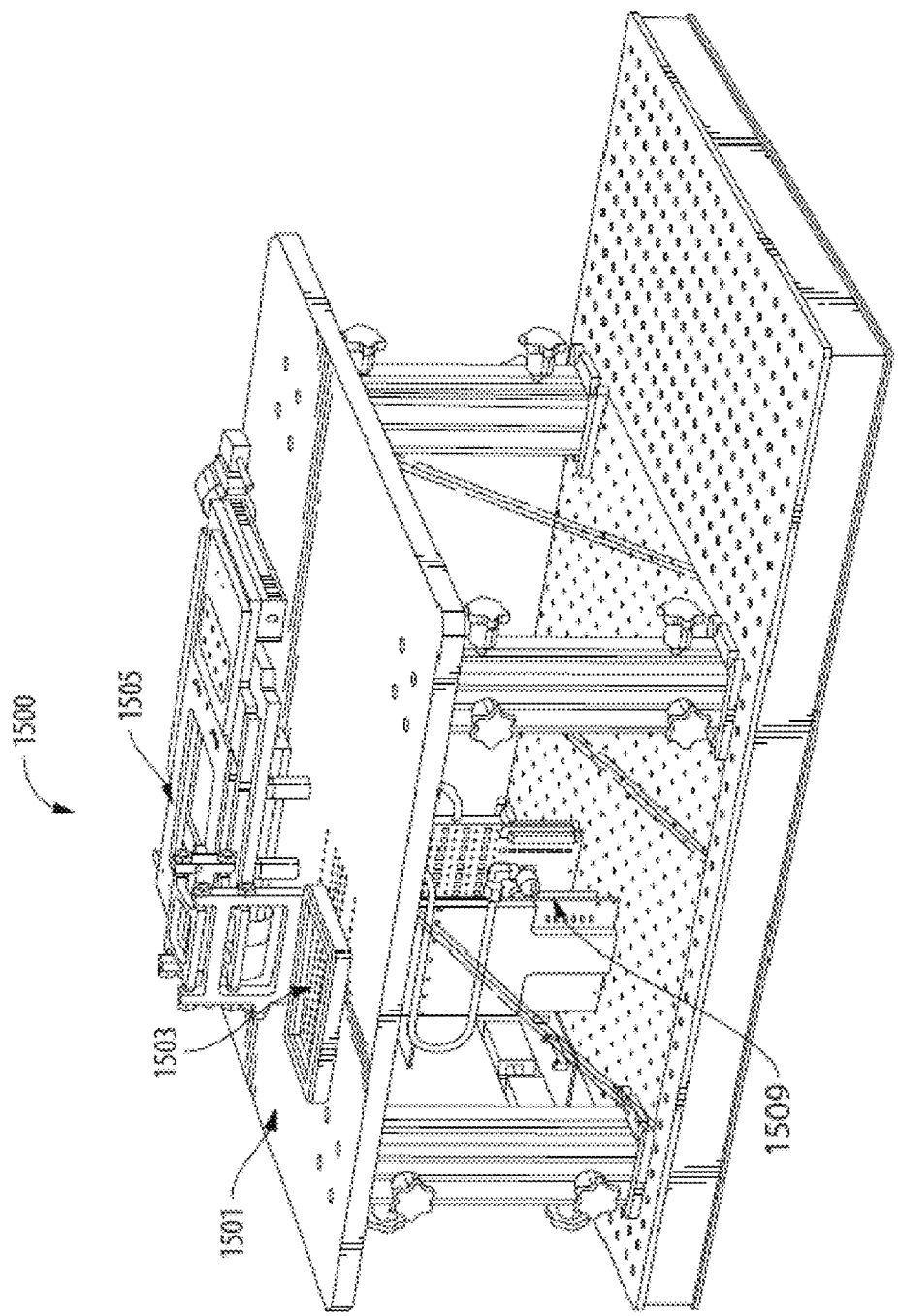
FIG. 17 shows a schematic of an exemplary plate reader.

FIG. 17 provides a schematic of an exemplary plate reader 1500 used in the systems and methods of the invention. A multi-well plate 1503 is disposed on a reading platform 1501 of the plate reader 1500. The plate reader also includes a plate pusher 1505, which translates the multi-well plate 1503 along multiple directions to align the wells of the multi-well plate 1503, such that they align with the objective lenses of the optical channels. The plate reader 1500 also includes motor controllers, which control motors of the plate pusher 1505 in order to align the wells.

The plate reader 1500 also includes signal and/or driver boards 1509. Each optical channel module is connected to a signal/driver board 1509. Each signal/driver board is connected to a power distribution bus and a data acquisition system (DAQ), such as a COMPDAQ from National Instruments Corp. (Austin, TX). The DAQ may provide synchronized analog output control and analog input sampling across the optical channels, and thus the wells of the multi-well plate 1501. The DAQ may be connected by, for example, a USB connection to a workstation running control and/or data acquisition software.

Figure 18:
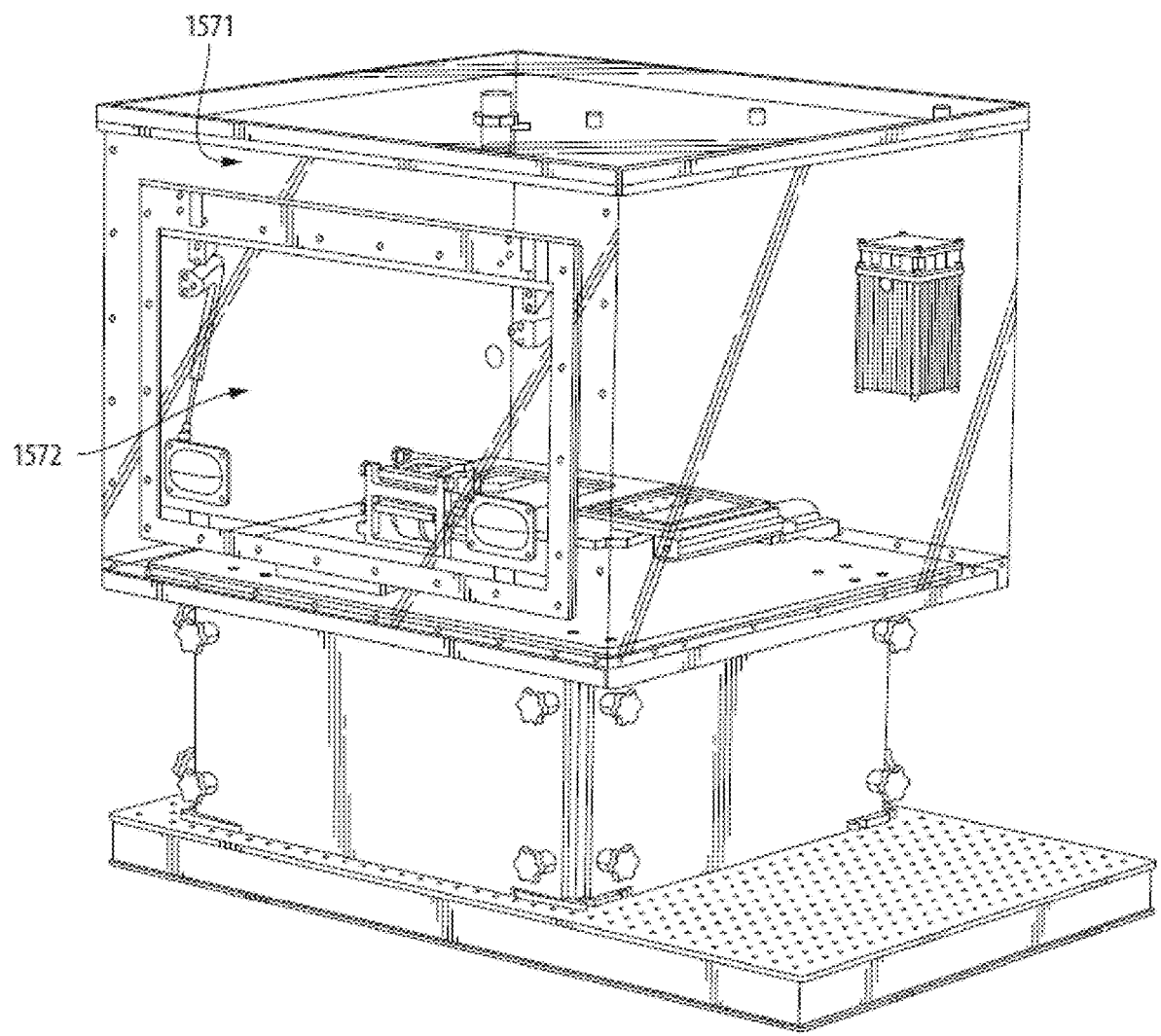
FIG. 18 shows a plate reader according to the invention with optional case.

FIG. 18 shows the plate reader with optional case 1571 that blocks external light and airborne contaminants from the plate reading platform. In certain aspects, the case 1571 may be removable. In certain aspects, the case includes a door or hatch 1572 to provide access to the plate reading platform.

Figure 19:
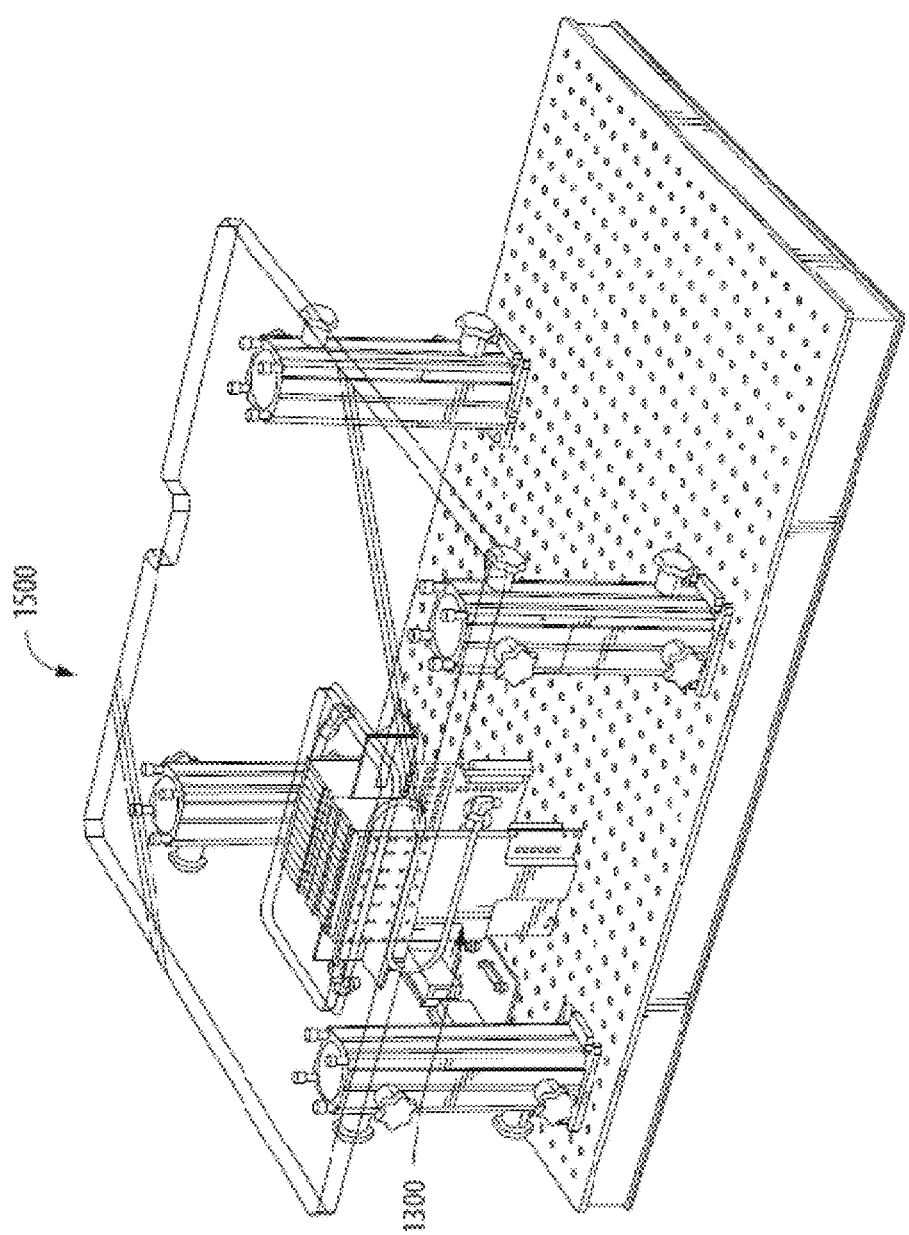
FIG. 19 shows a closeup view of an exemplary plate reader.

FIG. 19 provides a closeup view of exemplary plate reader 1500. In this view, two read heads 1300 can be seen, including the PCBs with picoammeter circuits/photodiodes 1305.

In certain aspects, the plate readers may include an environmental control subsystem operable to control environmental conditions associated with a sample in a multi-well plate positioned on the reader. The environmental control subsystem can control, for example, humidity, temperature, $CO_2$ and other factors of the sample region. The environmental control subsystem can assure that the conditions in an aqueous medium in which cellular samples are contained within the well of a multi-well plate are maintained to keep the cells alive and functional. This is especially important in optogenetic assays that assess the activity of cells in response to a stimulus.

In certain aspects, the plate readers may include a microfluidic assembly to deliver fluids to wells in said multi-well plate. The assembly may, for example, deliver nutrients, such a cell medium, to keep the cells alive. The assembly can also, for example, deliver reagents, such as a compound of interest or a reference stimulus, to a sample in the wells of a multi-well plate. The plate reader may also contain a facility for sequentially loading a batch of plates within the instrument.

In certain aspects, the light channels are part of a light subsystem. The objectives and/or light subsystems of the plate readers may be coupled to the processing system 303.

The processing system 303 may be operable to model activity of a cell in a well using emission light from the well. Further, in certain aspects, the light detectors of the optical channels may digitize the optical signals into digital signals. The processing system may analyze and/or store the digitized signals. The processing system may also, for example, model activity-related waveforms from the digitized signals.

Figure 20:
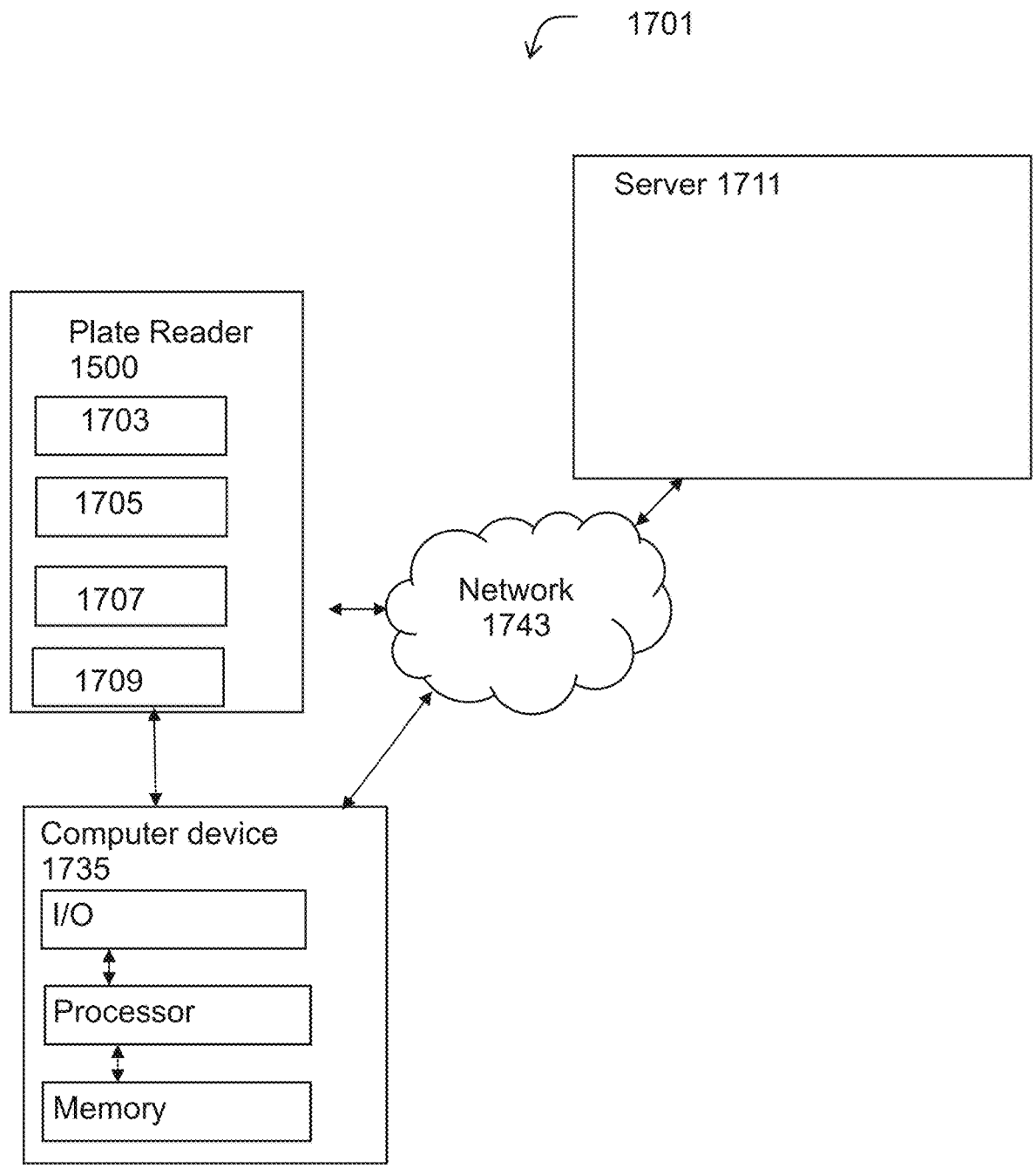
FIG. 20 shows a system for control and use of a plate reader of the invention.

FIG. 20 shows a schematic of a system 1701 for control and use of a plate reader 1500. The plate reader 1500 includes an optical system 1703, which includes the optical channels and their objectives. The plate reader 1500 is connected directly or via network 1743 to computer device 1735. Optionally, system 1701 may include or access a server computer 1711. The computer device 1735 may include an input/output, such as a touchscreen configured to display results from an assay and to control, for example, the emission light, plate pusher 1705, environmental control subsystem 1707, and microfluidic assembly 1709, via user input. Using system 1701, a user may activate an electrically active cell displayed on the touchscreen.

The system 1701 includes a computer device 1735 connected to the plate reader 1500, which will typically include a processor coupled to memory and one or more input/output device. Suitable I/O devices include monitor, keyboard, mouse, pointer, trackpad, touchscreen, camera, Wi-Fi card, network interface card, USB port, others, and combinations thereof. In certain embodiments, computer 1735 includes a touchscreen. The touchscreen may be configured to display a real-time image captured by the objective lens. The touchscreen can be operable to accept user inputs comprising touching the touchscreen. In some embodiments, the touchscreen can be manually controlled by a user to transmit stimulating light to a certain well of a multi-well plate. The touchscreen may be operable to control all aspects of the microscope, including position of the plate pusher, stimulation light intensity and/or wavelength, or any other factor relevant to the use and control of the plate reader.

EXAMPLES

Example 1: Single Well Validation Assay

A plate reader with a single optical-channel module was used to assay a 96-well plate that contained IPSC-derived cardiomyocytes expressing QuasAr2 voltage reporters, jRGeCO1 calcium sensors, and CheRiff actuators. The cells were maintained in a cell culture in the plate.

Figure 21:
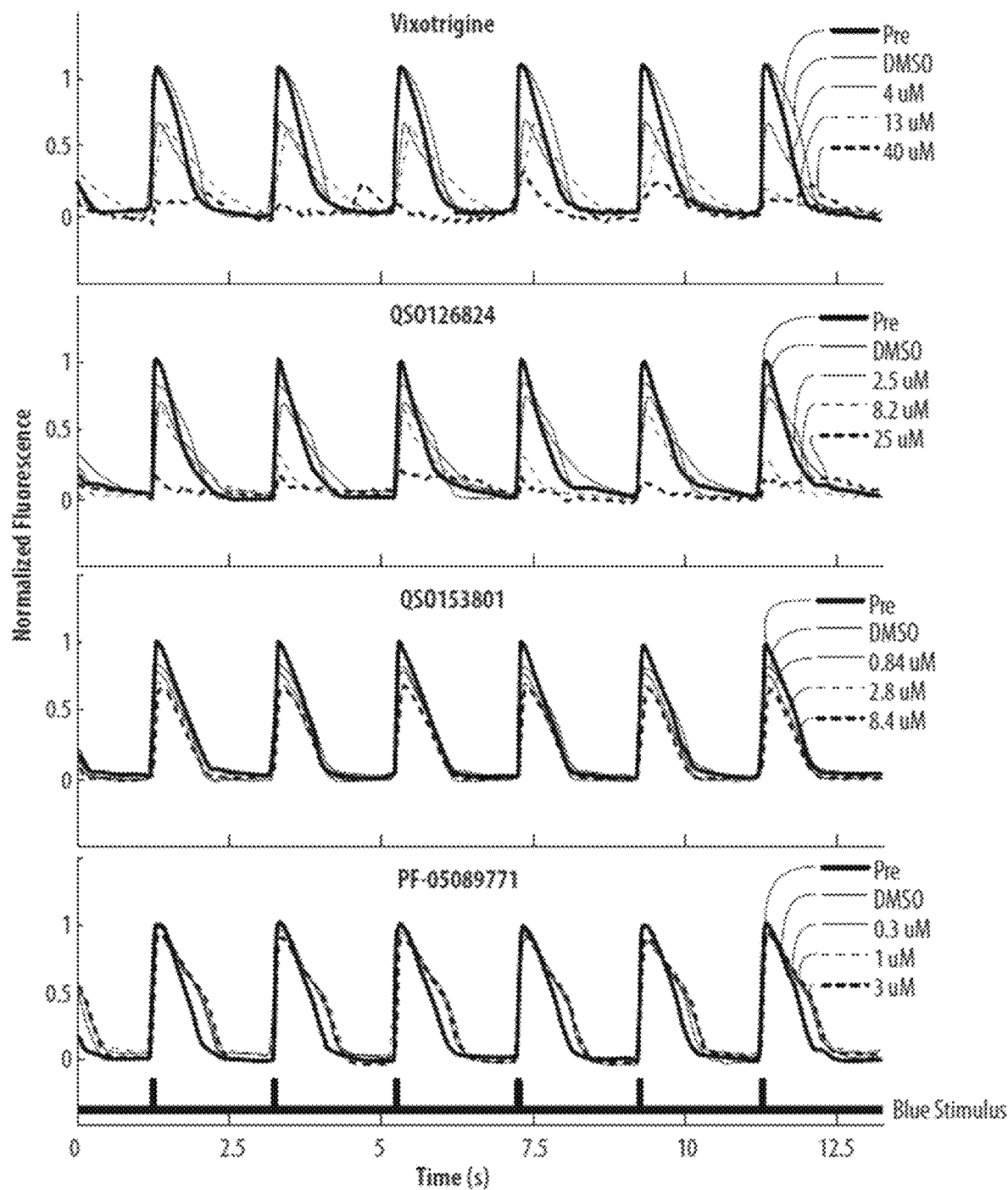
FIG. 21 shows results from an assay conducted according to the invention.

FIG. 21 shows the outcome of the assay. In FIG. 21, the line labeled "Blue Stimulus" indicate pulses of stimulating light transmitted by the plate reader to a single well of the plate, which caused actuation of CheRiff. This led to resulting changes in voltage and calcium ion concentration in the cells. The resulting changes in voltage were reported by QuasAr2, which was energized by red light transmitted from the plate reader and calcium ion concentration was reported by jRGECO1, which was energized by yellow light. Thus, the plate reader was able to accurately stimulate an actuator and two reporters in a single well of a multi-well plate with three separate wavelengths of light. Moreover, the plate reader was able to simultaneously detect the levels of two separate emission wavelengths of light.

Example 2: Optical-Channel Module Validation Assays

The same plate reader with a single optical-channel module was used to assay spiking HEK cells in the wells of a 384-well plate. The plate reader simultaneously assayed one well of the plate at a time—one with each optical-channel/objective of the optical-channel module addressing one well at a time.

A spiking HEK assay was performed on the SWARM instrument described herein. Results are presented for the Nav1.7 Spiking HEK assay performance in Swarm instrument.

Figure 22:
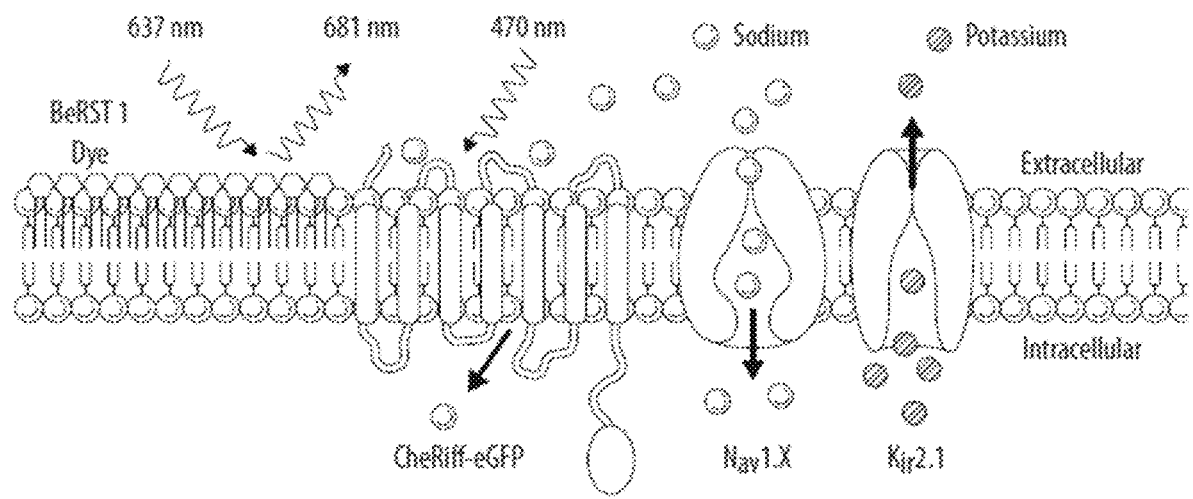
FIG. 22 shows components of a HEK cell assay.

FIG. 22 is a schematic diagram of the key components in Nav1.x spiking HEK cells, including voltage sensitive dye BeRST1, CheRiff-eGFP, Kir2.1 and the target of interest, Nav1.x channel.

Figure 23:
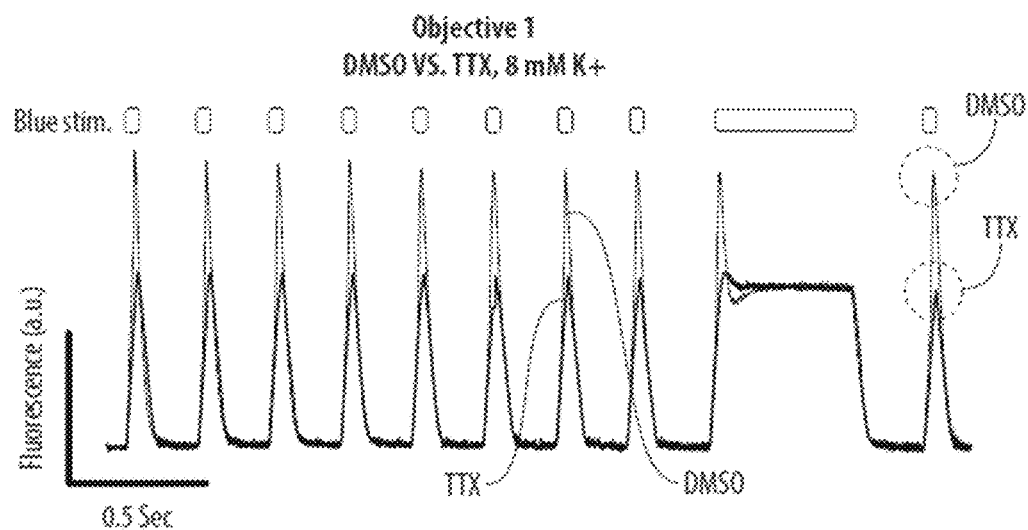
FIG. 23 shows representative fluorescent traces.

FIG. 23 shows representative fluorescent traces from eight wells of DMSO or 1 mM TTX treated Nav1.7 spiking HEK cells stimulated with a 10 test-pulse blue light stimulation protocol, imaged by Objective 1 of the Swarm instrument. The bath [K+] is 8 mM.

Figure 24:
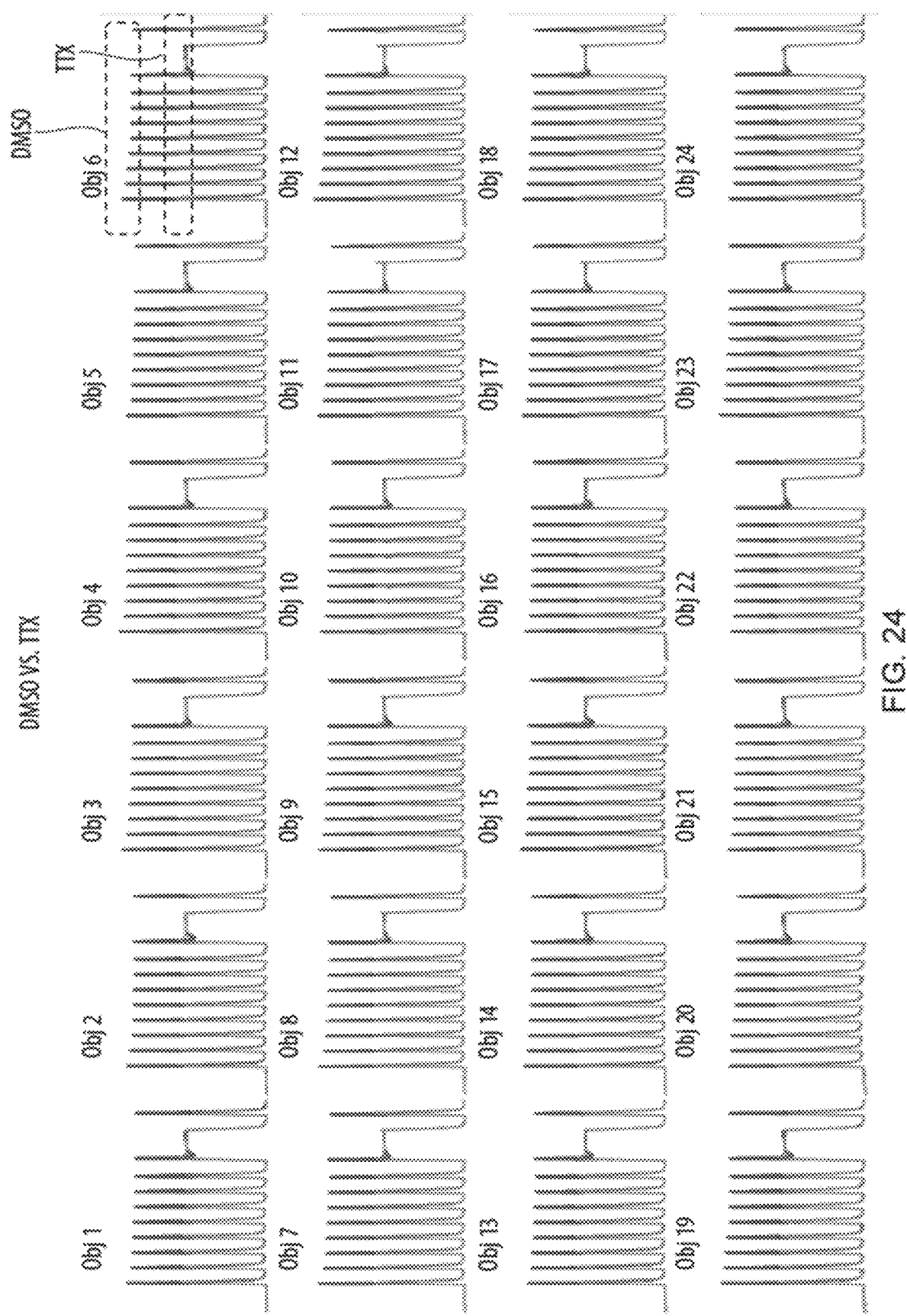
FIG. 24 shows fluorescent traces collected from 24 objectives.

FIG. 24 shows Fluorescent traces collected from all the 24 objectives. The Nav1.7 Spiking HEK cells were treated with either DMSO or 1 mM TTX and were stimulated by the 10 test-pulse blue light stimulation protocol. Each trace is averaged based on 8 adjacent wells imaged by the same objective.

Figure 25:
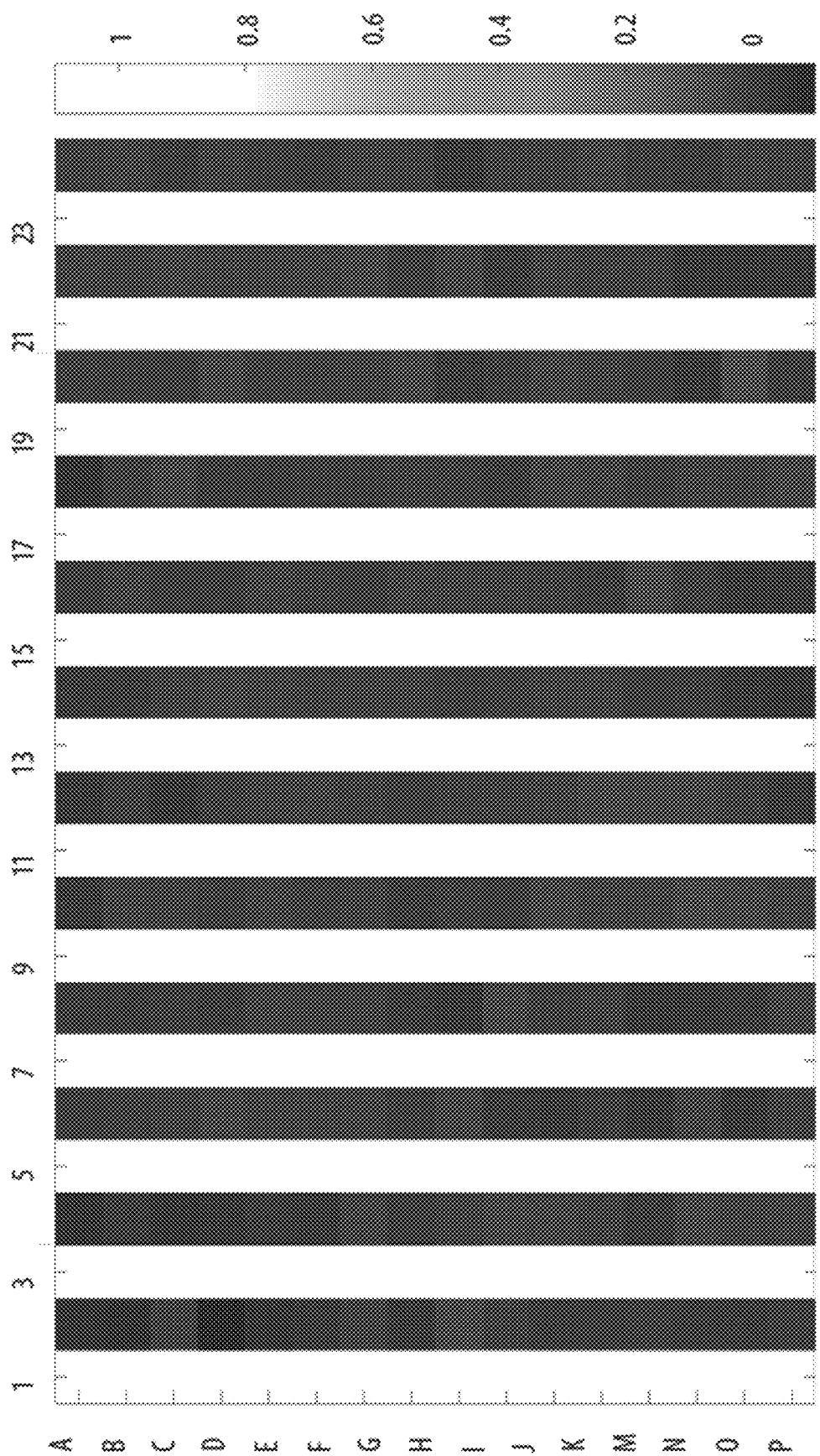
FIG. 25 shows a heat map from a sentinel plate.

FIG. 25 shows a heat map from a representative Nav1.7 spiking HEK 384-well sentinel plate. All the odd columns were treated with DMSO vehicle control and all the even columns are treated with 1 mM TTX. The assay is for spiking HEK cells. The cells were caused to express QuasAr2 as a voltage reporter, CheRiff as a voltage actuator to modulate membrane potential, Kir2.1 as a potassium channel to modulate membrane potential, and a Nav1.x channel (such as Nav1.5, Nav1.7, Nav1.8, Nav1.9, etc.) which is a voltage gated sodium channel. In addition, chemical sensors of membrane potential, intracellular calcium or other mediators may be utilized in this system. Such assays can be used, for example, to detect different mechanisms and compounds to block the activity of Nav1.x channels, which are targets of interest for reducing pain and other conditions. In this assay, Nav1.7 was expressed by the cells.

In addition to the cells, each well of the plate had either 185 nM of Nav1.7 blocker compound TTX, 5.6 μM amitriptyline, or a vehicle (0.5% DMSO) added. Each optical channel of the optical channel module simultaneously transmitted patterned blue light to a different well of the 96-well plate to stimulate CheRiff until the cells fired an action potential. The stimulation protocol consisted of eight pulses of blue light to measure response of the cells to the added compound, followed by a plateau triggered by the reference stimulus, and then followed by a final transmission of blue light to measure channel activity and pharmacological responses following previous activating signals.

Figure 26:
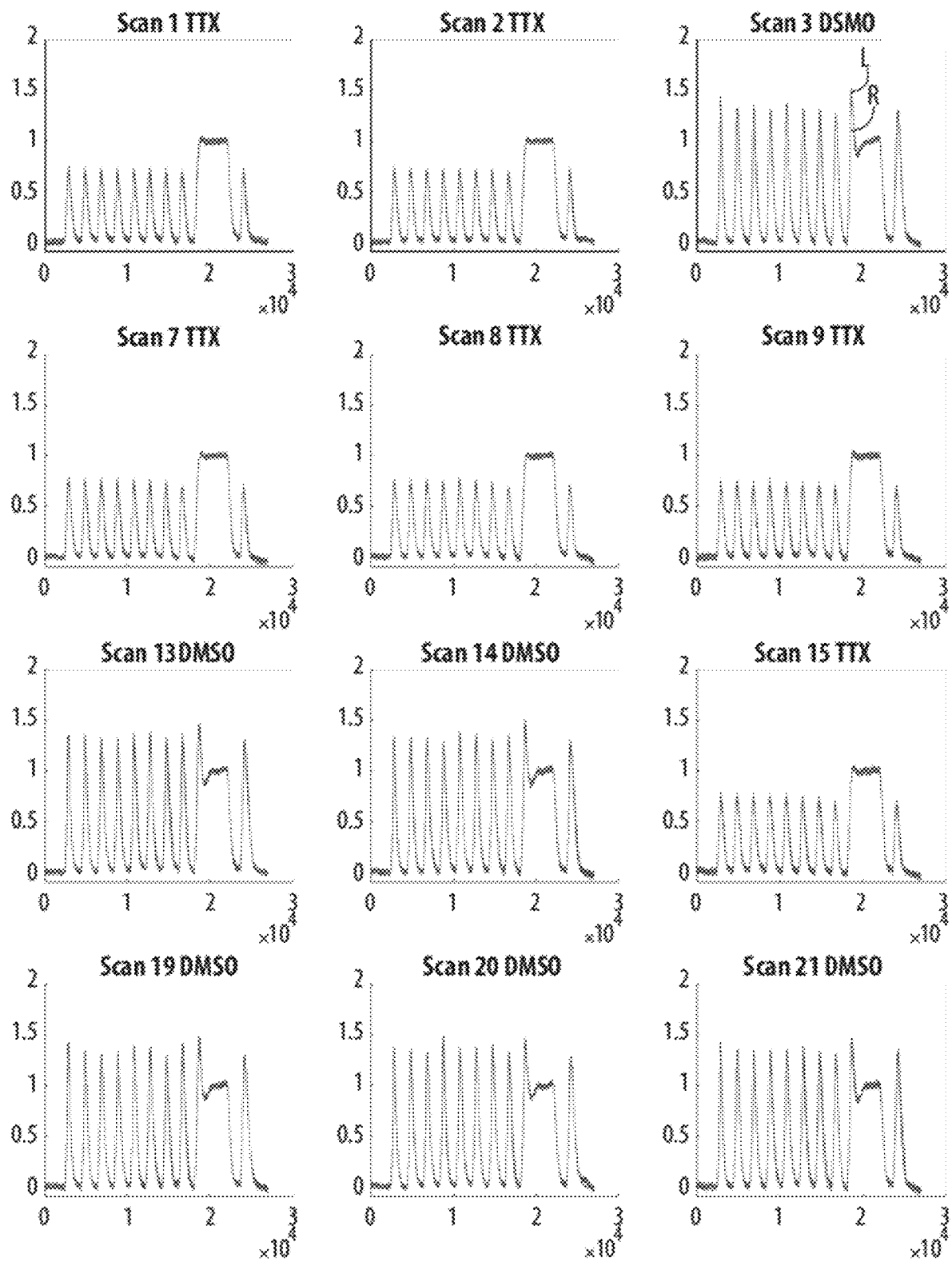
FIG. 26 shows scans from a first set of wells of a plate.

FIG. 26 provides scans 1, 2, 3, 7, 8, 9, 13, 14, 15, 19, 20, and 21 rom a first half of the wells of a plate in an exemplary L/R assay. The data are obtained from well from a first half of an exemplary plate assayed by the optical channel module.

Figure 27:
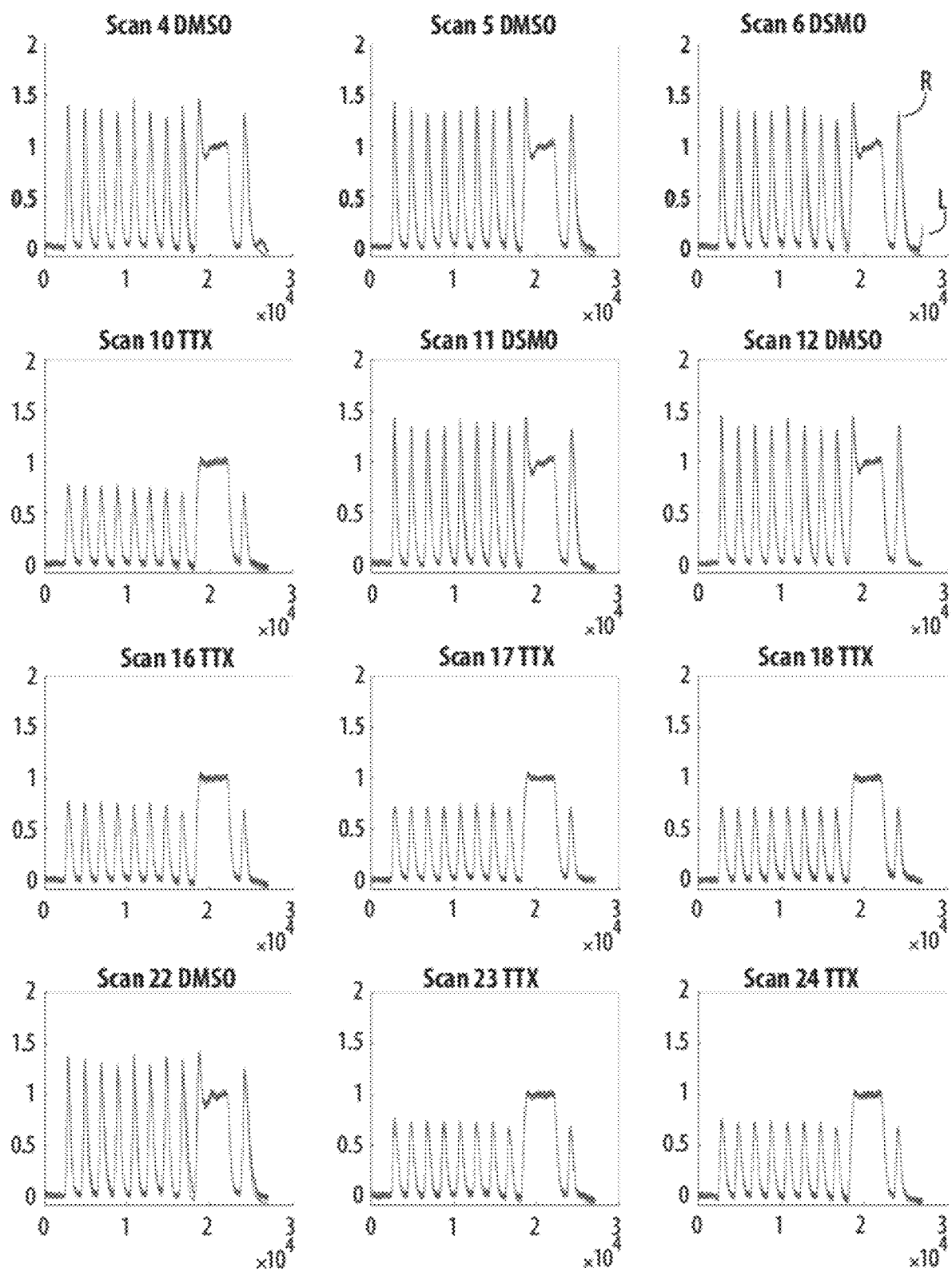
FIG. 27 shows scans from a second set of the wells.

FIG. 27 gives scans 4, 5, 6, 10, 11, 12, 16, 17, 18, 22, 23, and 24 from a second half the wells of a plate in the exemplary L/R assay. The lines of different darkness (or colors), labeled "L" and "R" are from two different channels of the optical-channel module.

Figure 28:
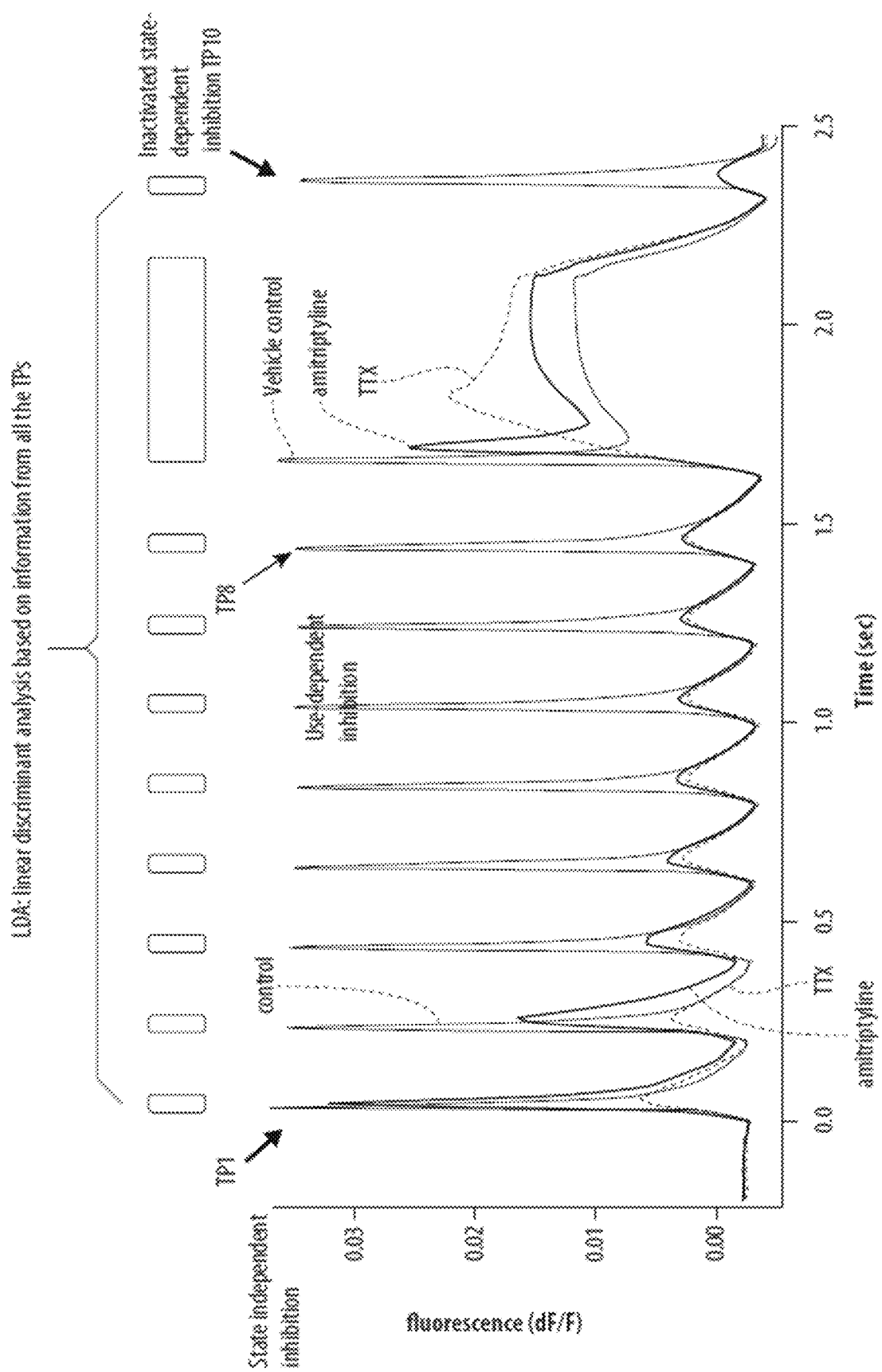
FIG. 28 provides and validated results.

FIG. 28 provides results previously obtained and validated results using a similar assay using an epi-fluorescence microscope. It is clear that the results of the L/R assay from the plate reader conformed to the validated results provided by the microscope.

Figure 29:
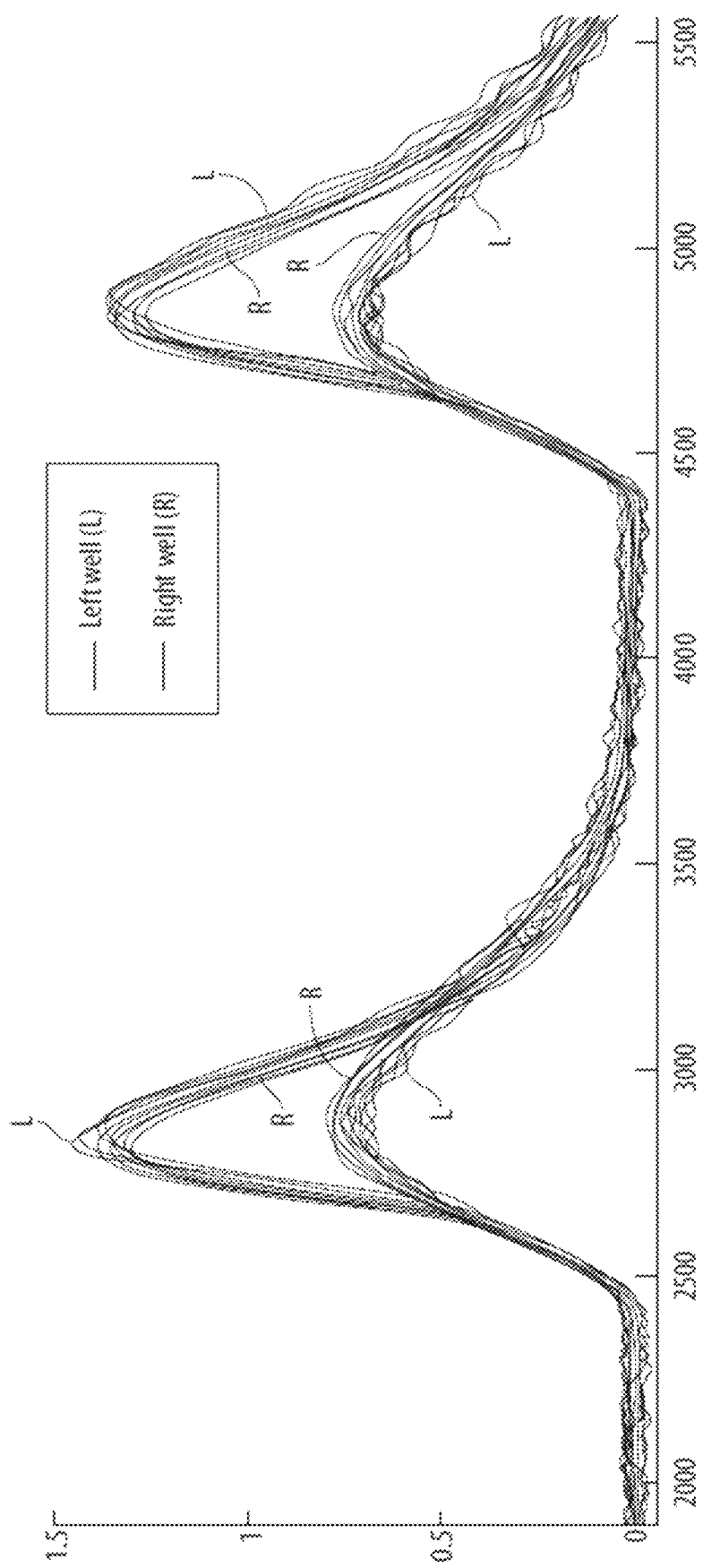
FIG. 29 shows an overlay of the results from two pulses.

FIG. 29 shows an overlay of the results from the first two pulses in each well as detected by each optical channel of the optical channel module. This figure shows that the results from each channel are consistent and repeatable, with only slight differences between each channel.

Figure 30:
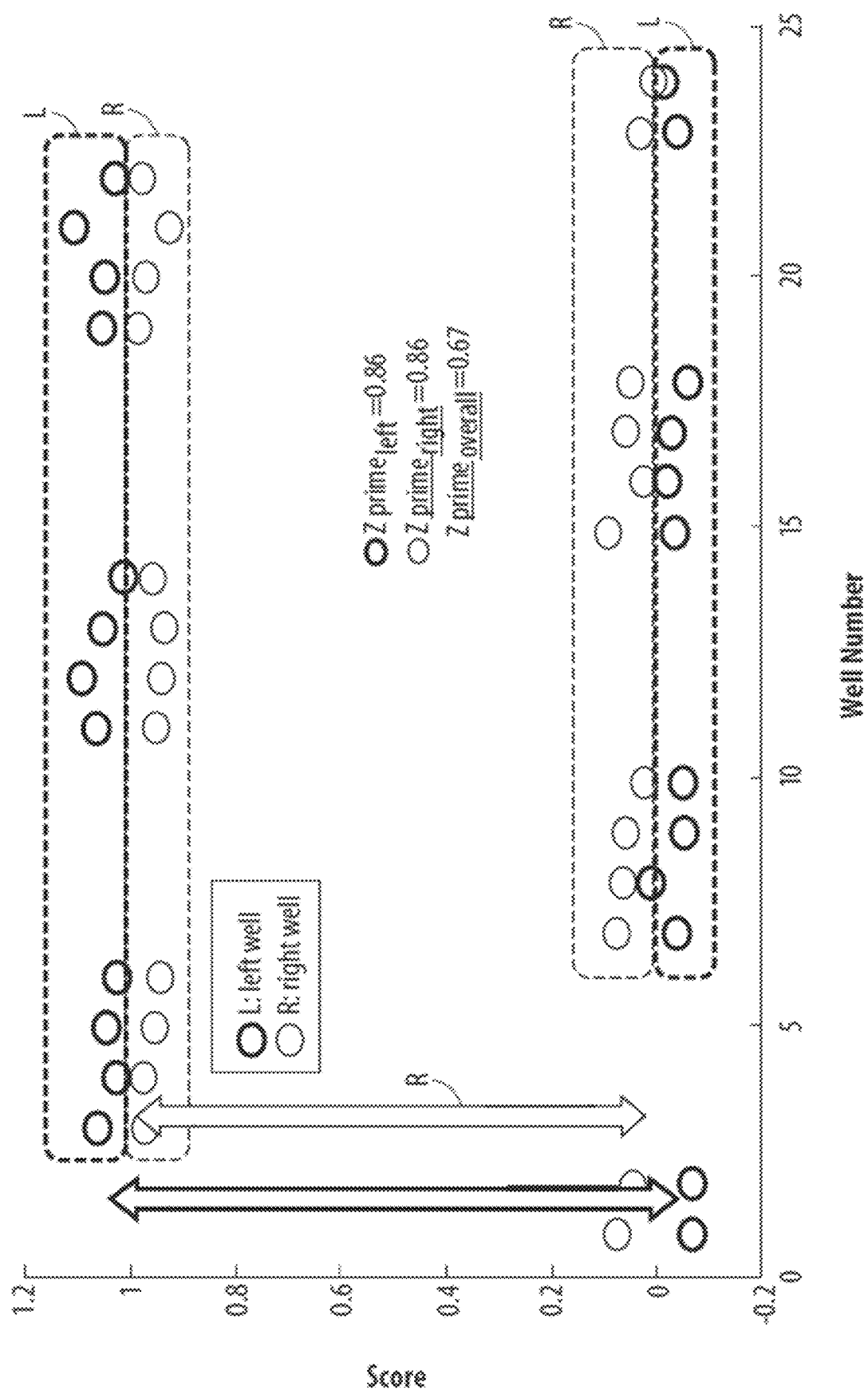
FIG. 30 provides the summary statistic for each channel.

FIG. 30 provides the summary statistic, Z-prime, calculated for each channel of the module. It is clear based on these results that even with the slight differences between channels, a desirable Z-prime was obtained for these assays.

Example 3: Simultaneous 24-Well Validation Assay

A plate reader with 12 optical-channel modules (i.e., two 12 read heads and 24 optical-channels/objectives) was used to simultaneously assay 24 individual wells of a multi-well plate. The wells of the plate contained OptoPatch system samples. The OptoPatch system is an all-optical electrophysiology system that uses mammalian neurons employed to directly report changes in transmembrane potential with excellent signal-to-noise properties. The neurons in the wells of each plate were caused to express Arch-based QuasArs as voltage reporters and CheRiff as a voltage actuator to modulate membrane potential.

This plate reader can apply stimulation waveforms independently to all four LED wavelengths of each optical-channel to each well with 16-bit resolution and up to 25 kS/s. The output of each of the 72 picoammeter outputs are digitized independently and simultaneously with 24-bit resolution at up to 10 kS/s. This allowed the optical channels to independently transmit stimulation light to the expressed CheRiff and excitation light to the Arch-based QuasArs expressed by the neurons contained in each of the wells. The stimulation light stimulated CheRiff, causing a change in the membrane potential of the neurons. The excitation light excited the QuasArs, which produced an optical signal indicative of the change in action potential caused by stimulation of CheRiff.

Figure 31:
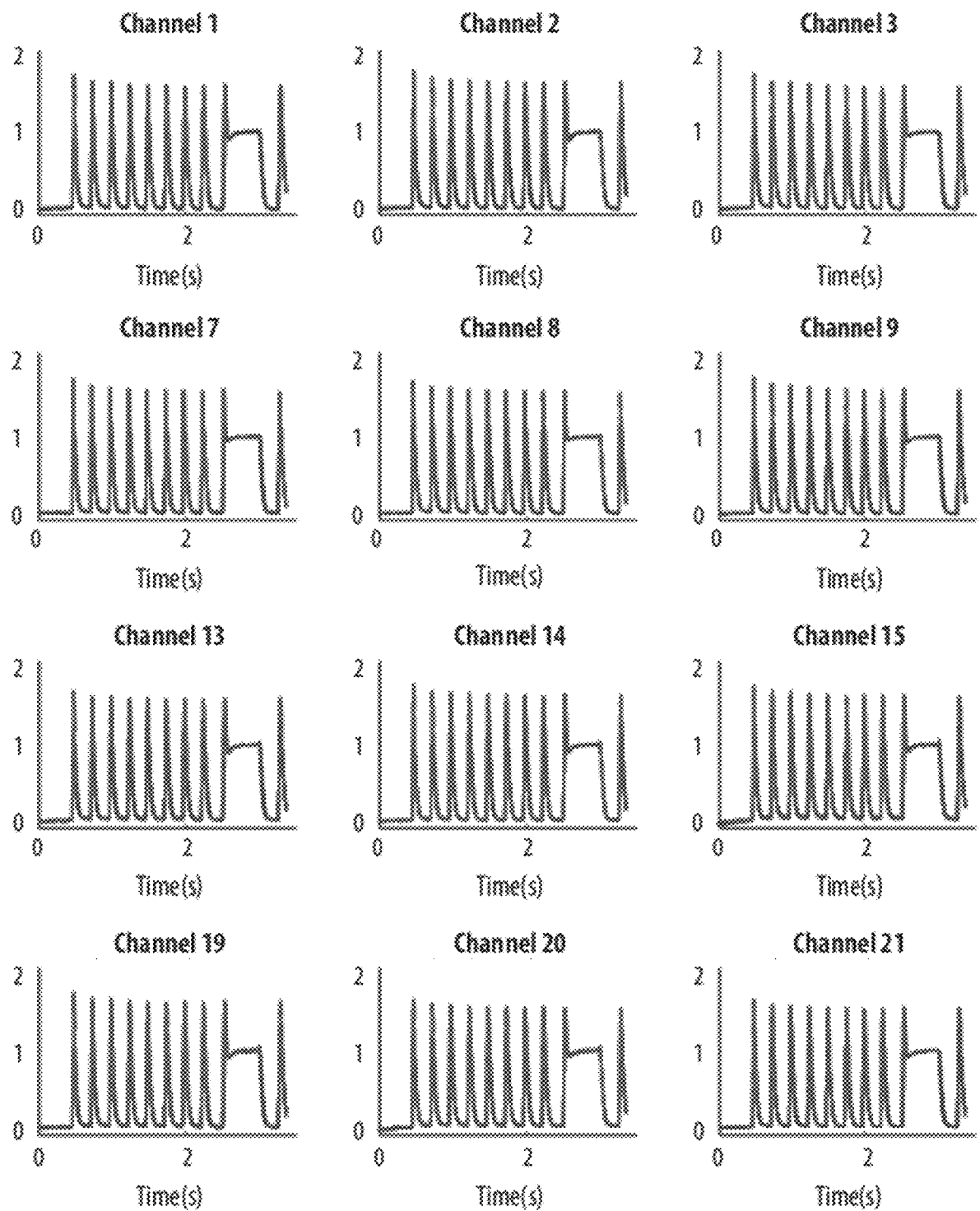
FIG. 31 provides the results of the 4 wavelength stimulation assay for certain channels.

FIG. 31 provides the results of the 4 wavelength stim assay for channels 1, 2, 3, 7, 8, 9, 13, 14, 15, 19, 20, and 21.

Figure 32:
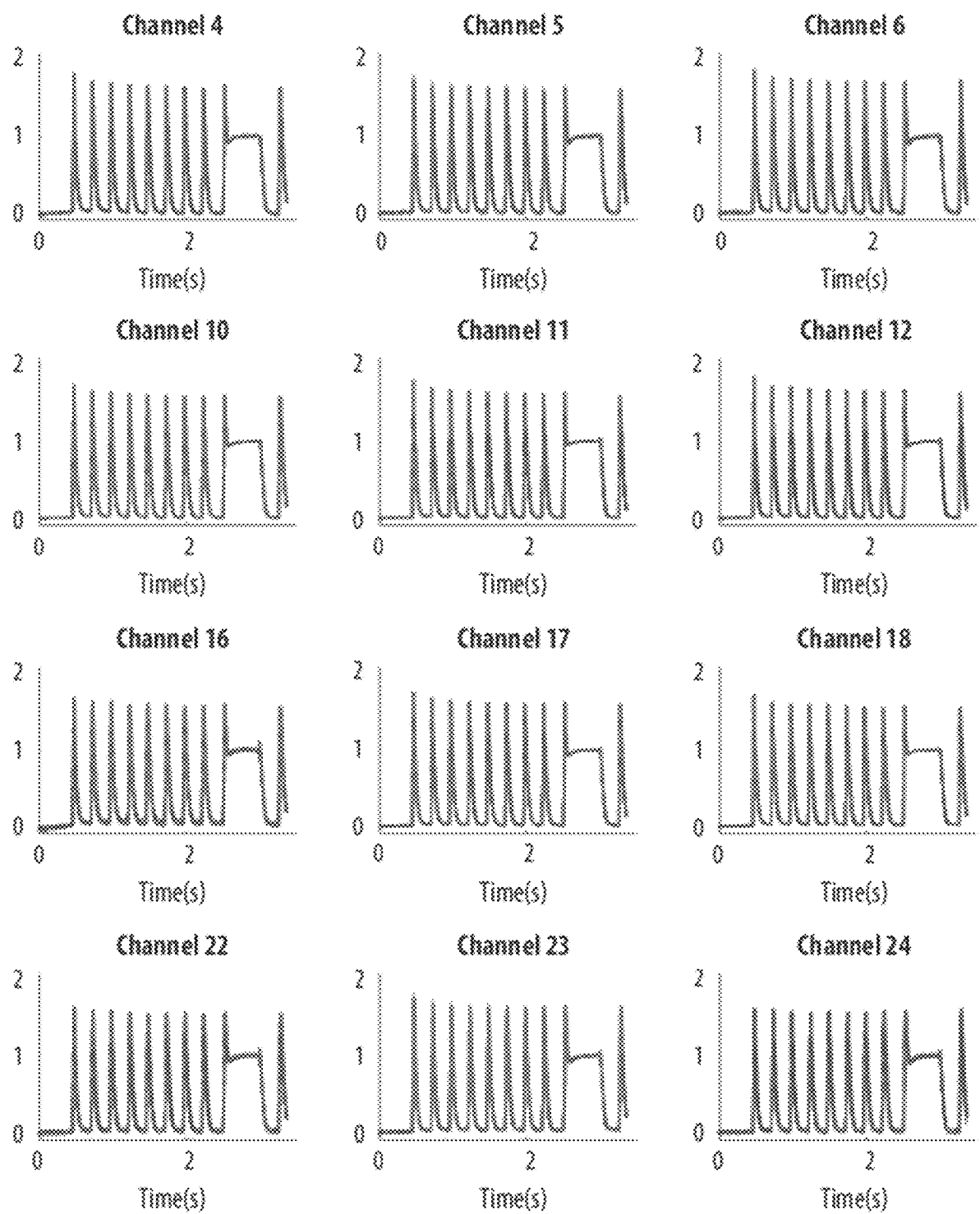
FIG. 32 provides the results of the 4 wavelength stimulation assay or other channels.

FIG. 32 provides the results of the 4 wavelength stim assay for channels 4, 5, 6, 10, 11, 12, 16, 17, 18, 22, 23, and 24.

In the 4 wavelength stim assay, optical traces recorded using the optical channels aligned at the wells of the multi-well plate. For each optical channel, data from two separate wells are overlaid and shown as blue and magenta line respectively. The imaging frame rate is 2 kilohertz and bleach correction was applied. All the 24 wells optical channels are fully functional and provided consistent, repeatable results.

These results demonstrate that the plate reader of the invention can provide simultaneous, accurate, and repeatable results across several wells of a multi-well plate. Each pulsing protocol takes less than 5 seconds to complete, and it takes approximately 5 seconds to set up control signals and to align the wells of a plate with the objectives. This equates to approximately 5 minutes to change plates and scan a plate on the plate reader. Thus, when using 96-well plates, approximately 7,000 individual wells can be assayed per day. When using 384-well plates this throughput increases to approximately 20,000 wells per day, while 1,536-well plates provide an approximate 40,000 individual wells per day throughput. The plate readers of the invention can thus function in high-throughput screening (HTS) assays.

Example 4: Concentration Response Curve Analysis of Tool Compounds on Nav Channels Methods of the invention were used to evaluate the response of various tool compounds on different Nav subtypes. Methods of the invention were used to assess treatment of Nav subtypes using a spiking HEK cell assay. As shown in the Figure, Nav1.2 and Nav1.5 subtypes were stimulated at 2 Hz, using 8 test pulses prior to a 500 ms long pulse. Action potentials triggered by the third through eighth pulses are plotted. For Nav1.7, cells were stimulated at 4 Hz and all triggered action potentials were plotted.

Concentration response curves (CRC) were obtained for various tool compounds on different Nav subtypes.

Figure 33:
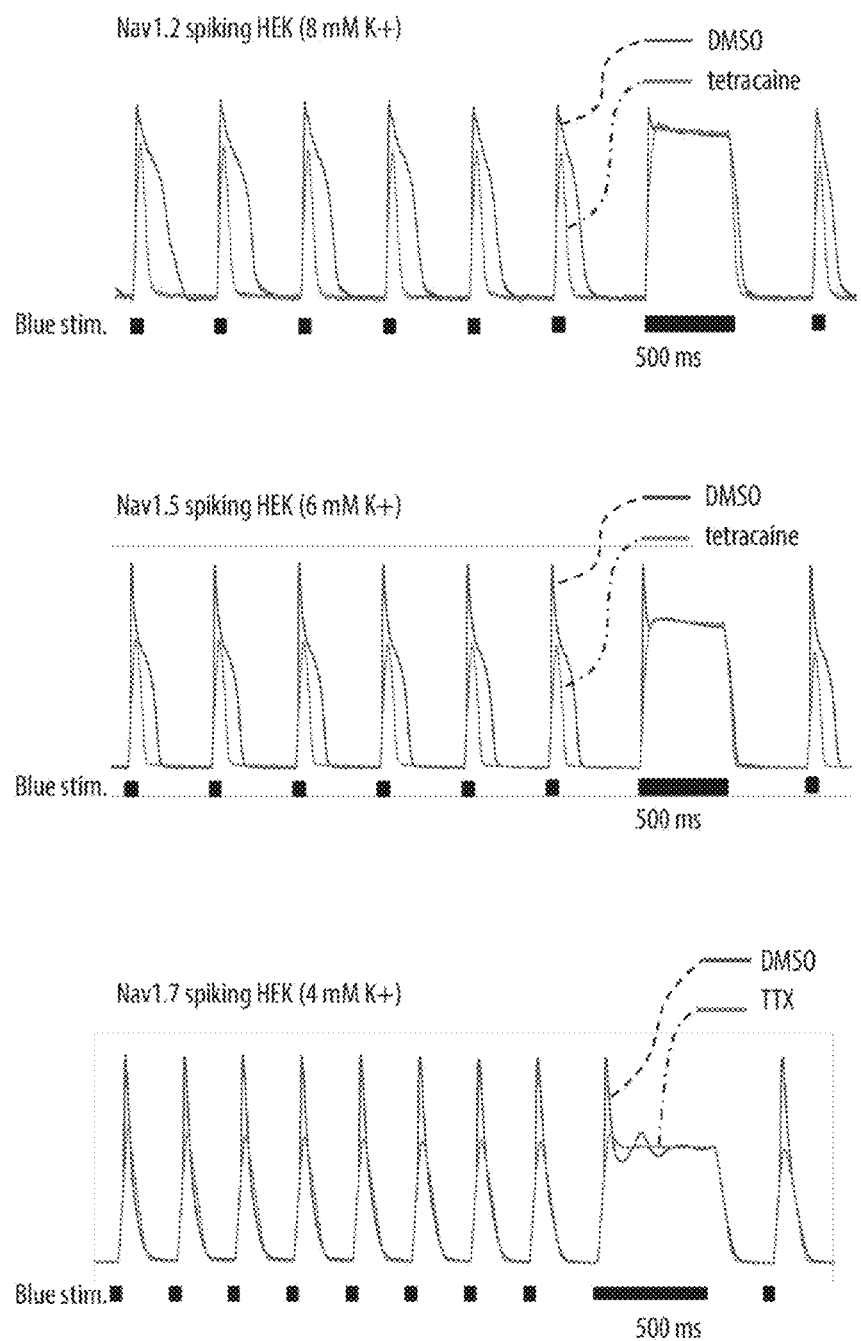
FIG. 33 shows representative fluorescent traces.

FIG. 33 gives Representative fluorescent traces from DMSO, 1 mM TTX or 10 mM tetracaine treated Nav1.2 spiking HEK cells (8 mM bath [K+]), Nav1.5 spiking HEK cells (6 mM bath [K+]) and Nav1.7 spiking HEK cells (4 mM bath [K+]). For Nav1.2 and Nav1.5 spiking HEK assays, the cells were stimulated at 2 Hz. Eight test pulses were applied before the 500 ms long pulse and only action potentials triggered by the third to the eighth pulses were plotted here; for Nav1.7 spiking HEK cells, the cells were stimulated at 4 Hz and all the triggered action potentials are plotted.

Figure 34:
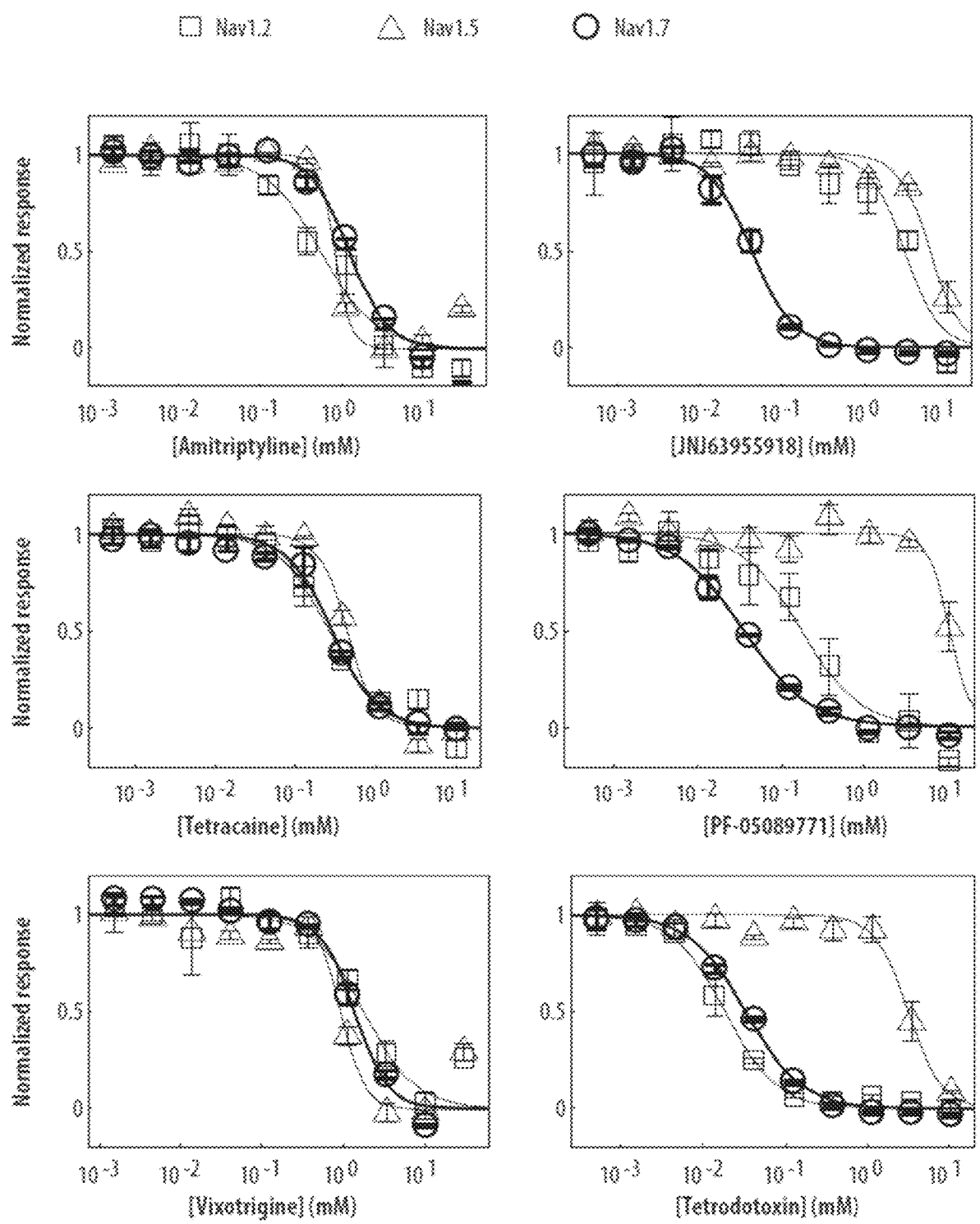
FIG. 34 shows concentration response curves (CRCs).

FIG. 34 shows concentration response curves (CRCs) of 3 non-selective Nav channel blockers (Amitriptyline, Tetracaine, vixotrigine) and 3 subtype-selective Nav channel blockers (JNJ63955918, PF-05089771, Tetrodotoxin) on Nav1.2 (8 mM bath [K+]), Nav1.5 (6 mM bath [K+]) and Nav1.7 (8 mM bath [K+]). Table 1. Nav1.x IC50 values and state dependence from 15 tool compounds with different potency and working mechanism. The state dependence is defined as the ratio of IC50 values of Nav1.7 spiking HEK assay at TP1 at 4 mM K+ over TP10 IC50 values at 8 mM K+. FIG. 35 lists compounds that were used.

The results give CRCs for 3 non-selective Nav channel blockers (amitriptyline, tricaine, and vixotrigine) and 3 subtype-selective Nav Channel blockers (JNJ63955918, PF-05089771, and Tetrodotoxin) on Nav1.2, Nav1.5, and Nav1.7 channels. The IC50 values and state dependence using 15 tool compounds of differing potency and mechanisms of action are shown. The state dependence is defined as the ratio of IC50 values of Nav1.7 spiking HEK assay at time point 1 at 4 mM K+ over time point 10 values at 8 mM K+. Taken together, these results demonstrate that methods and plate readers of the invention are useful for assessing existing as well as unknown compounds for efficacy in blocking stimulation at Nav channels.

Example 5: Selectivity/Potency Assays

Scatter plots were made for tool compounds and for identified hits to show potency and selectivity of tool compounds and test compounds. The scatter plots show potency, selectivity and state dependence of tool compounds and identified hits.

Figure 36:
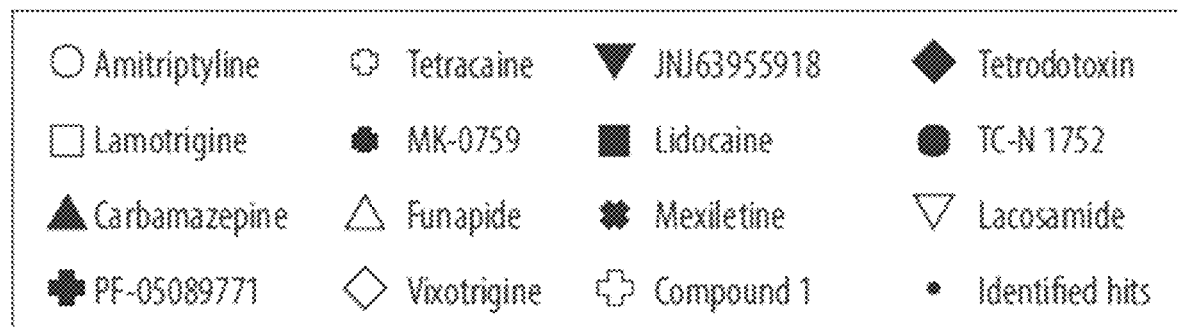
FIG. 36 is a scatter plot to show selectivity.
Figure 36:
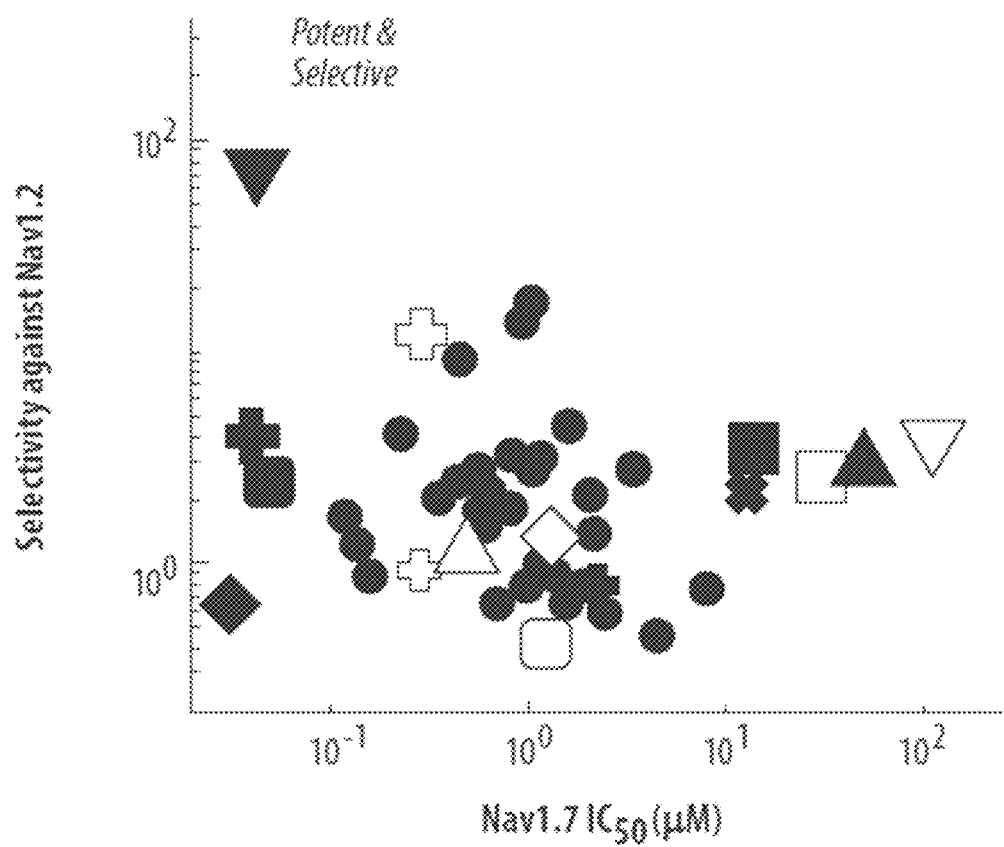

FIG. 36 is a scatter plot to show selectivity. For each Nav1.7 inhibitor, its subtype selectivity against Nav1.2, defined as the ratio of Nav1.2 IC50 value over Nav1.7 IC50 value, was plotted against its Nav1.7 IC50 values.

Figure 37:
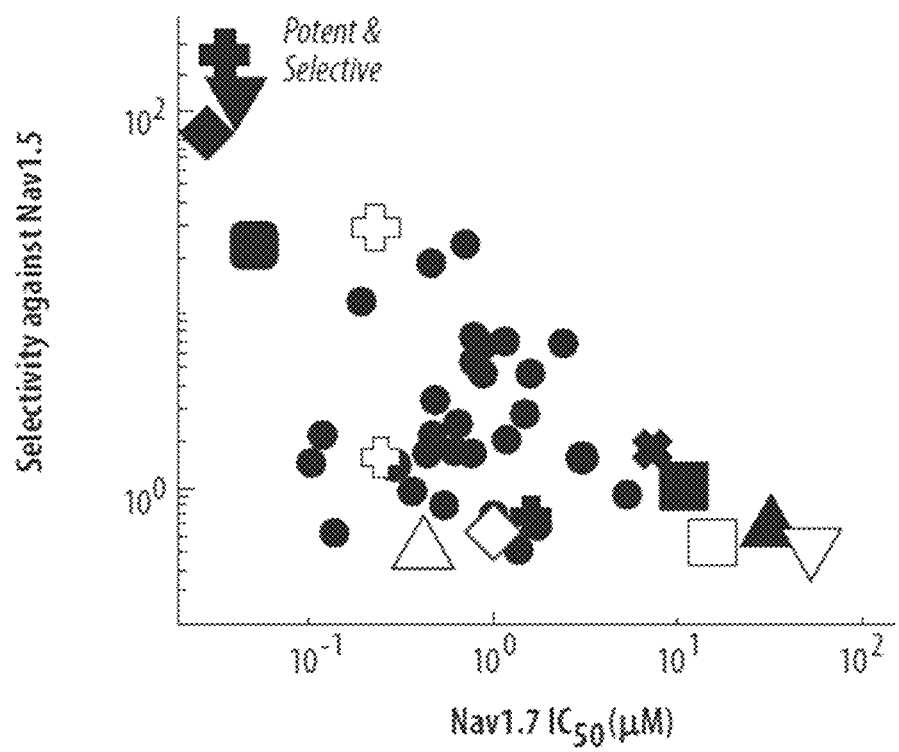
FIG. 37 is a scatter plot of subtype selectivity against Nav1.5.

FIG. 37 each Nav1.7 inhibitor, its subtype selectivity against Nav1.5, defined as the ratio of Nav1.5 IC50 value over Nav1.7 IC50 value, was plotted against its Nav1.7 IC50 values.

Figure 38:
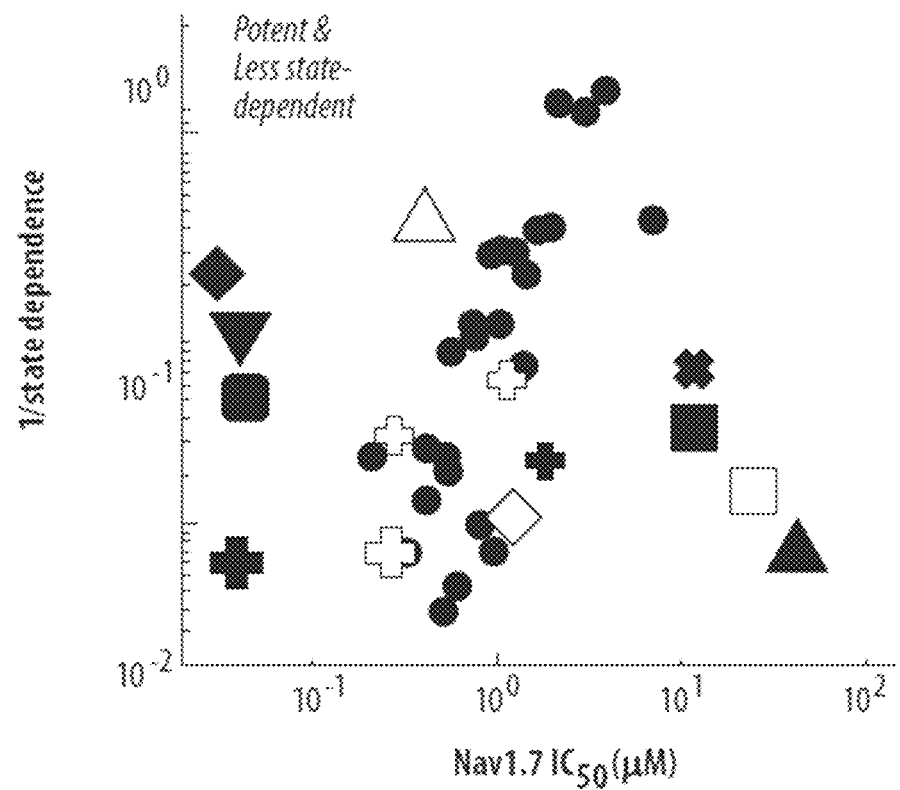
FIG. 38 is a scatter plot for potency on Nav1.7.

FIG. 38 is a scatter plot. For each Nav1.7 inhibitor, its reciprocal of state dependence was plotted against its potency on Nav1.7. In all the three panels, the compounds with desired property (potent, subtype selective and less state-dependence) distribute within the upper left quadrant. The results show that a plate reader of the invention provides multiplexed, high-throughput results useful to screen compounds for potent and/or selective interactions with various targets. The results are useful to discover hits, compounds with promise as effective new drugs.

Example 6: IPSC-Derived Cardiomyocyte Validation Assay

A 24 objective plate reader of the invention was used to assay a 96-well plate that contained IPSC-derived cardiomyocyte expressing jRGECO1a calcium sensors, CheRiff actuators, and loaded with BeRST1 fluorescent voltage sensitive dye.

Figure 39:
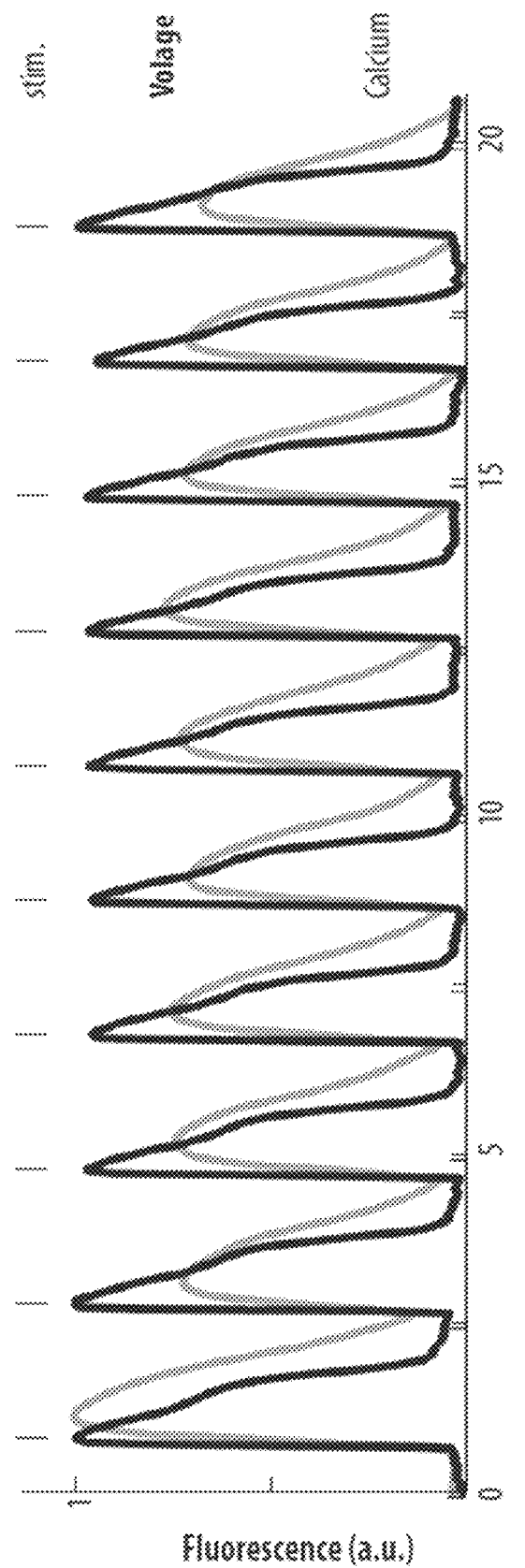
FIG. 39 shows the outcome of the simultaneous voltage and calcium imaging using a plate reader of the invention.

FIG. 39 shows the outcome of the simultaneous voltage and calcium imaging on the Swarm instrument. The line labeled "stim" indicates pulses of stimulating light transmitted by the plate reader to multiple wells of the 96-well plate, which caused actuation of CheRiff. This led to resulting changes in voltage and calcium ion concentrations in the cells. The resulting changes in voltage were reported by BeRST1, which was energized by red light transmitted from the plate reader. Calcium ion concentration was reported by jRGECO1, which was energized by yellow light. Thus, the plate reader was able to accurately stimulate an actuator and two reporters in multiple wells of a multi-well plate with three separate wavelengths of light. Moreover, the plate reader was able to simultaneously detect the levels of two separate emission wavelengths of light.

Figure 40:
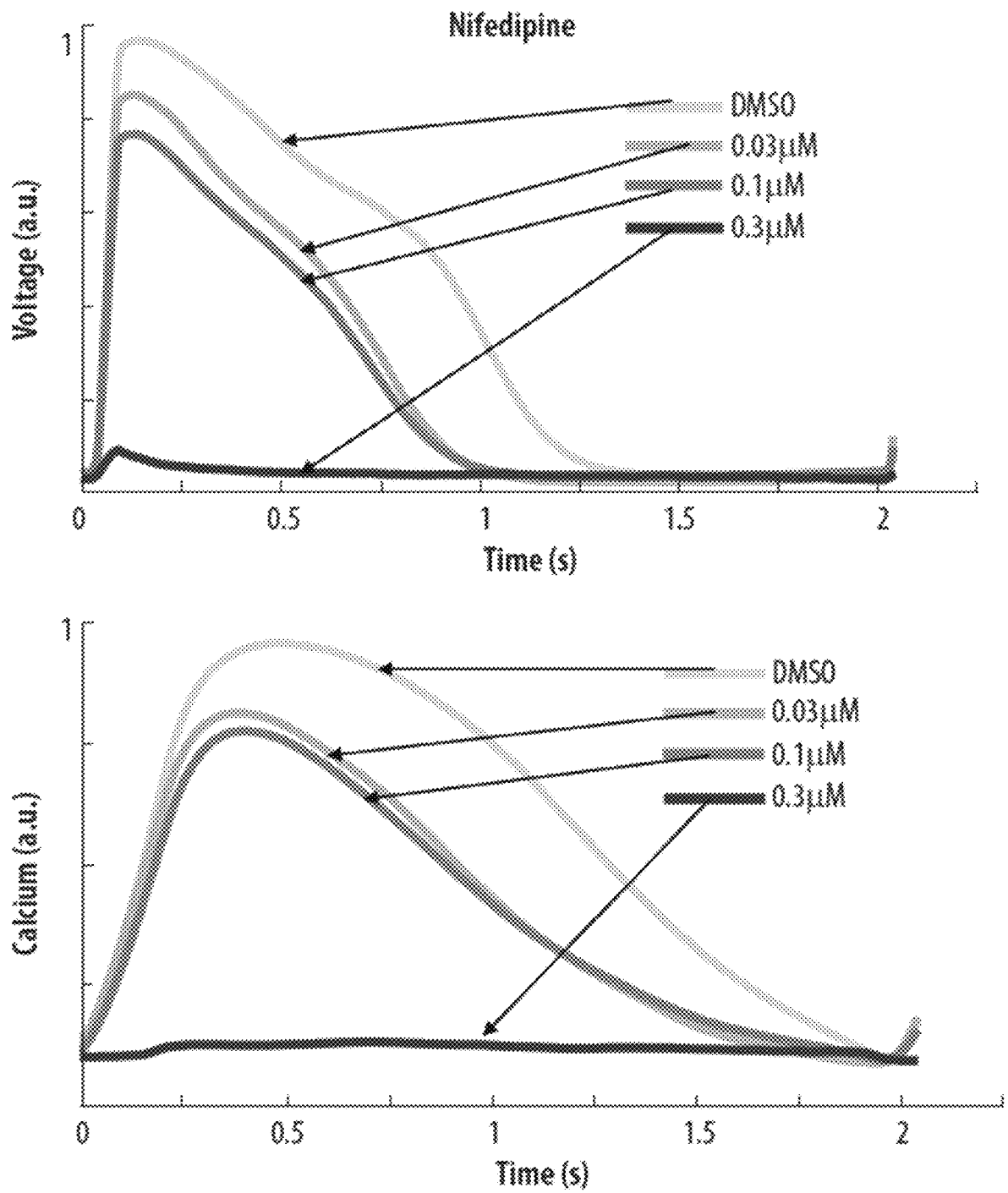
FIG. 40 shows voltage and calcium waveforms.

FIG. 40 shows validation of the assay with tool pharmacology such as the calcium channel blocker Nifedipine. The voltage and calcium fluorescence waveforms in FIG. 40 show the average epoch of the 10-test pulse blue stimulation protocol.

Figure 41:
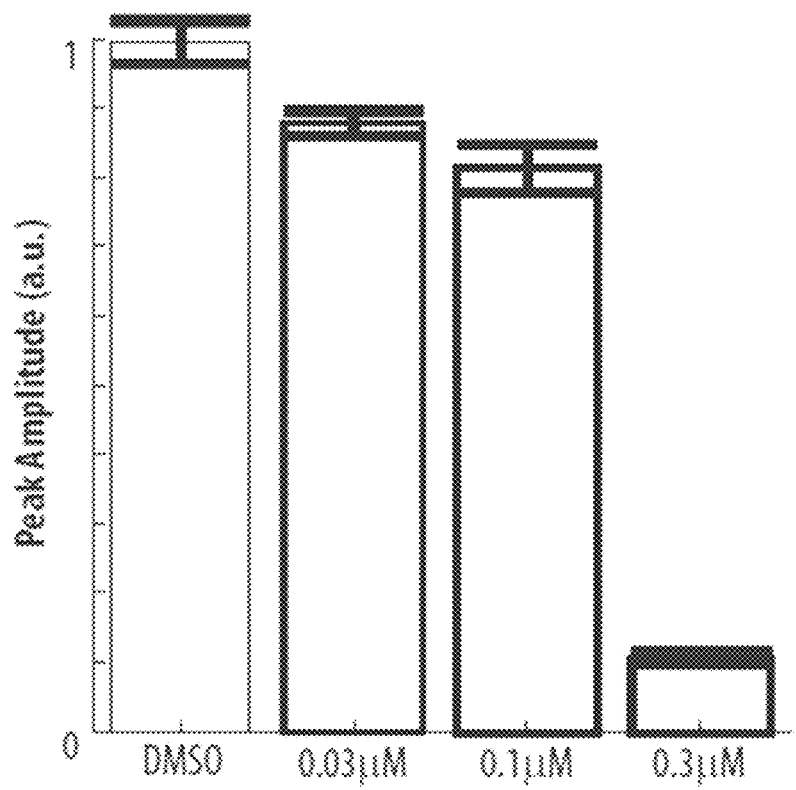
FIG. 41 shows the quantification of the voltage peak amplitude and the integrated calcium area from 3 wells at differing concentrations using the waveforms shown in FIG. 40.
Figure 41:
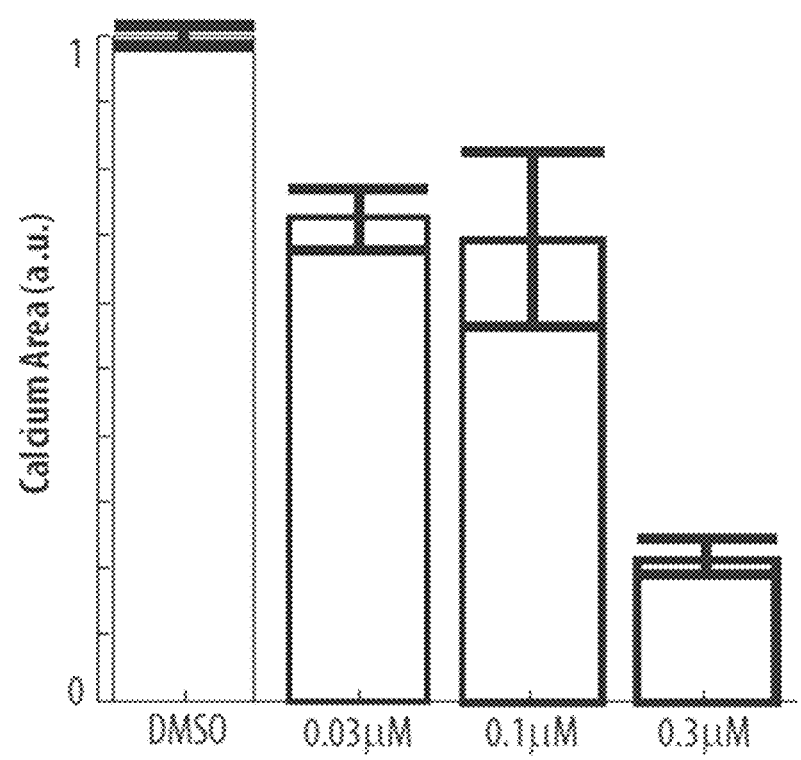

FIG. 41 shows the quantification of the voltage peak amplitude and the integrated calcium area from 3 wells of each concentration. Increasing concentration of Nifedipine altered both the voltage action potential waveform and calcium transients until it was completely extinguished at 0.3 uM.

As previously described, another embodiment of a multiwell plate reader includes a plurality of independent optical channels, wherein each optical channel is capable of transmitting light at a plurality of different wavelengths to and detecting light at a plurality of different wavelengths from, a set of wells of the multi-well plate. Each optical channel further includes unique beam shaping optics for shaping one or more beams of light to be transmitted to multiple wells.

Figure 42:
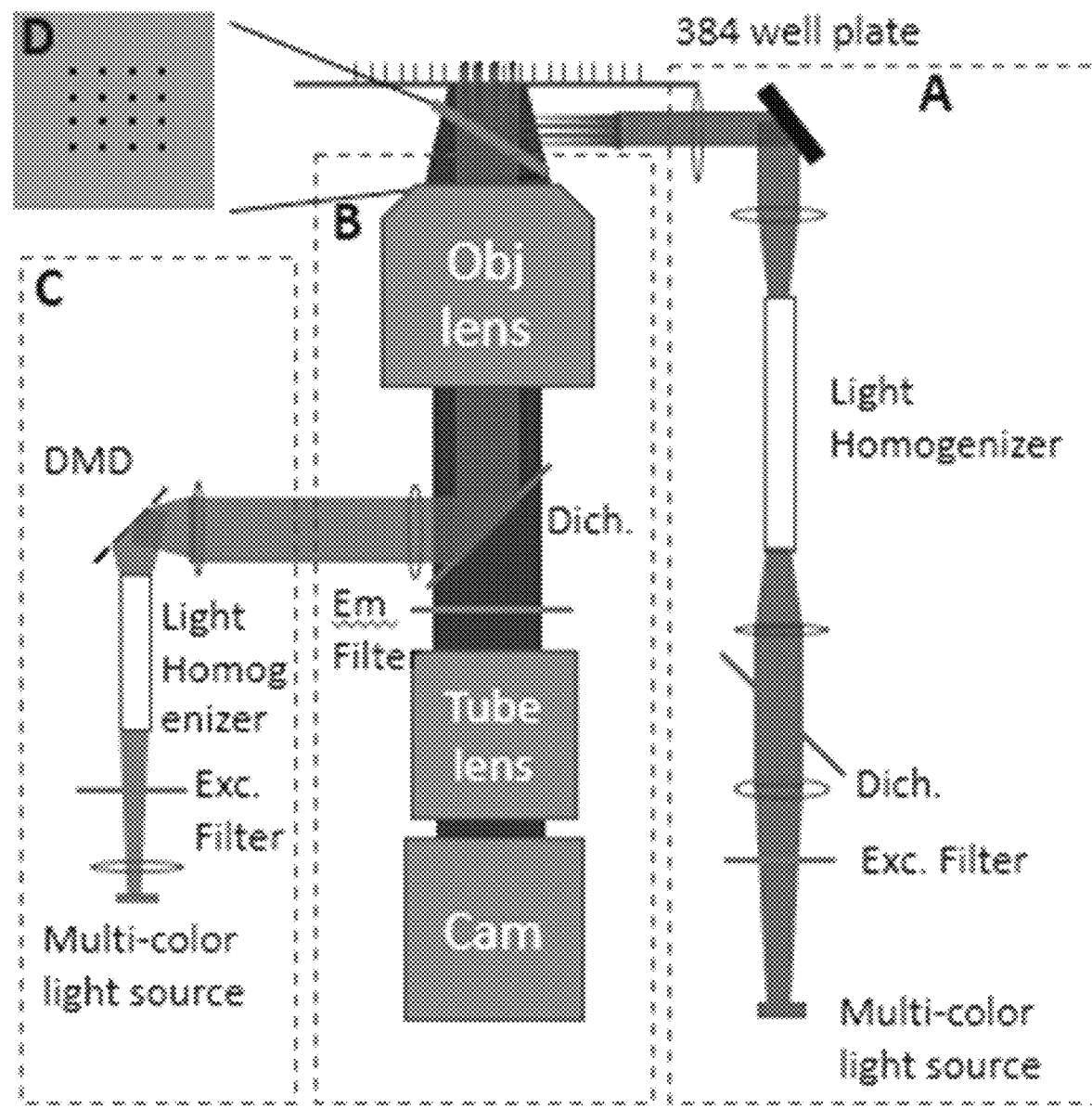
FIG. 42 shows a portion of an exemplary optical channel of a plate reader of the invention.

FIG. 42 shows a portion of an exemplary optical channel of a plate reader of the present invention. As shown, an exemplary optical channel comprises at least three different light sources for emitting light beams to be transmitted to a set of wells of a multi-well plate. A first light source may transmit light at a first wavelength capable of stimulating a light-sensitive actuator protein, such as a light-gated ion channel (e.g., CheRiff), and the wavelength of the stimulation light can be, for example, between 450 and 495 nm. The stimulation light may have an intensity of about 22 mW/cm$^2$. Such a light source may be blue (in the form of a blue LED. Another light source may transmit light at a wavelength capable of exciting a microbial rhodopsin, such as QuasAr2 or QuasAr3. The wavelength of the excitation light may be, for example, between 580 and 650 nm. The excitation light may have an intensity between 0.01 W/cm$^2$ and 400 W/cm$^2$ and preferably about 100 W/cm$^2$ for QuasAr.

For example, such a light source may be a red diode laser for emitting red light at a wavelength of approximately 638 nm for illuminating a large area with high power density, enabling imaging with fluorescent dyes (1 W/cm$^2$) and many genetically encoded sensors, such as QuasAr (or brighter QuasAr variants). Finally, another light source may provide stimulation light with a wavelength (i.e., approximately 580 nm) capable of exciting a light-sensitive reporter protein such as a light-sensitive calcium-indicating protein. Such a light source may be a yellow diode laser.

As illustrated, the optical channel includes unique beam shaping optics to shape at least the red and yellow beams of light into multiple, uniform beamlets of light that are directed, via a reflector array, toward the center of separate respective wells of a set of wells. In particular, the beam shaping optics include a dichroic mirror to join the red and yellow beams of light in space and pass the joined beams through at least one homogenizer for spatially homogenizing the joined beams of light. Preferably, the homogenizer forms the joined beams into a substantially uniform and rectangular region of illumination. Different methods of laser beam homogenization may be used to create a uniform beam profile. Homogenization may use a lens array optic or a light pipe rod.

A first method of homogenization is the use of a lens array configuration, which is composed of separate lens elements stacked side by side to form an array then placed in the laser beam path. Homogenization is created by dividing the initial wave front into separate beams with each lens element and then focusing those new beams onto the target area with a focusing lens. The separate beams are superimposed on the illumination plane focused with the focusing lens. Preferably the shape of the illumination area is the same as that of the lens element aperture. To avoid a blurred edge, a second lens array can be used. One lens array is conjugated to another so that the focal points of one array coincide with the pupil surface of the next one, and the focal points of the second array coincide with the pupil surface of the first one. This setup improves edge sharpness but the arrays need to be very accurately aligned with one another for it to work properly. The homogenizer 125 can include one or any number of microlens arrays. Passing light through a microlens arrays can give a power profile of the light a "top hat" shape. The beam homogenizer smooths out irregularities in a laser beam profile and creates a more uniform profile. Suitable beam homogenizers may use a multifaceted mirror with square facets. The mirror reflects light at different angles to create a beam with uniform power across the whole beam profile (a "top hat" profile). The homogenizer may include a diffractive beam homogenizer or an MLA (Micro Lens Array). See Voelkel 2008, Laser beam homogenizing: limitations and constraints, Proc SPIE 7102, Optical Fabrication, Testing, and Metrology III, 71020J, incorporated by reference.

A second method for homogenization is the use of a rod lens. In this layout, multiple reflections from the initial beam are mixed inside of the rod (or light pipe). The length of the light pipe (homogenizing rod) should exceed several fold the laser beam cross section size, which dictates the longitudinal system size. The input beam may be focused into a light pipe with a focusing lens is an option for reducing the cross-section size and longitudinal size. A light pipe which provides TIR reflection reduces reflection losses while a TIR angle limits the input beam's numerical aperture (NA).

After passing through the homogenizer, the light passes through a microlens array configured to divide the homogenized light beam into a set of uniform beamlets of light focused towards a reflector array. The reflector array is comprised of a novel, custom reflector glass designed to use patterned metallic coatings to reflect focused uniform beamlets to samples provided in separate respective wells. In particular, the reflector array is comprised of an array of metallic reflectors for directing each of the uniform beamlets of light into a center of a separate respective well of the set of wells without illuminating walls of the wells, to thereby avoid autofluorescence which could otherwise occur due in part to the high-power red diode laser. The metallic reflectors are small enough to transmit the majority of the fluorescent signal emitted from given samples back through the glass. The reflector glass substrate may be comprised of ultra-flat optics, which allows for minimization of optical aberration.

Furthermore, the number of uniform beamlets of light distributed via the beam shaping optics covers a specific area over a set of wells, as opposed to just being directed to a single well. In other words, each optical channel is configured to transmit a plurality of beamlets of light of a specific wavelength into a plurality of separate respective wells over a given area, and, in return, detect emission from each of the separate respective wells. The number of uniform beamlets, and thus the number of associated wells able to receive such beamlets, is directly proportional to the overall number of wells of a given multi-well plate being used, generally by a factor of 24.

For example, the plate reader may be operable with at least three types of multi-well plates, such as 96-, 384-, or 1536-well plates. As a result, the reflector array is operable to direct approximately 4 uniform beamlets of light into a set of 4 wells of a 96-well plate, approximately 16 uniform beamlets of light into a set of 16 wells of a 384-well plate, and 64 uniform beamlets of light into a set of 64 wells of a 1536-well plate. As such, regardless of plate format, approximately 24 camera fields of view (FOVs) are needed to record a full plate, which still results in improved overall throughput compared to conventional techniques.

Accordingly, the beam homogenizer shapes the light from the light source so that, instead of hitting the microlens array with an irregular shape, the light enters the microlens array in a substantially rectangular pattern with homogeneous optical power level over the pattern. As a result, the entire sample in each well receives strong and uniform illumination while avoiding inadvertently illuminating walls of each well, which could otherwise cause autofluorescence. Thus, a sample at the bottom of well is illuminated uniformly with good optical power for imaging via an image censor (i.e., sCMOS image sensor). Accordingly, the plate reader can successfully image living cells in multiple wells of a multi-well plate and record movies of electrical activity useful to show, for example, action potentials propagating within living neurons.

The image sensor may be provided as a digital camera unit such as the ORCA-Fusion BT digital CMOS camera sold under part #C15440-20UP by Hamamatsu Photonics K.K. (Shizuoka, JP) or the ORCA-Lightning digital CMOS camera sold under part #C14120-20P by Hamamatsu Photonics K.K. Another suitable camera to use for sensor is the back-illuminated sCMOS camera sold under the trademark KINETIX by Teledyne Photometrics (Tucson, AZ).

The optical channel further includes an imaging lens, such as a suitable tube lens. The lens may be an 85 mm tube lens such as the ZEISS Milvus 85 mm lens. With such imaging hardware, the microscope can image an area with a diameter of 5.5 mm in a 96-well plate and the full 3.45 mm well width of a 384-well plate, for example.

The optical channel may further include digital micromirror device (DMD) for reflecting the blue light beam (from the blue LED light source) to thereby illuminate a bottom of a well of the set of wells with a pattern defined by the DMD. The DMD may include, for example, a Vialux V-9601 DMD that provides fully synchronized 100 µs pattern refresh for fast single-cell stimulation to measure individual synaptic connections or slightly delayed pulses on connected neurons to probe spike-timing dependent plasticity.

Control software may be included to handle new hardware (camera & DMD) and minimize dead time when scanning the multi-well plate. The new DMD has a display pattern that may be updated with digital triggers synchronized to camera frames. The new software will also enable multithreading for control of the pipetting robot (picking up tips, loading drug, moving to plate) during execution of other microscope tasks so the microscope can be almost continuously recording high-speed video. To enable facile multithreading, the control software may be architected in C# or similar. Furthermore, because multiple wells will be imaged concurrently, additional software upgrades will be needed to track the currently imaged wells and associated experimental metadata. This will require tracking spatial information of the imaging area and position on each of the different plate types in software. The tracked area will then be used to find the currently imaged wells and attach the relevant experimental information for those wells with the created movie. Mapping information will be produced to allow associating this metadata back with appropriate physical portions of the movie upon analysis.

The 6 GB/FOV data rate from the sCMOS camera requires a dedicated server for real time data saving. To address this high data rate, the system will take advantage of the unified signal present in each of the proposed assay modalities to reduce the information from each well to a single signal. This will require image segmentation to detect individual wells within the movie, followed by averaging of pixels at each of those wells in each frame of the movie, to reduce each well to a single temporal trace. This will reduce a 6 GB movie file to MB data size for further data analysis.

As previously noted, the plate reader may be fully equipped with temperature monitoring and environmental controls on the cell plate, imaging enclosure, and overall system console/cabinet, to accommodate the heat generated by the high-power light sources and the sCMOS image sensor (e.g., sCMOS camera) during imaging. As noted, cells within optogenetic assays may be particularly sensitive to ambient and imaging environments. The temperature monitoring and environmental control system may be operable to control environmental conditions associated with a sample in a multi-well plate positioned on the reader. The environmental control system can control, for example, humidity, temperature, $CO_2$ and other factors of the sample region. The environmental control system can assure that the conditions in an aqueous medium in which cellular samples are contained within the well of a multi-well plate are maintained to keep the cells alive and functional. This is especially important in optogenetic assays that assess the activity of cells in response to a stimulus.

Accordingly, the unique beam shaping optics and inclusion of a sCMOS image sensor enables increased throughput, increased instrument robustness and stability, boosting of well-to-well signal strength and uniformity, reducing of optical crosstalk, and vastly improving spatial resolution. As a result, the plate reader of the present invention allows for sensitive optical detection and stimulation, while performing a broad suite of optimized assays on a wide range of excitable cell types, which is particularly useful for neurological disorder-based drug discovery, including Nav channel-based HEK cells for target-based screening and primary neuronal cultures.

ADDITIONAL EXAMPLES

Example 7: Optogenetic Assays in Heterologous and Disease-Relevant Cell Types Optopatch-based assays will be developed in two cell types to be used with the multi-well plate reader design of FIG. 42. The assays will include Nav channel-based spiking HEK cells and neurons. These cell types are chosen to represent a range of cell types that would be critical in a small-molecule screening campaign for a pain or epilepsy focused drug discovery program. Nav channel based spiking HEK cells can be used for target based primary screening. The neuronal assay is an important secondary assay to evaluate Nav channel inhibitor efficacy in a disease relevant native cell type.

Example 7.1: Nav Channel Spiking HEK Assay Development

Figure 43:
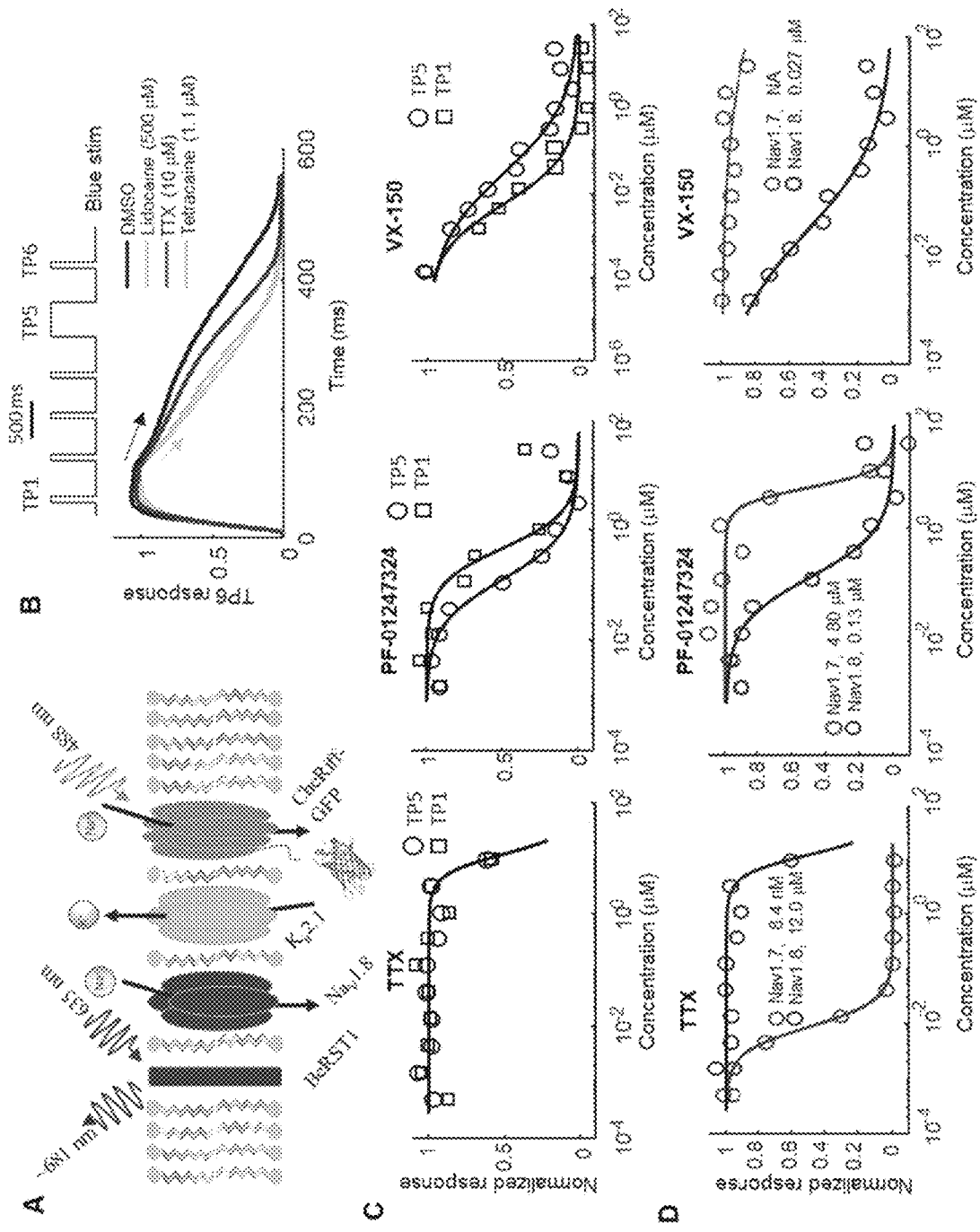
FIG. 43A shows exemplary components of a spiking HEK cell undergoing an optogenetic assay consistent with the present disclosure.
FIG. 43B shows representative traces of a test pulse of HEK cells undergoing an optogenetic assay consistent with the present disclosure.
FIGS. 43C and 43D show dose response curves of HEK cells undergoing an optogenetic assay consistent with the present disclosure.

Different Nav spiking HEK cells covering the diverse spectrum (Nav1.1, Nav1.2, Nav1.6, Nav1.8) that co-express an optogenetic actuator (CheRiff) and sensor (QuasAr) will be generated. To increase the signal-to-noise in the assay, a voltage sensitive dye (BeRST) will be tested initially. FIG. 43A shows exemplary components of a spiking HEK cell undergoing an optogenetic assay consistent with the present disclosure. More specifically, FIG. 43A is a diagram illustrating different components in spiking HEK assays, including the actuator (CheRiff-GFP), sensor (BeRST), an inward rectifier (Kir2.1) to set resting membrane potential, and the target (Nav1.8). The high throughput Nav1.5 and Nav1.7 assays have already been deployed. For this project, there will be a strong focus on Nav1.8, a validated pain therapeutic target, as this channel will serve as the primary basis for instrument demonstration. Preliminary results suggest a Nav1.8 channel specific signal can be detected via whole well average analysis in spiking HEK cells in 384-well plate with transiently electroporated Nav1.8 expression.

FIG. 43B shows representative traces of a test pulse of HEK cells undergoing an optogenetic assay consistent with the present disclosure. The slope of repolarization (arrows in FIG. 43B) is used as the metric to evaluate Nav1.8 functionality in the spiking HEK assay. Using the 6-test pulse (TP) stimulation protocol, Nav1.8 selective blockers can be distinguished with different mechanisms in a single scan. For example, FIG. 43B shows PF-0124732423 is more effective after the long pulse (TP5), whereas VX-150 (NCT02660424, NCT03304522) is more effective at the first test pulse (TP1). The slope during initial repolarization (e.g. blue arrow or cyan arrow) was used to quantify compound effects under different TPs. A steep slope indicates more Nav1.8 blockage Moreover, different Nav channel blockers with different selectivity profiles all give rise to expected pharmacology in the dose response study in Nav1.8 and Nav1.7 spiking HEK assays (see FIG. 43C). However, despite initially promising results from the Nav1.8 spiking HEK assay, the magnitude of the signal window is only moderate and further assay optimization is needed to support a HTS campaign. These challenges partly result from the fact Nav1.8 has the most depolarized conductance-voltage curve among the Nav superfamily and the current optogenetic actuator CheRiff, with a reversal potential close to 0 mV24, cannot produce adequate membrane depolarization to fully activate Nav1.8 channels. To solve this issue, new variants of channelrhodopsin25 that can depolarize membrane potential above 0 mV will be explored, which could potentially enhance the Nav1.8 dependent signal in the spiking HEK assay. Furthermore, newly developed QuasAr variants with improved brightness that are compatible with the red diode laser intensities will be tested, which can further improve assay throughput by eliminating the dye loading step. In addition to Nav1.8, Optopatch assays for many other Nav subtypes as counter-screen assays will be developed. A panel of Nav channel blockers, including subtype selective blockers, will be tested to validate the newly developed assays.

FIGS. 43C and 43D show dose response curves of HEK cells undergoing an optogenetic assay consistent with the present disclosure. More specifically, FIG. 43C illustrates dose response curves of TTX, PF-01247324, VX-150 at TP5 and TP1 in Nav1.8 spiking HEK assay. TTX equivalently blocks TP1 and TP5. A state dependent blocker, PF-01247324 preferentially blocks TP5, whereas VX-150 preferentially blocks TP1. FIG. 43D illustrates dose response curves of TTX, PF-01247324, VX-150 on different Nav subtype channels (Nav1.7 and Nav1.8). The IC50 values for each compound are shown in each plot. TTX demonstrates more than 1,000-fold selectivity for Nav1.7, consistent with literature reports. PF-01247324 blocks Nav1.8 with an IC50 value of 0.13 µM and displays 40-fold selectivity against Nav1.7. VX-150 blocks Nav1.8 with an IC50 of 27 nM and with no effect on Nav1.7 up to 30 µM.

Example 7.2: DRG Neuronal Calcium Assay Development

Figure 44:
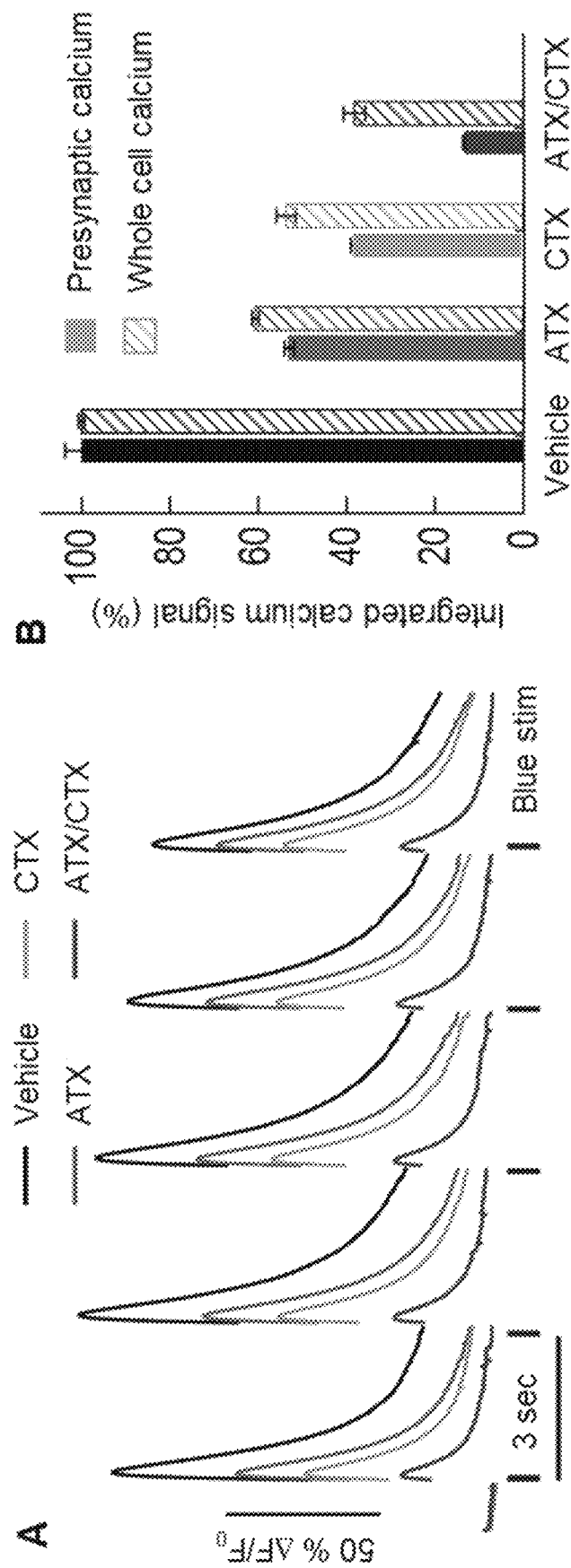
FIGS. 44A and 44B show pre-synaptic and whole cell calcium assay function data in hippocampal neurons.

Channelrhodopsin stimulation-based whole cell and pre-synaptic calcium assays will be developed for rat DRG neurons on an instrument that has similar spatial resolution to the multi-well plate reader of FIG. 42. FIGS. 44A and 44B show pre-synaptic and whole cell calcium assay function data in hippocampal neurons. More specifically, FIGS. 44A and 44B demonstrate that CheRiff stimulation can trigger synchronized whole cell and pre-synaptic calcium signals in rat hippocampal neurons in 96-well plates and the calcium response amplitudes are sensitive to pharmacological modulation. A similarly strategy will be applied to develop the optogenetically-based calcium assay in rat DRG neurons (using both male and female rats to address Sex as a Biological Variable) by using blue light to stimulate CheRiff and record the fluorescence emitted from a spectrally orthogonal red genetically encoded calcium sensor jRGECO1a. The genetically encoded calcium sensor jRGECO1a will be fused with a presynaptic trafficking motif, then evoked presynaptic calcium signal in DRG neurons will be recorded and the identity of the signal will be validated using presynaptic calcium channel blockers. Pharmacological validation will be performed using a panel of 10 compounds with known activities, such as lidocaine, TTX, ω-Agatoxin IVA and ω-Conotoxin GIVA. DRG neuronal assays represent critical secondary assays for pain-relevant targets.

Referring to FIG. 44A, fluorescent Syp-jRGECO1a signal calculated by taking the flat average of fluorescence across the full record regions. Calcium transients were detected in rat hippocampal neurons in response to optogenetic stimuli (5 ms, 125 mW/cm2 blue-light pulses). Action potentials from the stimulated region propagate into the recording region and induce calcium influx to the pre-synaptic terminals. Calcium enters the cell through voltage gated calcium channels, predominantly Cav2.1 and 2.2, which are selectively blocked by toxins ATX (0.5 μM ω-Agatoxin IVA) and CTX (1 μM ω-Conotoxin GVIA).

Referring to FIG. 44B, recordings were made using both the pre-synaptically targeted jRGECO1a and a cytosolic (untargeted) jRGECO1a. Recordings as shown in FIG. 44A were made before (pre) and after (post) toxin addition and integrated as a measure of total calcium influx. Post signals were normalized to pre signals to minimize effects of well-to-well variability and that ratio was normalized to the vehicle condition.

Example 8: Optimizing Nav1.8 and Secondary Multiplexed Spiking HEK Assays for HTS Compatibility Upon establishing heterologous Nav channel assays, the Nav1.8 spiking HEK assay will be adapted and validated to prepare for a primary small molecule HTS. To this end, the Nav1.8 assay must be optimized for increased throughput and improvements to liquid handling procedures integrated into the HTS workflow. This optimization is important to fully leverage the throughput potential of the multi-well plate reader described herein, and is critical for validating the multi-well plate ready and preparing for a primary screening campaign. On-plate multiplexed Nav channel subtype assays will be validated, including those assays that will be used for secondary assays following the primary Nav1.8 screen.

Example 8.1: Streamline Nav1.8 Tissue Culture and Liquid Handling Procedures for HTS Established protocols for high throughput Nav1.7 spiking HEK assays in a 384-well format use a 5-day tissue culture procedure. This protocol includes an initial plating of cells in 15 cm dishes, followed by a 48-hour cell expansion period, viral transduction with Kir2.1 lentivirus followed by another 24-hour incubation. On day 4, cells are then re-plated into 384-well plates at confluency. Compound treatments and screening are performed on day 522. While this protocol has produced consistent high quality HTS results, screening multiple days per week requires careful coordination of cell lots at different stages of the cell culture process. In addition, due to logistical and capacity constraints, this protocol limits screening to 3 days per week. To establish a more streamlined approach, assay ready cells that can be plated directly into 384-well plates 24 or 48 hours prior to imaging will be prepared.

Preliminary experiments suggest Nav1.7 spiking HEK cells can be expanded, transduced with Kir2.1, collected and frozen for future assays. Cells can be taken directly from liquid nitrogen storage, plated into 384-well plates, and imaged after a 24 hr or 48 hr incubation. For the Nav1.8 HTS campaign (proposed in Example 9) and for future commercial opportunities, it will be required that screening 4 days per week on the multi-well plate reader will be possible. To achieve this frequency, a 48-hour tissue culture procedure for the Nav1.8 spiking HEK cells developed in Example 7 will be optimized. Production of these assay ready cells to be used in Example 9 will be scaled up. It is estimated that each 384-well plate requires 11.52 million (30K/well) of assay ready cells.

To screen a 200K small molecule library in a 384-well plate format (570 plates), ~7 billion assay ready cells need to be cryostocked. To accommodate cell expansion and facilitate Kir2.1 expression, lentivirus transduction and transfection using electroporation will be tested at scale. The current cell expansion protocol will be adapted to a large surface area tissue culture system such as the Nunc™ EasyFill™ Cell Factory™ Systems (Thermofisher Scientific). To compare introduction of the Kir2.1 via lentivirus transduction and electroporation, a 2-layer system will be used. Once the system is validated and the most efficient introduction of Kir2.1 is identified, production of cells for a primary screen can be performed with a 10 layered system that has a cell culture surface area of 6320 cm². Using these vessels, we can culture approximately 36x the number of cells in a single standard 175 cm² flask. Methods for Kir2.1 plasmid electroporation and generation of large volumes (~80 mL) high titer Kir2.1 lentivirus (>108 CFU/mL) have previously been established at Q-State. Once a final cell method is determined, 10×10-layer EasyFill systems will be seeded with Nav1.8 cells, cultures expanded, transduced or electroporated, aliquoted and frozen.

In addition to streamlining cell culture procedures for a primary Nav1.8 screen, to increase daily plate per day throughput, more efficient liquid handling procedures will be developed. Preliminary tests with a commercially available automated centrifugal plate washer (Blue Washer, Bluecat bio) 27 resulted in no cell loss following BeRST dye loading and reduced the buffer exchange protocol from approximately 6.5 minutes/plate to less than 1 minute/plate. Compound addition is then be performed immediately following buffer exchange using previously established methods. To achieve a significant improvement in daily throughput (60 plates/day×4 days/week), known bottlenecks in both our liquid handling procedure and tissue cultures procedures can be addressed without compromising assay quality. Besides exploring improvements in liquid handling, any new QuasAr variants identified in Example 7 will be tested. The increased red laser intensity in combination with potentially brighter voltage sensors could eliminate the dye addition steps all together. If possible, this would further increase assay throughput potential as the dye addition, incubation, and removal steps could all be circumvented.

For example, the eFRET voltage sensor called Voltron may require as little as 1 W/cm² illumination for optical electrophysiology assays as disclosed herein. This may allow for the use of simplified optical systems that, for example, are able to use LED illumination instead of laser illumination, while concurrently providing superior homogeneity FIG. 46 shows the low illumination inputs necessary for Voltron under diverse assay conditions.

Example 8.2: Spiking HEK Nav 1.8 Assay Optimization and Screening Panels for Nav Channels Frozen aliquots of Nav1.8 cells prepared in Example 8.1 will be optimized and validated for assay performance on the various multi-well plate readers of the present disclosure using validation methodologies previously described in Example 7. Tool compounds such as TTX, tetracaine, PF-01247324, and VX-150 will be used to assess potency of known Nav1.8 inhibitors. IC50 values calculated based on defined metrics on the multi-well plate reader of FIG. 42 should be within 3-fold±values reported in the literature and observed using previously described multi-well plate readers from cells using both 5 day and 48-hour tissue culture protocols. Assay validation of Nav1.8 HTS protocols will be performed in both 384 and 1536-well plate formats. The current liquid handling systems and small molecule library are primarily managed in 384-well plates.

To assess Nav subtype selectivity, sodium channel Nav1.2, 1.5, and 1.7 specific assays will be validated for compatibility with updated liquid handling procedures and Nav1.X tool compound pharmacology. As less throughput is required for secondary assays, the 5-day tissue culture procedures validated in Example 7 will be used for all Nav channel subtypes. To streamline subtype selectivity analysis of hits identified in our primary screen, the Nav channel subtype panels will be adapted in an on-plate multiplex format.

As shown in FIGS. 28A-28C, on-plate multiplexing will leverage 4 different Nav channel subtypes plated into 4 well quadrants of a 384-well plate. Since the optimal resting membrane potentials are specific for each sodium channel subtype, assay buffer potassium concentrations determined in Example 7 will be maintained in our multiplex format. Deep well microplates will be used to ensure that 4 different assay buffers can be added to single plates with automated liquid handling. Leveraging the versatility, camera-based imaging, patterned optogenetic stimulation, and software-based analytics described herein and developed with respect to the multi-well plate reader of FIG. 42, there will be simultaneous recording from 4 Nav channel subtypes in different wells all treated with the same compound (FIGS. 28B and 28C). Cells will be plated using a 96-well Viaflo electronic pipette (Integra Biosciences), which is capable of dispensing cells simultaneously into 96 wells of a 384-well plate. Similar to validation for Nav1.8 assays, known tool compound pharmacology will be used to confirm assay performance (FIGS. 27A and 27B).

Figure 45:
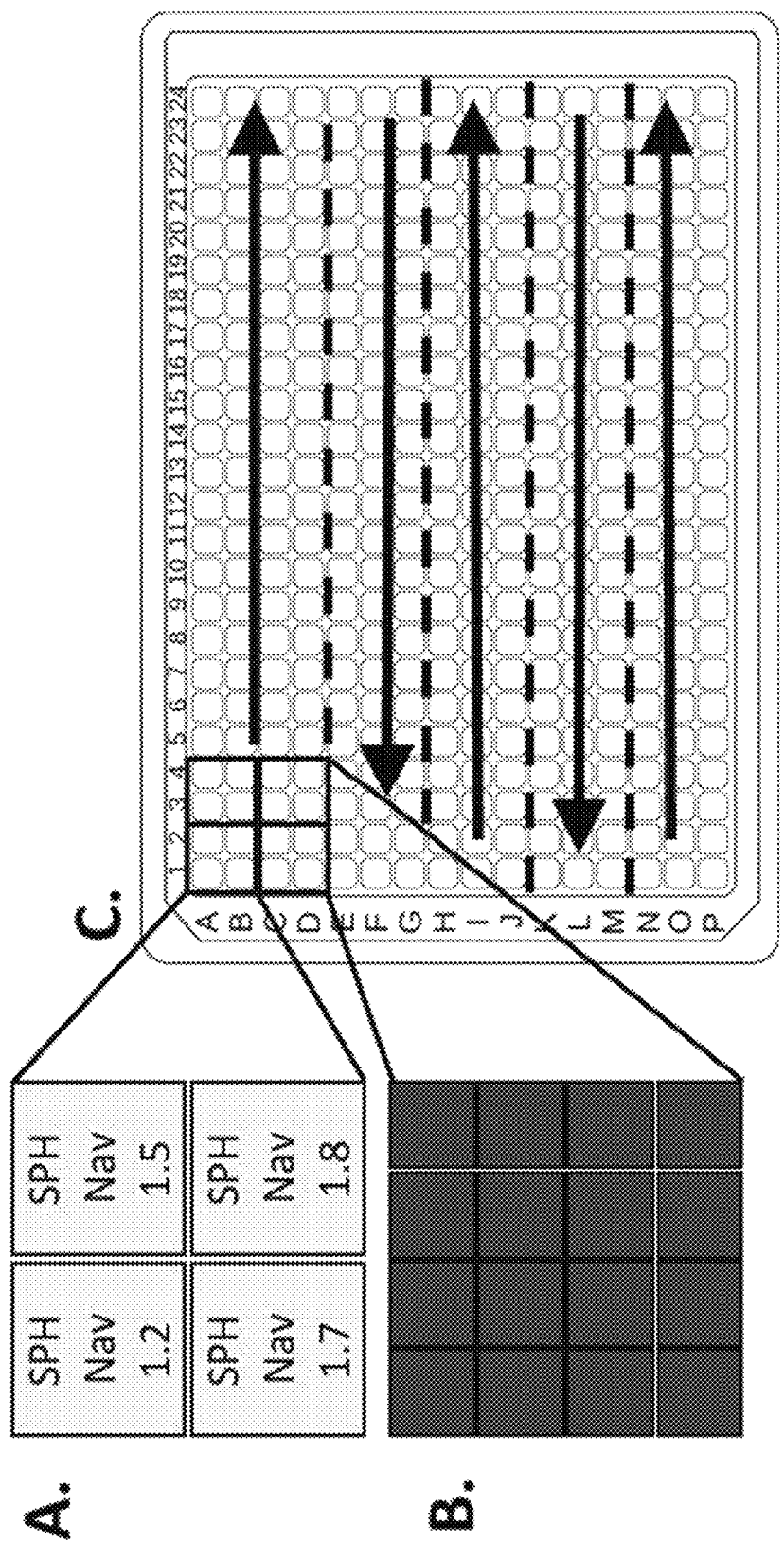
FIGS. 45A, 45B, and 45C show a 384-well multiplex pate layout and imaging pattern to be carried out by a plate reader of the invention.

FIGS. 28A-28C shows a 384-well multiplex pate layout and imaging pattern to be carried out by a plate reader of the invention. FIG. 45A illustrates representative quadrants with 4 different sodium channel subtypes plated within individual wells. FIG. 45B shows that red laser illumination allows for simultaneous recording from 16 wells in a 384-well plate with homogeneity across the entire region of interest (ROI). Recording area is independent of plate type and in a 1536-well format, 64 wells would be imaged in parallel. FIG. 45C is a representative horizontal snake or serpentine pattern for imaging. Starting in columns 1-4, 16 well quadrants would be read across rows A-D, followed by a reverse pattern in columns E-H beginning in the right most ROI. This pattern would continue until the entire plate has been imaged in approximately 4 minutes.

Example 8.3: Validate Nav1.8 Assay High Throughput Performance

To assess the assay throughput and confirm robustness and rigor, a pilot screen in duplicate of an internal small molecule library will be conducted. This collection consists of 3,140 FDA approved compounds from commercially available reference libraries (Enzo life sciences, Prestwick Target Mol, and Apex Bio). Nav1.8 tool compounds will be included on screening plates with their identity and positions blinded during analysis to evaluate assay robustness via identification of known inhibitors using established methods for data analysis14. The goal is to demonstrate screening of ≥20 384-well plates with Z'≥0.5 and coefficient of variation ≤5% in 3.5 hours.

Example 9: High Throughput Screening and Hit Selection

As a demonstration of the increased stability, throughput, and robustness of the systems and methods associated with the multi-well plate reader of FIG. 42, a screening campaign will be performed using an in-house library of approximately 200,000 small molecules assembled from commercially available sources for inhibitors of Nav1.8. This collection of compounds was selected using three main criteria: CNS drug-like properties, favorable pharmacological profiles, and structural diversity. One half of the library is focused on high structural diversity that are ideal for hit to lead screening campaigns. The second half of the library is comprised of chemical structures that have hallmark CNS drug-like characteristics. In addition, filters were used to exclude chemical liabilities such as aggregators and reactive groups to facilitate downstream medicinal chemistry efforts.

Example 9.1: Nav 1.8 HTS Campaign to Identify Novel Small Molecule Inhibitors

Nav1.8 will be screened in a 384-well format (n=1) at 3 µM with 2 columns (32 wells) reserved for positive (tetracaine) and negative (DMSO) controls. The scan time for each plate is approximately 4 minutes, which will enable screening of 60 plates per day and complete the entire primary screen in ~10 days. After each day of screening, an analysis of assay performance will be performed. Plates that fail to exceed a Z-prime of 0.5 will be flagged for repeat.

Compounds from the primary screen will be ranked by mean test pulse peak height values normalized to vehicle control on each plate. Mean TP height analysis has been successfully used in previous sodium channel screens for Nav1.7 to select compounds for secondary hit confirmation. B score normalization will be employed if hit selection appears impacted by positional effects or plate to plate variation. A hit threshold of ≥4-5 SD reduction in mean peak height will be used to select compounds for hit confirmation. All compounds that inhibit peak height below this threshold will be cherrypicked for hit confirmation. A previous Nav1.7 screen showed that approximately 1.4% of compounds inhibited mean TP values below >5 standard deviations of DMSO control wells. Follow-up hit confirmation will be performed in single points at 3 µM and 1 µM small molecule concentrations. In addition, the hit list will be tested at 3 µM on the parental cell line lacking Nav1.8. Any compounds that block CheRiff-induced depolarization will be removed in this assay. This assay can detect off target compounds that block CheRiff, Kir2.1, modify the voltage sensor, or depolarize cells in a sodium channel independent mechanism. Any compound with Nav1.8 independent effects will not be carried forward for further analysis, but we expect the number of such compounds to be small.

Example 9.2: Hit Confirmation and Secondary Sodium Channel Subtype Selectivity

Up to 2,000 confirmed hits for Nav1.8 from the primary HTS will be advanced to evaluation in a 5-point concentration response curve (CRC) assay. From this data, approximate IC50 values will be calculated, and the 500 most potent compounds will be selected for further evaluation on the Nav1.x channel panel validated in Example 8 (see FIGS. 28A-28C). Leveraging the utility of the multi-well plate reader of FIG. 42 using on-plate multiplex assays with 4 Nav subtypes per plate, the top 500 compounds will be tested in 10-pt CRC format. In two 384-well plates, 8 compounds can be evaluated across 4 Nav1.x channel subtypes in duplicate. Each plate will have 320 compound wells and 64 control wells. On each plate there will be 8 positive (Nav1.x tool compounds) and 8 negative (DMSO) control wells for each Nav subtype. All 500 compounds will be evaluated in 3 days of imaging. IC50 values for each compound across Nav subtypes will be calculated from 10-pt CRC data. In addition to analysis of the mean peak heights of TP1-TP6, each compound will be analyzed using individual test pulses 1, 5 and 6 to categorize compounds by blocking mechanism. For individual compounds, if significant differences in calculated IC50 values are observed between TP1 and TP5 or TP6, this would indicate state-dependent or use-dependent blocking mechanisms. Alternatively, if there is a minimal difference in TP specific IC50 values, this would suggest a state-independent mechanism. Compounds will be organized by mechanisms and prioritized for advancement primarily based on a favorable Nav1.8 subtype selectivity profile. As the goal is to identify small molecules as pain therapeutics, compounds that are potent for Nav1.8 and 1.7, but less efficacious at Nav1.2 and 1.5 will be selected for future studies regardless of rank order potency. Compounds with a state-independent mechanism will be prioritized, even if subtype selectivity is not as significant as a compound that demonstrates a strong state-dependent mechanism. Finally, efficacy will be evaluated in rat primary DRG neurons using whole cell Ca2+ assays which will aid in identifying compounds with the most favorable profiles for follow-on chemistry efforts.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. A multi-well plate reader comprising:
 a reading platform to receive a multi-well plate;
 a plurality of optical channels, each optical channel capable of transmitting light at a plurality of different wavelengths to, and detecting light at a plurality of different wavelengths from, a set of wells of the multi-well plate, wherein each optical channel comprises:
  at least three light sources for emitting three beams of light at three distinct wavelengths and to be transmitted to the set of wells; and
  one or more dichroic mirrors to join at least two of the beams of light in space and pass the two joined beams of light through at least one homogenizer for spatially homogenizing the two joined beams of light; and
 a control system operable to control environmental conditions of a sample in the multi-well plate.

2. The multi-well plate reader of claim 1, wherein the homogenizer forms the two joined beams of light into a substantially uniform and rectangular region of illumination.

3. The multi-well plate reader of claim 1, wherein each optical channel comprises a microlens array that divides the two joined beams of light into uniform beamlets of light directed towards a reflector array.

4. The multi-well plate reader of claim 3, wherein the reflector array comprises an array of metallic reflectors for directing each of the uniform beamlets of light into a center of a separate respective well of the set of wells and avoids illumination of well walls.

5. The multi-well plate reader of claim 4, wherein the number of uniform beamlets of light directed towards the set of wells is directly proportional to the overall number of wells of the multi-well plate.

6. The multi-well plate reader of claim 5, wherein the multi-well plate is a 96-, 384-, or 1536-well plate.

7. The multi-well plate reader of claim 6, wherein the reflector array is operable to direct approximately 4 uniform beamlets of light into a set of 4 wells of a 96-well plate.

8. The multi-well plate reader of claim 6, wherein the reflector array is operable to direct approximately 16 uniform beamlets of light into a set of 16 wells of a 384-well plate.

9. The multi-well plate reader of claim 6, wherein the reflector array is operable to direct approximately 64 uniform beamlets of light into a set of 64 wells of a 1536-well plate.

10. The multi-well plate reader of claim 1, further comprising imaging lens to direct light from a sample in a well onto an image sensor.

11. The multi-well plate reader of claim 10, wherein the image sensor comprises an sCMOS image sensor.

12. The multi-well plate reader of claim 1, wherein at least one light transmitted is a stimulation beam of light, and each optical channel comprises a digital micromirror device (DMD) and the stimulation beam of light reflects off the DMD to illuminate a bottom of a well of the set of wells with a pattern defined by the DMD.

13. The multi-well plate reader of claim 1, wherein each optical channel detects the light at the plurality of different wavelengths simultaneously.

14. The multi-well plate reader of claim 1, wherein the light is stimulation light.

15. The multi-well plate reader of claim 14, wherein the light is stimulation light at a wavelength that excites a fluorophore in a cell.

16. The multi-well plate reader of claim 14, wherein the light is activation light at a wavelength that activates a light-gated ion channel in a cell.

17. The multi-well plate reader of claim 16, wherein the light-gated ion channel is in a pre-synaptic neuron connected to a non-selected cell via a synapse.

18. The multi-well plate reader of claim 17, wherein the non-selected cell comprises an optical reporter of synaptic activity.

19. The multi-well plate reader of claim 1, wherein the platform further comprises a mechanism to displace the plate with respect to the plurality of optical channels.

* * * * *